(12) United States Patent
Srebnik et al.

(10) Patent No.: US 10,157,138 B2
(45) Date of Patent: Dec. 18, 2018

(54) ARRAY OF PROCESSING UNITS OF AN IMAGE PROCESSOR AND METHODS FOR CALCULATING A WARP RESULT

(71) Applicant: Mobileye Vision Technologies LTD., Jerusalem (IL)

(72) Inventors: Daniel Srebnik, Jerusalem (IL); Emmanuel Sixou, Jerusalem (IL); Gil Israel Dogon, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 15/177,366

(22) Filed: Jun. 9, 2016

(65) Prior Publication Data

US 2016/0364835 A1 Dec. 15, 2016

Related U.S. Application Data

(60) Provisional application No. 62/173,389, filed on Jun. 10, 2015, provisional application No. 62/173,392, (Continued)

(51) Int. Cl.
*G06K 9/46* (2006.01)
*G06F 12/0875* (2016.01)
(Continued)

(52) U.S. Cl.
CPC ............ *G06F 12/0875* (2013.01); *G06F 7/00* (2013.01); *G06F 9/3001* (2013.01);
(Continued)

(58) Field of Classification Search
None
See application file for complete search history.

(56) References Cited

U.S. PATENT DOCUMENTS 5,323,489 A 6/1994 Bird
5,602,769 A 2/1997 Yu et al.
(Continued)

FOREIGN PATENT DOCUMENTS

EP 0620533 A2 10/1994
EP 2187316 A1 5/2010
(Continued)

OTHER PUBLICATIONS

Agathos et al., "Deploying OpenMP on an Embedded Multicore Accelerator", IEEE, 2013, pp. 180-187.
(Continued)

*Primary Examiner* — Feng Niu
(74) *Attorney, Agent, or Firm* — Reches Patents

(57) ABSTRACT

A method of calculating warp results for at least one out of driver assistance and autonomous driving, the method may include executing, for each target pixel out of a group of target pixels, a warp calculation process that includes: (a) Receiving, by a first group of processing units of an array of processing units, a first weight and a second weight associated with the target pixel. (b) Receiving, by a second group of processing units of the array, values of neighboring source pixels associated with the target pixel (c) Calculating, by the second group, a warp result based on in response to values of the neighboring source pixels and the pair of weights (d) And providing the warp result to a memory module.

35 Claims, 33 Drawing Sheets

Related U.S. Application Data filed on Jun. 10, 2015, provisional application No. 62/290,383, filed on Feb. 2, 2016, provisional application No. 62/290,389, filed on Feb. 2, 2016, provisional application No. 62/290,392, filed on Feb. 2, 2016, provisional application No. 62/290,395, filed on Feb. 2, 2016, provisional application No. 62/290,400, filed on Feb. 2, 2016, provisional application No. 62/293,145, filed on Feb. 9, 2016, provisional application No. 62/293,147, filed on Feb. 9, 2016, provisional application No. 62/293,908, filed on Feb. 11, 2016.

(51) Int. Cl.

| | | |
|---|---|---|
| *G06T 1/00* | (2006.01) | |
| *G06T 3/00* | (2006.01) | |
| *G06F 7/00* | (2006.01) | |
| *G06F 9/30* | (2018.01) | |
| *G06F 9/345* | (2018.01) | |
| *G06F 9/38* | (2018.01) | |
| *G06F 9/52* | (2006.01) | |
| *G06F 11/10* | (2006.01) | |
| *G06T 1/20* | (2006.01) | |
| *G06F 12/084* | (2016.01) | |
| *G06F 12/0842* | (2016.01) | |
| *G06F 12/0811* | (2016.01) | |

(52) U.S. Cl.
CPC .......... *G06F 9/3012* (2013.01); *G06F 9/3017* (2013.01); *G06F 9/30036* (2013.01); *G06F 9/30043* (2013.01); *G06F 9/30123* (2013.01); *G06F 9/30181* (2013.01); *G06F 9/345* (2013.01); *G06F 9/3824* (2013.01); *G06F 9/3826* (2013.01); *G06F 9/3851* (2013.01); *G06F 9/3865* (2013.01); *G06F 9/3891* (2013.01); *G06F 9/526* (2013.01); *G06F 11/1008* (2013.01); *G06F 12/084* (2013.01); *G06F 12/0842* (2013.01); *G06T 1/0007* (2013.01); *G06T 1/20* (2013.01); *G06T 3/0093* (2013.01); *G06F 12/0811* (2013.01); *G06F 2212/452* (2013.01); *G06F 2212/62* (2013.01)

(56) References Cited

U.S. PATENT DOCUMENTS

| | | | | |
|---|---|---|---|---|
| 6,021,222 | A * | 2/2000 | Yamagata | G06K 9/4604 |
| | | | | 382/199 |
| 6,061,477 | A * | 5/2000 | Lohmeyer | G06T 3/4007 |
| | | | | 382/293 |
| 6,061,782 | A | 5/2000 | Elliott et al. | |
| 6,934,422 | B2 * | 8/2005 | Hamza | G06T 3/0093 |
| | | | | 345/660 |
| 7,081,919 | B2 * | 7/2006 | Jaspers | G06T 3/4015 |
| | | | | 348/223.1 |
| 7,379,623 | B2 * | 5/2008 | Rudolph | G06T 3/0093 |
| | | | | 345/643 |
| 7,388,973 | B2 * | 6/2008 | Fidrich | G06T 7/12 |
| | | | | 378/21 |
| 7,463,772 | B1 * | 12/2008 | Lefevere | G06K 9/3283 |
| | | | | 345/419 |
| 7,685,354 | B1 | 3/2010 | Hetherington et al. | |
| 8,300,058 | B2 | 10/2012 | Navon et al. | |
| 8,305,495 | B2 * | 11/2012 | Kegasawa | G06T 1/20 |
| | | | | 348/571 |
| 8,830,395 | B2 * | 9/2014 | Gong | H04N 7/0137 |
| | | | | 345/428 |
| 9,076,238 | B2 * | 7/2015 | Wu | G06T 5/50 |
| 9,117,290 | B2 * | 8/2015 | Jung | G06T 5/005 |
| 2002/0087955 | A1 | 7/2002 | Ronen et al. | |
| 2002/0149687 | A1 * | 10/2002 | Jaspers | G06T 3/4015 |
| | | | | 348/273 |
| 2003/0005012 | A1 | 1/2003 | Steele, Jr. | |
| 2003/0118251 | A1 * | 6/2003 | Hamza | G06T 3/0093 |
| | | | | 382/308 |
| 2005/0013467 | A1 * | 1/2005 | McNitt | A63B 24/0003 |
| | | | | 382/107 |
| 2005/0240930 | A1 | 10/2005 | Amamiya et al. | |
| 2005/0243103 | A1 * | 11/2005 | Rudolph | G06T 3/0093 |
| | | | | 345/647 |
| 2005/0276455 | A1 * | 12/2005 | Fidrich | G06T 7/12 |
| | | | | 382/128 |
| 2006/0098168 | A1 * | 5/2006 | McDowall | G03B 21/10 |
| | | | | 353/70 |
| 2006/0227222 | A1 * | 10/2006 | Jaspers | G06T 3/4015 |
| | | | | 348/222.1 |
| 2007/0094477 | A1 | 4/2007 | Espasa et al. | |
| 2008/0059758 | A1 | 3/2008 | Sachs | |
| 2008/0183448 | A1 * | 7/2008 | Itoh | G06F 17/5009 |
| | | | | 703/7 |
| 2008/0209437 | A1 | 8/2008 | Emma | |
| 2009/0083490 | A1 | 3/2009 | Berger et al. | |
| 2009/0187717 | A1 | 7/2009 | Nasu | |
| 2010/0070741 | A1 | 3/2010 | Col et al. | |
| 2010/0077177 | A1 * | 3/2010 | Luick | G06F 9/30036 |
| | | | | 712/28 |
| 2010/0253849 | A1 * | 10/2010 | Kegasawa | G06T 1/20 |
| | | | | 348/584 |
| 2010/0299505 | A1 | 11/2010 | Uesugi | |
| 2011/0307684 | A1 | 12/2011 | Kreinin et al. | |
| 2013/0346729 | A1 | 12/2013 | Barowski et al. | |
| 2014/0023289 | A1 * | 1/2014 | Jung | G06T 5/30 |
| | | | | 382/257 |
| 2014/0025930 | A1 * | 1/2014 | Lee | G06F 12/084 |
| | | | | 712/205 |
| 2014/0047221 | A1 | 2/2014 | Irwin et al. | |
| 2014/0149719 | A1 | 5/2014 | Tabaru | |
| 2014/0168511 | A1 * | 6/2014 | Gong | H04N 7/0137 |
| | | | | 348/441 |
| 2014/0189309 | A1 | 7/2014 | Hughes et al. | |
| 2014/0331101 | A1 | 11/2014 | Chung et al. | |
| 2014/0351825 | A1 | 11/2014 | Xu et al. | |
| 2015/0055839 | A1 * | 2/2015 | Wu | G06T 5/50 |
| | | | | 382/131 |
| 2017/0244427 | A1 * | 8/2017 | Maunder | H03M 13/1575 |

FOREIGN PATENT DOCUMENTS

| | | |
|---|---|---|
| EP | 2725497 A1 | 4/2014 |
| WO | 2000/68777 A | 11/2000 |
| WO | 2012/031177 A1 | 3/2012 |
| WO | 2012/138952 A1 | 10/2012 |
| WO | 2013/101010 A1 | 7/2013 |
| WO | 2014/025691 A1 | 2/2014 |
| WO | 2014/105126 A1 | 7/2014 |
| WO | 2014/205590 A1 | 12/2014 |
| WO | 2016/124242 A1 | 8/2016 |
| WO | 2016/199154 A1 | 12/2016 |

OTHER PUBLICATIONS

Berg, Thomas B., "Maintaining I/O Data Coherence in Embedded Multicore Systems", IEEE MICRO, 2009, pp. 10-19.

Hayes et al., "VSR Sort: A Novel Vectorised Sorting Algorithm & Architecture Extensions for Future Microprocessors", IEEE, 2015, pp. 26-38.

Hu et al., "Using Dynamic Binary Translation to Fuse Dependent Instructions", IEEE, Proceedings of the International Symposium on Code Generation and Optimization (CGO'04), 2004, pp. 1-12.

Huang et al., "Revisit of View-Oriented Parallel Programming", Seventh IEEE International Symposium on Cluster Computing and the Grid (CCGrid'07), 2007, 6 pages.

International Search Report and Written Opinion received for PCT Application No. PCT/IL2016/050614, dated Aug. 11, 2016, 39 pages.

(56) References Cited

OTHER PUBLICATIONS

Kakoee et al., "A Multi-banked Shared-L1 Cache Architecture for Tightly Coupled Processor Clusters", IEEE, 2012, 5 pages.
Lhuillier et al., "HARS: A Hardware-Assisted Runtime Software for Embedded Many-Core Architectures", ACM Transactions on Embedded Computing Systems, vol. 13, No. 3s, Article 102, Mar. 2014, pp. 102:01-102:25.
Rosten et al., "Fusing Points and Lines for High Performance Tracking", Proceedings of Tenth IEEE International Conference on Computer Vision, 2005, 8 pages.
Rosten et al., "Machine Learning for High-Speed Corner Detection", European Conference on Computer Vision, 2006, pp. 1-14.
Glasbey C,A., Mardia K.V., "A review of image warping methods", Journal of Applied, Statistics, 25, 155-171, 1998.

\* cited by examiner

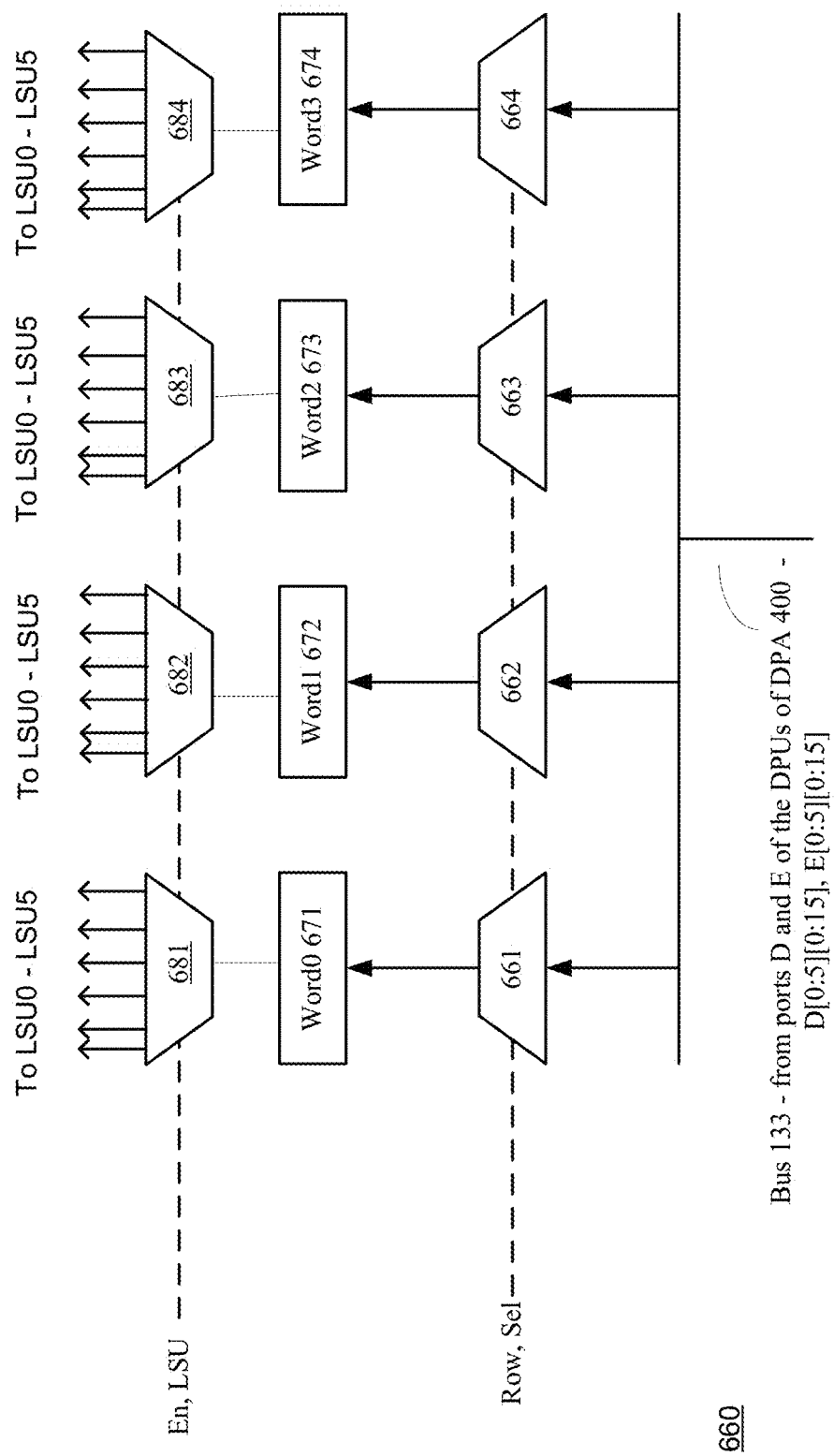

Data Select Coding – first part

D# and E# denote the output D and E of the DPU[row, #], where 'row' is the row select from the current selected instruction, and D'# the output D of DPU[row + #].

Data select store buffer- part 2
D# and E# denote the output D and E of the DPU[row, #], where 'row' is the row select from the current selected instruction, and D'# the output D of DPU[row + 1, #].

ARRAY OF PROCESSING UNITS OF AN IMAGE PROCESSOR AND METHODS FOR CALCULATING A WARP RESULT

CROSS REFERENCE TO RELATED APPLICATIONS

This application claims priority from U.S. provisional patent Ser. No. 62/173,389 filing date Jun. 10, 2015; U.S. provisional patent Ser. No. 62/173,392 filing date Jun. 10, 2015; U.S. provisional patent Ser. No. 62/290,383 filing date Feb. 2, 2016; U.S. provisional patent Ser. No. 62/290,389 filing date Feb. 2, 2016; U.S. provisional patent Ser. No. 62/290,392 filing date Feb. 2, 2016; U.S. provisional patent Ser. No. 62/290,395 filing date Feb. 2, 2016; U.S. provisional patent Ser. No. 62/290,400 filing date Feb. 2, 2016; U.S. provisional patent Ser. No. 62/293,145 filing date Feb. 9, 2016; U.S. provisional patent Ser. No. 62/293,147 filing date Feb. 9, 2016; and U.S. provisional patent 62/293,908 filing date Feb. 11, 2016 all being incorporated herein by reference in their entirety.

BACKGROUND

During the last few years camera based driver assistance systems (DAS) have been entering the market and vast efforts are made to develop an autonomous car. DAS include lane departure warning (LDW), Automatic High-beam Control (AHC), pedestrian recognition, and forward collision warning (FCW). These driver assistance systems may use real time image processing of multiple patches detected in multiple image frames captured from a camera mounted in a vehicle.

There is a growing need to provide a high throughput low footprint image processor for supporting DAS and/or autonomous cars.

SUMMARY

There are provided systems, methods, as illustrated in the claims and the specification.

Any combination of any subject matter of any claim may be provided.

Any combination of any method and/or method step disclosed in any figure and/or in the specification may be provided.

Any combination of any unit, device, and/or component disclosed in any figure and/or in the specification may be provided. Non-limiting examples of such units include a gather unit, an image processor and the like.

Any combination of the methods and/or method steps of originally filed claims may be provided.

Any combination of any of the image processors and/or image processor components of originally filed claims may be provided.

Any combination of the any of the image processor claims in originally filed claims and/or any processing module may be provided.

According to an embodiment of the invention there may be provided a method of calculating warp results, the method may include executing, for each target pixel out of a group of target pixels, a warp calculation process that may include receiving, by a first group of processing units of an array of processing units, a first weight and a second weight associated with the target pixel; receiving, by a second group of processing units of the array, values of neighboring source pixels associated with the target pixel; calculating, by the second group, a warp result based on in response to values of the neighboring source pixels and the pair of weights; and providing the warp result to a memory module.

The calculating of the warp result may include relaying values of some of the neighboring source pixels between processing units of the second group.

The calculating of the warp result may include relaying intermediate results calculated by the second group and values of some of the neighboring source pixels between processing units of the second group.

The calculating of the warp result may include calculating, by a first processing unit of the second group, a first difference between a first pair of neighboring source pixels and a second difference between a second pair of neighboring source pixels; providing the first difference to a second processing unit of the second group; and providing the second difference to a third processing unit of the second group.

The calculating of the warp result further may include calculating, by a fourth processing unit of the second group, a first modified weight in response to the first weight; providing the first modified weight from the fourth processing unit to the second processing unit of the second group; calculating, by the second processing unit of the second group, a first intermediate result based on the first difference, a first neighboring source pixel and the first modified weight.

The calculating of the warp result further may include providing the second difference from the third processing unit of the second group to a sixth processing unit of the second group; providing a second neighboring source pixel from a fifth processing unit of the second group to the sixth processing unit of the second group; and calculating, by the sixth processing unit of the second group, a second intermediate result based on the second difference, the second neighboring source pixel and the first modified weight.

The calculating of the warp result further may include providing the second intermediate result from the sixth processing unit of the second group to a seventh processing unit of the second group; providing the first intermediate result from the second processing unit of the second group to the seventh processing unit of the second group; and calculating, by the seventh processing unit of the second group, a third intermediate result based on to the first and second intermediate results.

The calculating of the warp result further may include providing the third intermediate result from the seventh processing unit of the second group to an eighth processing unit of the second group; providing the second intermediate result from the sixth processing unit of the second group to a ninth processing unit of the second group; providing the second intermediate result from the ninth processing unit of the second group to the eighth processing unit of the second group; providing the second modified weight from the third processing unit of the second group to an eighth processing unit of the second group; and calculating the warp result, by the eighth processing unit of the second group, based upon the second and third intermediate results and the second modified weight.

The method may include executing, by the array, multiple warp computing processes associated with a subgroup of target pixels in parallel.

The method may include fetching, from a gather unit, neighboring source pixels associated with each target pixel of the subgroup of pixels in parallel; wherein the gather unit may include a set associate cache and may be arranged to access a memory module that may include multiple independently accessible memory banks.

The method may include receiving for each target pixel of the subgroup of pixels, first and second warp parameters; wherein the first and second warp parameters may include the first and second weights and location information indicative of a location of the neighboring source pixels associated with the target pixel.

The method may include providing to the gather unit, the location information for each target pixel of the subgroup of pixels.

The method may include converting, by the gather unit, the location information to addresses of the neighboring source pixels.

The method may include calculating, by a third group of processing units of the array, and for each target pixel of the subgroup of pixels, first and second warp parameters; wherein the first and second warp parameters may include the first and second weights and location information indicative of a location of the neighboring source pixels associated with the target pixel.

The method sensing, from the third group to the first group the first and second weights.

The method may include providing to the gather unit, the location information for each target pixel of the subgroup of pixels.

The method may include converting, by the gather unit, the location information to addresses of the neighboring source pixels.

According to an embodiment of the invention there may be provided a method for calculating warp results, the method may include concurrently receiving, by a first group of processing units of an array of processing units, and for each target pixel of a subgroup of pixels, a first weight and a second weight; concurrently providing, to a gather unit, for each target pixel out of the subgroup of pixels, location information indicative of a location of the neighboring source pixels associated with the target pixel; concurrently receiving, by the array and from the gather unit, neighboring source pixels associated with each target pixel out of a subgroup of pixels; wherein different groups of the array receive neighboring source pixels associated with different target pixels of the subgroup of pixels; and concurrently calculating, by the different groups of the array; warp results related to the different target pixels.

The method may include receiving or calculating, for each target pixel of the subgroup of pixels, first and second warp parameters; wherein the first and second warp parameters may include the first and second weights and location information indicative of a location of the neighboring source pixels associated with the target pixel.

According to an embodiment of the invention there may be provided a method for calculating warp results, the method may include repeating, for each subgroup of target pixels out of a group of target pixels, the steps of receiving, by an array of processing units, neighboring source pixels associated with each target pixel of the subgroup of target pixels; and calculating, by the array, warp results for target pixels from the subgroup of target pixels; wherein the calculating may include calculating intermediate results and relaying at least some of the intermediate results between processing units of the array.

Each processing unit of the array may be directly coupled to a set of processing units of the array and may be indirectly coupled to another set of processing units of the array. The terms "processing units" and "data processors" may be used in an interchangeable manner.

According to an embodiment of the invention there may be provided an image processor that may be configured to calculate warp results, the image processor may be configured to execute, for each target pixel out of a group of target pixels, a warp calculation process that may include receiving, by a first group of processing units of an array of processing units of the image processor, a first weight and a second weight associated with the target pixel; receiving, by a second group of processing units of the array, values of neighboring source pixels associated with the target pixel; calculating, by the second group, a warp result based on in response to values of the neighboring source pixels and the pair of weights; and providing the warp result to a memory module.

According to an embodiment of the invention there may be provided an image processor that may be configured to calculate warp results, the image processor may include an array of processing units that may be configured to concurrently receive, by a first group of processing units of the array, and for each target pixel of a subgroup of pixels, a first weight and a second weight; concurrently provide, to a gather unit of the image processor, for each target pixel out of the subgroup of pixels, location information indicative of a location of the neighboring source pixels associated with the target pixel; concurrently receive, by the array and from the gather unit, neighboring source pixels associated with each target pixel out of a subgroup of pixels; wherein different groups of the array receive neighboring source pixels associated with different target pixels of the subgroup of pixels; and concurrently calculate, by the different groups of the array; warp results related to the different target pixels.

According to an embodiment of the invention there may be provided an image processor that may be configured to calculate warp results, the image processor may be configured to repeat, for each subgroup of target pixels out of a group of target pixels, the steps of receive, by an array of processing units of the image processor, neighboring source pixels associated with each target pixel of the subgroup of target pixels; and calculate, by the array, warp results for target pixels from the subgroup of target pixels; wherein the calculating may include calculating intermediate results and relaying at least some of the intermediate results between processing units of the array.

According to an embodiment of the invention there may be provided a method for calculating disparity, the method may include calculating, by a first group of data processors of an array of data processors, a set of sums of absolute differences (SADs); wherein the set of SADs may be associated with a source pixel and a subgroup of target pixels; wherein each SAD may be calculated based on previously calculated SADs and based on currently calculated absolute difference between another source pixel and a target pixel that belongs to the subgroup of target pixels; and determining, by a second group of data processors of the array, a best matching target pixel out of the subgroup of target pixels in response to values of the set of SADs.

A given SAD of the set of SADs reflects absolute differences between a given rectangular source pixel array and a given rectangular target pixel array; wherein the previously calculated SADs may include (a) a first previously calculated SAD that reflects absolute differences between (i) a rectangular source pixel array that differs from the given rectangular source pixel array by a first source pixel column and by a second source pixel column, and (ii) a rectangular target pixel array that differs from the given rectangular target pixel array by a first target pixel column and by a second target pixel column; and (b) a second previously calculated SAD that reflects absolute differences between the first source column and the first source column.

For the given SAD—the other source pixel may be a lowest source pixel of the second source pixel column and the target pixel that belongs to the subgroup of target pixels may be a lowest target pixel of the second target pixel column.

The method may include calculating the given SAD by calculating an intermediate result by subtracting, from the first previously calculated SAD, (a) the second previously calculated SAD and (b) an absolute difference between (i) a target pixel that may be positioned on top of the second target pixel column and (ii) a source pixel that may be positioned on top of the second source pixel column; and adding to the intermediate result an absolute difference between the lowest target pixel of the second target pixel column and the lowest source pixel of the second source pixel column.

The method may include storing in the array of data processors, for the given SAD, the first previously calculated SAD, the second previously calculated SAD, the target pixel that may be positioned on top of the second target pixel column and the source pixel that may be positioned on top of the second source pixel column.

The calculating of the given SAD may be preceded by fetching the lowest target pixel of the second target pixel column and the lowest source pixel of the second source pixel column.

The subgroup of target pixels may include target pixels that may be sequentially stored in a memory module; wherein the calculating of the set of SADs may be preceded by fetching the subgroup of target pixels from the memory module.

The fetching of the subgroup of target pixels from the memory module may be executed by a gather unit that may include a content addressable memory cache.

The subgroup of target pixels belong to a group of target pixels that may include multiple subgroups of target pixels; wherein the method may include repeating, for each subgroup of target pixels, the steps of calculating, by the first group of processing units, a set of SADs for each subgroup of target pixels; and finding, by the second group of data processors of the array, a best matching target pixel out of the group of target pixels in repose to values of set of SADs of every subgroup of target pixels.

The method may include calculating, by a first group of data processor of an array of data processors, multiple sets of SADs that may be associated with a plurality of source pixels and multiple subgroups of target pixels; wherein each SAD of the multiple set of SADs may be calculated based on previously calculated SADs and to a currently calculated absolute difference; and finding, by a second group of data processors of the array and for source pixel, a best matching target pixel in repose to values of SADs that may be associated with the source pixel.

The multiple set of SADs may include sub-sets of SADs, each sub-set of SADs may be associated with the plurality of source pixels and a plurality of subgroups of target pixels of the multiple subgroups of target pixels.

The plurality of source pixels may belong to a column of the rectangular array of pixels and may be adjacent to each other.

The calculating of the multiple sets of SADs may include calculating, in parallel, SADs of different sub-sets of SADs.

The method may include calculating, in sequential manner, SADs that belong to the same sub-set of SADs.

The plurality of source pixels may be a pair of source pixels.

The plurality of source pixels may be four source pixels.

The different sub-sets of SADs may be calculated by different first subgroups of data processor of the array of data processors.

The method may include calculating, in sequential manner, SADs that belong to the same sub-set of SADs; and sequentially fetching to the array of data processors target pixels related to the different SADs of the same sub-set of SADs.

According to an embodiment of the invention there may be provided an image processor that may include an array of data processors and may be configured to calculate disparity by calculating, by a first group of data processors of the array of data processors, a set of sums of absolute differences (SADs); wherein the set of SADs may be associated with a source pixel and a subgroup of target pixels; wherein each SAD may be calculated based on previously calculated SADs and based on currently calculated absolute difference between another source pixel and a target pixel that belongs to the subgroup of target pixels; and determining, by a second group of data processors of the array, a best matching target pixel out of the subgroup of target pixels in response to values of the set of SADs.

According to an embodiment of the invention there may be provided a gather unit, may include an input interface that may be arranged to receive multiple requests for retrieving multiple requested data units; a cache memory that may include multiple entries may be configured to store multiple tags and multiple cached data units; wherein each tag may be associated with a cached data unit and may be indicative of a group of memory cells of a memory module that differs from the cache memory and stores the cached data unit; an array of comparators that may be arranged to concurrently compare between the multiple tags and multiple requested memory group addresses to provide comparison results; wherein each requested memory group address may be indicative of a group of memory cells of the memory module that stores a requested data unit of the multiple requested data units; a contention evaluation unit; a controller that may be arranged to (a) classify, based on the comparison results, the multiple requested data units to cached data units that may be stored in the cache memory and uncached data units; and (b) send to the contention evaluation unit information about cached and uncached data units; wherein the contention evaluation unit may be arranged to check an occurrence of at least one contention; and an output interface that may be arranged to request any uncached data unit from the memory module in a contention free manner.

The array of comparators may be arranged to concurrently compare between the multiple tags and multiple requested memory group addresses during a single gather unit clock cycle; and wherein the contention evaluation unit may be arranged to check the occurrence of the at least one contention during a single gather unit clock cycle.

The contention evaluation unit may be arranged to re-check an occurrence of at least one contention in response to new tags of the cache memory.

The gather unit may be arranged to operate in a pipelined manner; wherein duration of each phase of the pipeline may be one gather unit clock cycle.

Each group of memory cells of a line of a memory bank out of multiple independently accessible memory banks; wherein the contention evaluation unit may be arranged to determine that a potential contention occurs when two uncached data units belong to different lines of a same memory bank.

The cache memory may be a fully associative memory cache.

The gather unit may include an address converter that may be arranged to convert location information included in the multiple requests to the multiple requested memory group addresses.

The multiple requested data units may belong to an array of data units; wherein the location information includes coordinates of the multiple requested data units within the array of data units.

The contention evaluation unit may include multiple groups of nodes; wherein each group of nodes may be arranged to evaluate a contention between the multiple requested memory group addresses and a tag of the multiple tags.

According to an embodiment of the invention there may be provided a method for responding to multiple requests for retrieving multiple requested data units, the method may include receiving, by an input interface of a gather unit, the multiple requests for retrieving multiple requested data units; storing, by a cache memory that may include multiple entries, multiple tags and multiple cached data units; wherein each tag may be associated with a cached data unit and may be indicative of a group of memory cells of a memory module that differs from the cache memory and stores the cached data unit; concurrently comparing, by an array of comparators between the multiple tags and multiple requested memory group addresses to provide comparison results; wherein each requested memory group address may be indicative of a group of memory cells of the memory module that stores a requested data unit of the multiple requested data units; classifying, by a controller, based on the comparison results, the multiple requested data units to cached data units that may be stored in the cache memory and uncached data units; and sending to the contention evaluation unit information about cached and uncached data units; checking, by the contention evaluation unit, an occurrence of at least one contention; and requesting, by an output interface, any uncached data unit from the memory module in a contention free manner.

According to an embodiment of the invention there may be provided a processing module that may include an array of data processors; wherein each data processor unit out of multiple data processors of the array of data processors may be directly coupled to some data processors of the array of data processors, may be indirectly coupled to some other data processors of the array of data processors, and may include a relay channel for relaying data between relay ports of the data processor.

The relay channel of each data processor of the multiple data processors may exhibit substantially zero latency.

Each data processor of the multiple data processors may include a core; wherein the core may include an arithmetic logic unit and a memory resource; wherein cores of the multiple data processors may be coupled to each other by a configurable network.

Each data processor of the multiple data processors may include multiple data flow components of the configurable network.

Each data processor of the multiple data processors may include a first non-relay input port that may be directly coupled to a first set of neighbors.

The first set of neighbors may be formed by data processors that may be located within a distance less than four data processors from the data processor.

The first non-relay input port of the data processor may be directly coupled to relay ports of data processors of the first set of neighbors.

The data processor further may include a second non-relay input port that may be directly coupled to non-relay ports of data processors of the first set of neighbors.

The first non-relay input port of the data processor may be directly coupled to non-relay ports of data processors of the first set of neighbors.

The first set of neighbors may be formed by eight data processors.

A first relay port of each data processor of the multiple data processors may be directly coupled to a second set of neighbors.

For each data processor of the multiple data processors, the second set of neighbors differs from the first set of neighbors.

For each data processor of the multiple data processors, the second set of neighbors may include a data processing unit that may be more distant from the data processor than any of the data processors that belong to the first set of neighbors.

The array of the processors may include, in addition to the multiple data processors, at least one other data processor.

The data processor of the array of data processors may be arranged in rows and columns.

Some data processors of each row may be coupled to each other in a cyclic manner.

Data processors of each row may be controlled by a shared microcontroller.

Each data processor of the multiple data processors may include configuration instruction registers; wherein the instructions registers may be arranged to receive configuration instructions during a configuration process and to store the configuration instructions in the configuration instruction registers; wherein data processors of a given row may be controlled by a given shared microcontroller; wherein each data processor of the given row may be arranged to receive selection information for selecting a selected configuration instruction from the given shared microcontroller and to configure, under a certain condition, the data processor to operate according to the selected configuration instruction.

The certain condition may be fulfilled when the data processor may be arranged to respond to the selection information; wherein the certain condition may be not fulfilled when the data processor may be arranged to ignore the selection information.

Each data processor of the multiple data processors may include a controller, an arithmetic logic unit, a register file and configuration instruction registers; wherein the instructions registers may be arranged to receive configuration instructions during a configuration process and to store the configuration instructions in the configuration instruction registers; wherein the controller may be arranged to receive selection information for selecting a selected configuration instruction and to configure the data processor to operate according to the selected configuration instruction.

Each data processor of the multiple data processors may include up to three configuration instruction registers.

According to an embodiment of the invention there may be provided a method for operating a processing module that may include an array of data processors; wherein the operating may include processing data by data processors of the array; wherein each data processor unit out of multiple data processors of the array of data processors may be directly coupled to some data processors of the array of data processors, may be indirectly coupled to some other data processors of the array of data processors, and relaying, using one or more relay channels of one or more data processors, data between relay ports of the data processor.

According to an embodiment of the invention there may be provided an image processor, that may include an array of data processors, first microcontrollers, a buffering unit and a second microcontroller; wherein data processors of the array may be arranged to receive, during a data processor configuration process, data processor configuration instructions; wherein the buffering unit may be arranged to receive, during a buffering unit configuration process, buffering unit configuration instructions; wherein the first microcontrollers may be arranged to control an operation of the data processors by providing data processor selection information to data processors; wherein the data processors may be arranged to select, in response to the data processor selection information, selected data processor configuration instructions, and to perform one or more data processing operation according to the selected data processor configuration instructions; wherein the second microcontroller may be arranged to control an operation of the buffering unit by providing buffering unit selection information to the buffering unit; wherein the buffering unit may be arranged to select, in response to at least a portion of the buffering unit selection information, a selected buffering unit configuration instruction, and to perform one or more buffering unit operations according to a selected buffering unit configuration instruction; and wherein a size of a data processor selection information may be a fraction of a size of a data processor configuration instruction.

The data processors of the array may be arranged in groups of data processors; wherein different groups of data processors may be controlled by different first microprocessors.

A group of data processors may be a row of data processors.

Data processors of a same group of data processors receive in parallel the same data processor selection information.

The buffering unit may include multiple groups of memory resources; wherein different groups of memory resources may be coupled to different groups of data processors.

The image processor may include second microcontrollers; wherein different second microcontrollers may be arranged to control different groups of memory resources.

The different groups of memory resources may be different groups of shift registers.

The different groups of shift registers may be coupled to multiple groups of buffers that may be arranged to receive data from a memory module.

The multiple groups of buffers may be not controlled by the second microcontrollers.

The buffering unit selection information selects connectivity between the multiple groups of memory resources and the multiple groups of data processors.

Each data processor may include an arithmetic logical unit and data flow components; wherein the data processor configuration instruction defines an opcode of the arithmetic logical unit and defines a flow of data to the arithmetic logic unit via the data flow components.

The image processor further may include a memory module that may include multiple memory banks; wherein the buffering unit may be arranged to retrieve data from the memory module and to send the data to the array of data processors.

The first microcontrollers share a program memory.

Each first microcontroller may include control registers that store a first instruction address, a number of header instructions and a number of loop instructions.

The image processor may include a memory module that may be coupled to the buffering unit; wherein the memory module may include a store buffer, load store units and multiple memory banks; wherein the store buffer may be controlled by a third microcontroller.

The store buffer may be arranged to receive, during a store buffer configuration process, store buffer configuration instructions; wherein the third microcontroller may be arranged to control an operation of the store buffer by providing store buffer selection information to the store buffer.

The image processor may include store buffers that may be controlled by third microprocessors.

The third microcontroller, the first microcontrollers and the second microcontrollers may be of a same structure.

According to an embodiment of the invention there may be provided an image processor that may include multiple configurable circuits and multiple microcontrollers; wherein the multiple configurable circuits may include memory circuits and multiple data processors; wherein each configurable circuit may be arranged to store up to a limited amount of configuration instructions; wherein the multiple microcontrollers may be arranged to control the multiple configurable circuits by repetitively providing to the multiple configurable circuits selection information for selecting by each configurable circuit a selected configuration instruction out of the limited amount of configuration instructions.

The multiple configurable circuits may include a memory module that may include multiple memory banks; and a buffering unit for exchanging data between the memory module and the data processors.

A size of the selection information does not exceed two bits.

According to an embodiment of the invention there may be provided a method for configuring an image processor that may include multiple configurable circuits and multiple microcontrollers; wherein the multiple configurable circuits may include memory circuits and multiple data processors; wherein the method may include storing, in each configurable circuit, up to a limited amount of configuration instructions; controlling, by the multiple microcontrollers, the multiple configurable circuits by repetitively providing to the multiple configurable circuits selection information for selecting by each configurable circuit a selected configuration instruction out of the limited amount of configuration instructions.

According to an embodiment of the invention there may be provided a method for operating an image processor, the method may include providing an image processor that may include an array of data processors; a memory module that may include multiple memory banks; a buffering unit; a gather unit; and multiple microcontrollers; controlling the array of data processors by the multiple microprocessors a part of the memory module and the buffering unit; retrieving, by the buffering unit data from the memory module; sending, by the buffering unit, the data to the array of data processors; receiving by the gather unit multiple requests for retrieving multiple requested data units from the memory module; sending by the gather unit to the array of data processors the multiple requested data units.

According to an embodiment of the invention there may be provided a method for configuring an image processor that may include an array of data processors, first microcontrollers, a buffering unit and a second microcontroller; wherein the method may include providing, to data processors of the array, during a data processor configuration process, data processor configuration instructions; providing to the buffering unit, during a buffering unit configuration process, buffering unit configuration instructions; controlling by the first microcontrollers an operation of the data processors by providing data processor selection information to data processors; selecting by the data processors, in response to the data processor selection information, selected data processor configuration instructions, and performing one or more data processing operation according to the selected data processor configuration instructions; controlling by the second microcontroller an operation of the buffering unit by providing buffering unit selection information to the buffering unit; selecting, by the buffering unit, in response to at least a portion of the buffering unit selection information, a selected buffering unit configuration instruction, and to performing one or more buffering unit operations according to a selected buffering unit configuration instruction; wherein a size of a data processor selection information may be a fraction of a size of a data processor configuration instruction.

According to an embodiment of the invention there may be provided a non-transitory computer readable medium that stores instructions for responding to multiple requests for retrieving multiple requested data units that once executed by a gather unit result in the execution of the steps of: receiving, by an input interface of the gather unit, the multiple requests for retrieving multiple requested data units; storing, by a cache memory that comprises multiple entries, multiple tags and multiple cached data units; wherein each tag is associated with a cached data unit and is indicative of a group of memory cells of a memory module that differs from the cache memory and stores the cached data unit; concurrently comparing, by an array of comparators between the multiple tags and multiple requested memory group addresses to provide comparison results; wherein each requested memory group address is indicative of a group of memory cells of the memory module that stores a requested data unit of the multiple requested data units; classifying, by a controller, based on the comparison results, the multiple requested data units to cached data units that are stored in the cache memory and uncached data units; and sending to the contention evaluation unit information about cached and uncached data units; checking, by the contention evaluation unit, an occurrence of at least one contention; and requesting, by an output interface, any uncached data unit from the memory module in a contention free manner According to an embodiment of the invention there may be provided a non-transitory computer readable medium that stores instructions for operating a processing module that once executed by the processing module result in the execution of the steps of: processing data by data processors of an array of data processors of the processing module; wherein each data processor unit out of multiple data processors of the array of data processors is directly coupled to some data processors of the array of data processors, is indirectly coupled to some other data processors of the array of data processors, and relaying, using one or more relay channels of one or more data processors, data between relay ports of the data processor.

According to an embodiment of the invention there may be provided a non-transitory computer readable medium that stores instructions for configuring an image processor that comprises multiple configurable circuits and multiple microcontrollers; wherein the multiple configurable circuits comprise memory circuits and multiple data processors, wherein the instructions once executed by the image processor result in the execution of the steps of: storing, in each configurable circuit, up to a limited amount of configuration instructions; controlling, by the multiple microcontrollers, the multiple configurable circuits by repetitively providing to the multiple configurable circuits selection information for selecting by each configurable circuit a selected configuration instruction out of the limited amount of configuration instructions.

A non-transitory computer readable medium that stores instructions for operating an image processor that comprises an array of data processors; a memory module that comprises multiple memory banks; a buffering unit; a gather unit; and multiple microcontrollers; wherein an execution of the by the image processor results in the execution of the steps of: sending, by the buffering unit, the data to the array of data processors; receiving by the gather unit multiple requests for retrieving multiple requested data units from the memory module; sending by the gather unit to the array of data processors the multiple requested data units.

A non-transitory computer readable medium that stores instructions for configuring an image processor that comprises an array of data processors, first microcontrollers, a buffering unit and a second microcontroller; wherein the multiple configurable circuits comprise memory circuits and multiple data processors, wherein the instructions once executed by the image processor result in the execution of the steps of: providing, to data processors of the array, during a data processor configuration process, data processor configuration instructions; providing to the buffering unit, during a buffering unit configuration process, buffering unit configuration instructions; controlling by the first microcontrollers an operation of the data processors by providing data processor selection information to data processors; selecting by the data processors, in response to the data processor selection information, selected data processor configuration instructions, and performing one or more data processing operation according to the selected data processor configuration instructions; controlling by the second microcontroller an operation of the buffering unit by providing buffering unit selection information to the buffering unit; selecting, by the buffering unit, in response to at least a portion of the buffering unit selection information, a selected buffering unit configuration instruction, and to performing one or more buffering unit operations according to a selected buffering unit configuration instruction; wherein a size of a data processor selection information is a fraction of a size of a data processor configuration instruction.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 illustrates a store buffer according to an embodiment of the invention;

FIGS. 9 and 10 illustrate instructions Row,Sel according to an embodiment of the invention;

FIG. 24 illustrates a first subgroup source pixels, a first subgroup target pixels, a second subgroup of source pixels and a second subgroup of target pixels;

DETAILED DESCRIPTION OF THE DRAWINGS

Figure 1:
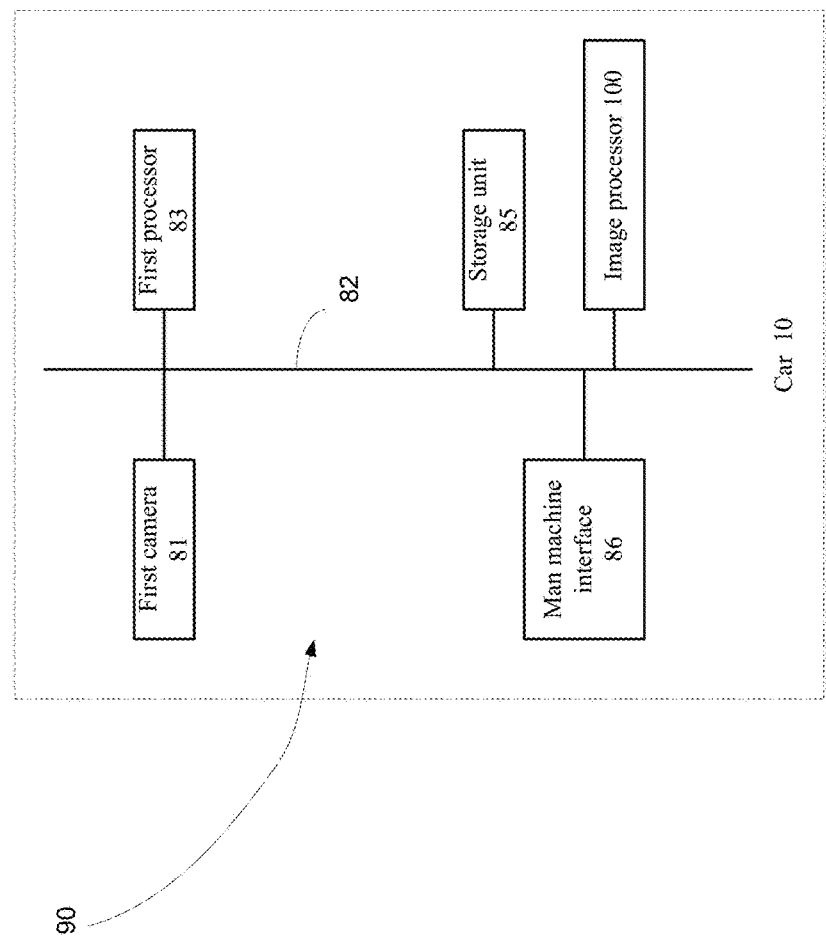
FIG. 1 illustrates a system according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method. For example, any method steps may be executed by a system. The system in this sense may be an image processor, a gather unit or any component of the image processor. There may be provided a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device. For example, there may be provided a method and/or method steps executed by the image processor described in any one of the claims. For example, there may be provided a method and/or method steps executed by the image processor described in any one of the claims.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

A pixel may be a picture element obtained by a camera, may be a processed picture element.

The terms "row" and "line" are used in an interchangeable manner.

The term car is used as a non-limiting example of a vehicle.

For brevity of explanation some figures and some of the following text include numerical examples (such as width of a bus, number of memory lines, number of registers, length of registers, size of data units, size of instructions, number of components per unit or module, number of microprocessors, number of data processors per row and/or column of an array). Every numerical example is merely a non-limiting example.

FIG. 1 illustrates a system 90 according to an embodiment of the invention.

System 90 may be a DAS, a part of an autonomous car control module, and the like.

The system 90 may be installed in car 10. At least some of the components of the system 90 are within the vehicle.

System 90 may include first camera 81, first processor 83, storage unit 85, man machine interface 86 and image processor 100. These components may be coupled to each other via bus or network 82 or by any other arrangement.

The system 90 may include additional cameras and/or additional processors and/or additional image processors.

First processor 83 may determine which task should be executed by the image processor 100 and instruct the image processor 100 to operate accordingly.

It is noted that image processor 100 may be a part of the first processor 83 and that it may be a part of any other system.

The man machine interface 86 may include a display, a speaker, one or more light emitting diodes, a microphone or any other type of man machine interface. The man machine interface may communicate with a mobile device of the driver of the car, with the multimedia systems of the car, and the like.

Figure 2:
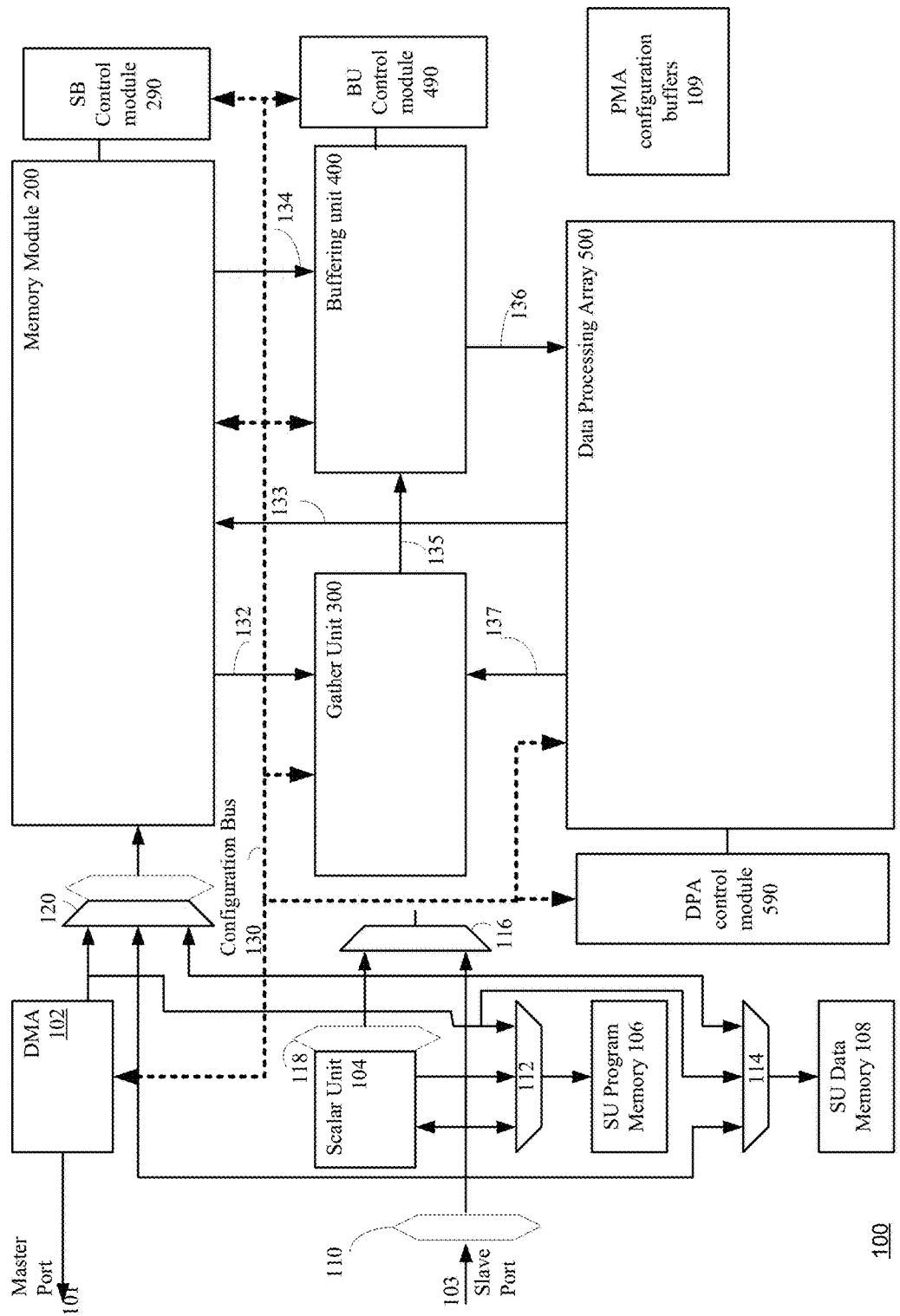
FIG. 2 illustrates an image processor according to an embodiment of the invention.

FIG. 2 illustrates image processor 100 according to an embodiment of the invention.

Master port 101 and slave port 103 provide an interface between image processor 100 and any other component of system 90.

Image processor 100 includes:
1) Direct memory access (DMA) for accessing an external memory resource such as storage unit 85.
2) A controller such as but not limited to scalar unit 104.
3) Scalar unit (SU) program memory 106.
4) Scalar unit (SU) data memory 108.
5) Memory module (MM) 200.
6) MM control unit 290.
7) Gather unit (GU) 300.
8) Buffering unit (BU) 400.
9) BU control unit 490.
10) Data processing array (DPA) 500. The data processing array is also referred to as PMA.
11) DPA control unit 590.
12) Configuration bus 130.
13) Multiplexers and buffers 110, 112, 114, 116, 118, 120.
14) Busses 132, 133, 134, 135, 136 and 137.
15) PMA status and configuration buffers 109

Figure 4:
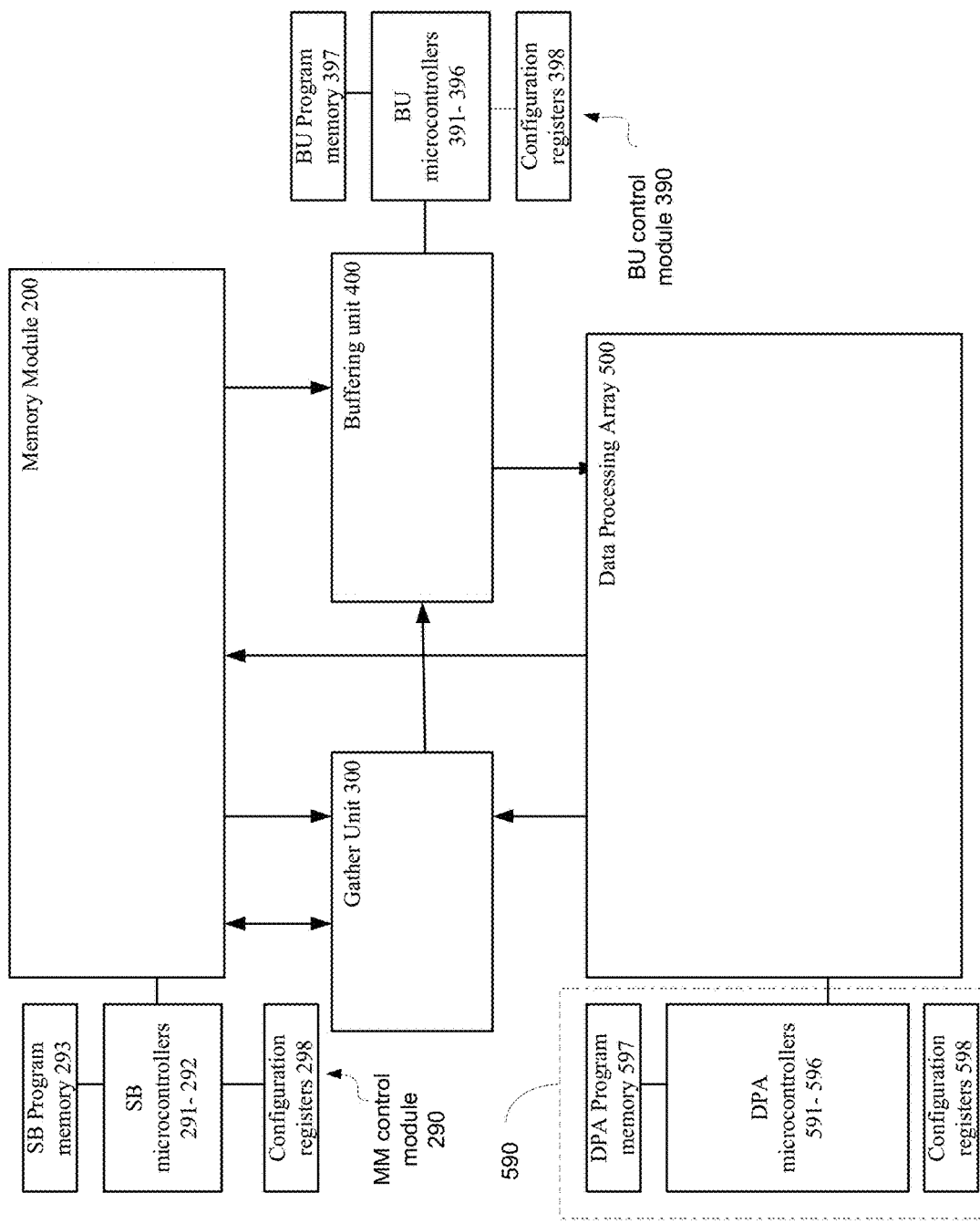
FIG. 4 illustrates a portion of an image processor according to an embodiment of the invention.

Image processor 100 also includes multiple microcontrollers. For brevity of explanation these microcontrollers are illustrated in FIG. 4.

DMA 102 is coupled to multiplexers 112, 114 and 120. Scalar unit 104 is coupled to buffer 118 and to multiplexer 112. Buffer 118 is coupled multiplexer 116. Buffer 110 is coupled to multiplexers 112, 116 and 114. Multiplexer 112 is coupled to SU program memory 106. Multiplexer 114 is coupled to SU data memory 108.

Memory unit 200 is coupled to gather unit 300 via (unidirectional) bus 132, is coupled via (unidirectional) bus 134 to buffering unit 400 and is coupled via (unidirectional) bus 133 to DPA 500.

Gather unit 300 is coupled via (unidirectional) bus 135 to buffering unit 400 and via (unidirectional) bus 137 to DPA 500. Buffering unit 400 is coupled to DPA 500 via (unidirectional) bus 136.

The units of the image processor may be coupled to each other by other buses, by additional of fewer buses, by interconnects and/or networks, by busses of other widths and directionality, and the like.

It is noted that gather unit 300, buffering unit 400, DPA 500, memory module 200, scalar unit 104, SU program memory 106, SU data memory 108 and any other multiplexer and/or buffer of FIG. 2 may be coupled to each other in other manners, by additional and/or other buses, network, meshes, and the like.

Scalar unit 104 may control the execution of tasks by other components of the image processor 100. Scalar unit 104 may receive instructions (for example from first processor 83 of FIG. 1) which tasks to execute and may fetch the relevant instructions from SU program memory 106.

The scalar unit 104 may determine which programs will be executed by microcontrollers within SB control unit 290, BU control unit 490 and DPA control unit 590.

The programs executed by the microcontrollers of SB control unit 290 control store buffers (not shown) of memory module 200. The programs executed by the microcontrollers of BU control unit 490 controls the buffer unit 400. The programs executed by the microcontrollers of DPA control unit 590 control data processing units of DPA 500.

Any of said microcontrollers may control any module or unit by providing short selection information (for example 2-3 bits, less than a byte or any number of bits that is smaller than the number of bits of the selected configuration instruction) for selecting the configuration instructions already stored in the controlled module or unit. This allows to reduce the traffic and to perform fast configuration changes (as the configuration changes may require to select between different configuration registers already stored in the relevant units or modules.

It should be noted that the number of control units and their allocation between components of the image processor may differ from those illustrated in FIG. 2.

Memory module 200 is the highest level memory resource of image processor 100. Buffering unit 400 and gather unit 300 are lower level memory resources of the image processor 100 and may be configured to fetch data from the memory module 200 and provide the data to the DPA 500. DPA 500 may send data directly to memory module 200.

DPA 500 includes multiple data processors and is arranged to perform computational tasks such as but not limited to image processing algorithms. Non-limiting examples of image processing algorithms include a warp algorithm, disparity, and the like.

Gather unit 300 includes a cache memory. Gather unit 300 is configured to receive from DPA 500 requests to fetch multiple data units (such as pixels) and to fetch the requested pixels—from the cache memory or from memory unit. The Gather unit 300 may operate in a pipelined manner and have a limited number (for example three) of pipeline stages of a very low latency—for example one (or less than five or ten) clock cycles. As indicated below—the gather unit may also fetch data units in additional modes—while using an address generator of the memory module to fetch information.

Buffering unit 400 is configured to act as a buffer of data between the memory module 200 and the DPA 500. The buffering unit 400 may be arranged to provide data in parallel to multiple data processors of the DPA 500.

Configuration bus 130 is coupled to DMA 102, memory module 200, gather unit 300, buffering unit 400 and DPA 500.

DPA 500 exhibits an architecture that may support parallel and pipeline implementation. It exhibits a flexible connectivity, enables to connect almost every data processing unit (DPU) to every DPU.

Figure 3:
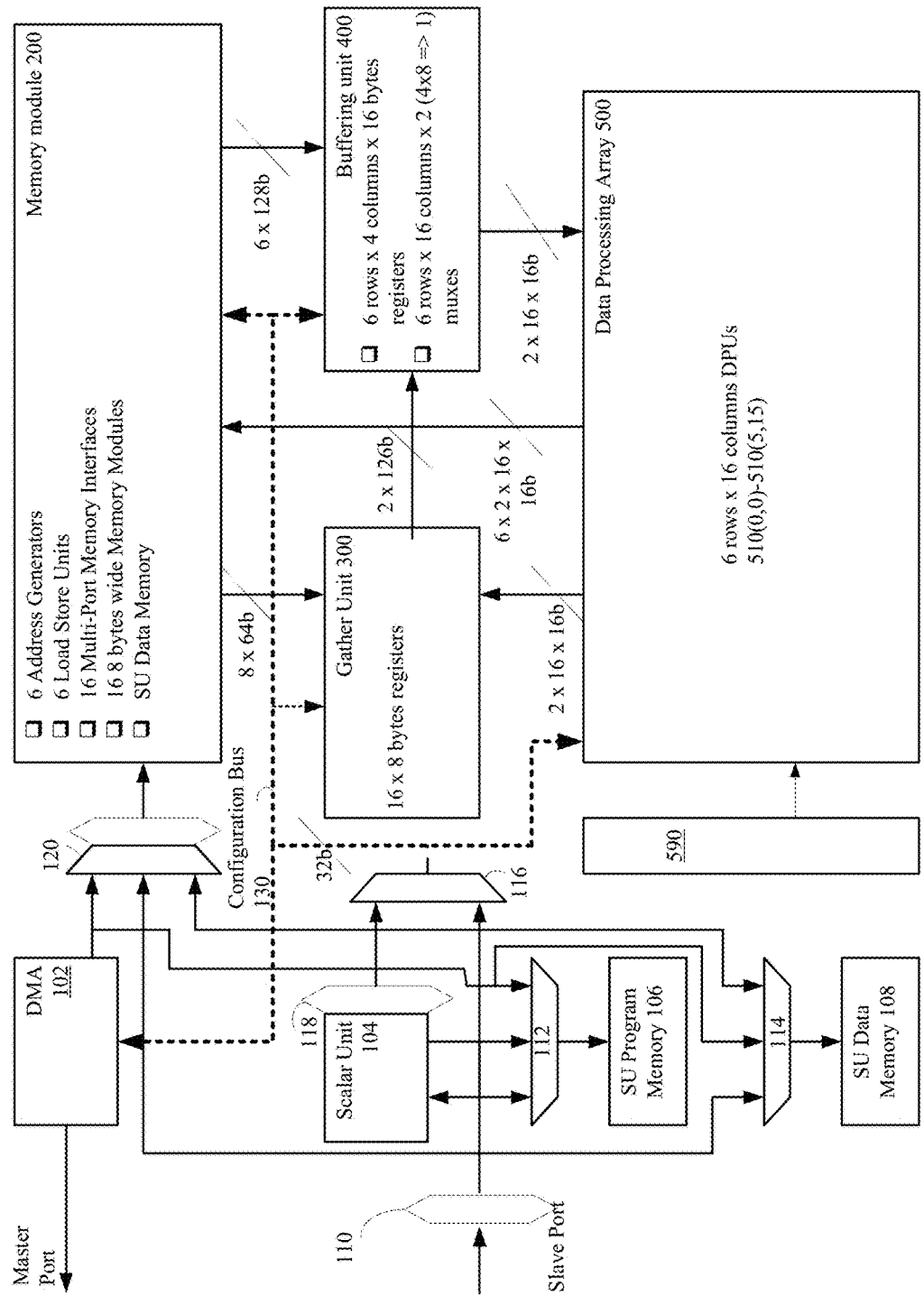
FIG. 3 illustrates an image processor according to an embodiment of the invention.

The units of image processor 100 are controller by compact microprocessors that may perform zero delay loop and can implement nested loops FIG. 3 illustrates image processor 100 according to an embodiment of the invention.

FIG. 3 provides non-limiting examples of the width of various buses and of the content of the memory module 200, gather unit 300, buffering unit 400 and DPA 500.

DPU 500 may include 6 rows by six columns of data processing units (DPU) 510(0,0)-510(5,15).

Configuration bus 130 is 32 byte wide.
Bus 132 is 8×64 byte wide.
Bus 134 is 6×128 byte wide.
Bus 135 is 2×128 byte wide.
Bus 137 is 2×16×16 byte wide.
Bus 133 is 6×2×16×16 byte wide.
Bus 136 is 2×16×16 byte wide.

Memory module 200 is illustrated as including address generators, 6 load store units, 16 multi-port memory interfaces, and 16 independently accessible memory banks of 8 byte lines.

Gather unit 300 includes a cache memory that includes 18 registers of 8 bytes each.

The buffering unit 400 includes six rows by 4 columns of 16 byte registers, and 6 rows by 16 columns of 2:1 multiplexers.

FIG. 4 illustrates a portion of image processor 100 according to an embodiment of the invention.

Two store buffers of memory module 200 can be controlled by SB control unit 290. SB control unit 290 may include SB program memory 292 and SB microcontrollers 291 and 292. The SB program memory 293 stores instructions to be executed by SB microcontrollers 291 and 292. SB microcontrollers 291 and 292 may be fed (through configuration bus 130 and/or by scalar unit 104) by information (stored in configuration registers 298) that indicated which instructions (out of the instructions stored in SB program memory 293) to execute.

The different register rows of buffering unit 400 can be controlled by BU control unit 490. BU control unit 490 may include BU program memory 497, configuration registers 498 and BU microcontrollers 491-496.

The BU program memory 297 stores instructions to be executed by BU microcontrollers 491-496. BU microcontrollers 491-496 may be fed (through configuration bus 130 and/or by scalar unit 104) by information (stored in configuration registers 498) that indicated which instructions (out of the instructions stored in BU program memory 497) to execute.

The different rows of DPUs of DPA 500 can be controlled by DPA control unit 590. DPA control unit 590 may include DPA program memory 597, configuration registers 598 and DPA microcontrollers 591-596.

The DPA program memory 297 stores instructions to be executed by DPA microcontrollers 591-596. DPA microcontrollers 591-596 may be fed (through configuration bus 130 and/or by scalar unit 104) by information that indicated which instructions (out of the instructions stored in DPA program memory 597) to execute.

It is noted that the microcontroller may be grouped in other manners. For example there may be one microprocessor group, two, three or more than three microprocessor groups.

Figure 5:
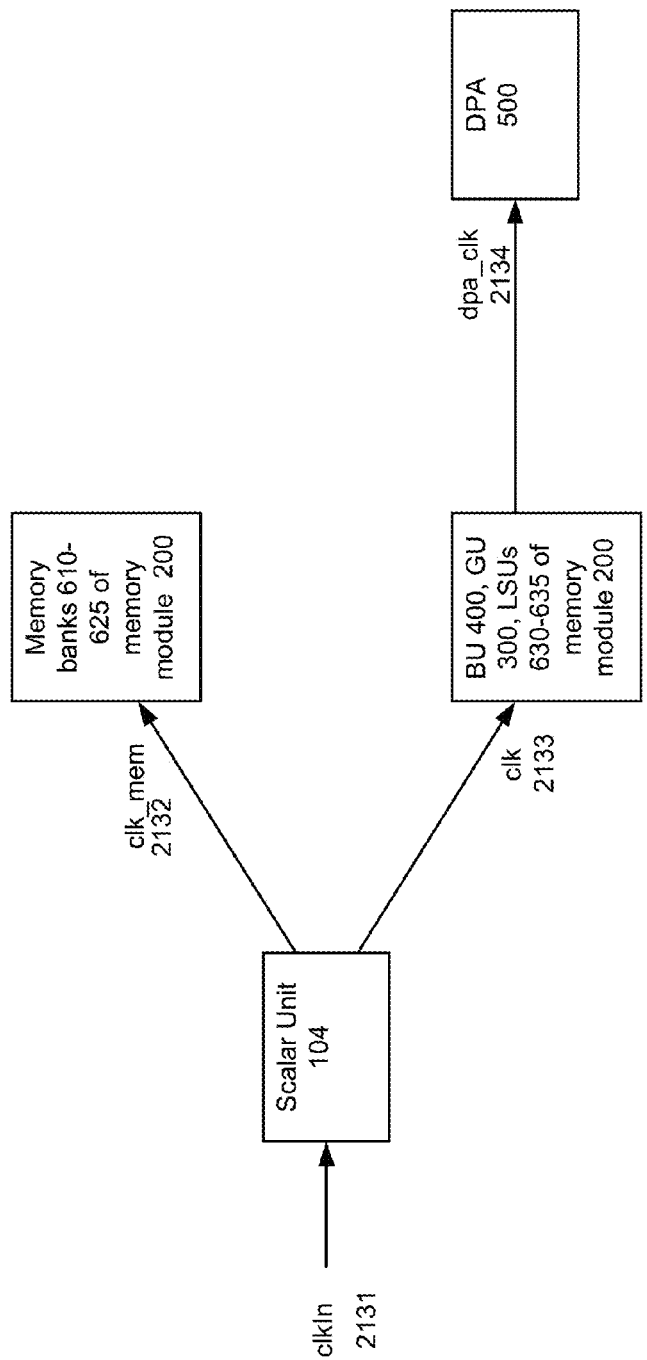
FIG. 5 illustrates a clock tree according to an embodiment of the invention.

FIG. 5 illustrates a clock tree according to an embodiment of the invention.

An input clock signal 2131 is fed to scalar unit 104. Scalar unit sends clk_mem 2132 to memory banks 610-625 of memory module and clk 2133 to buffering unit 400, gather unit 300 and load store units (LSUs) 630-635 of memory module 200. Clk 2133 is converted to dpa_clk 2134 which is sent to DPA 500.

Memory Module

Figure 6:
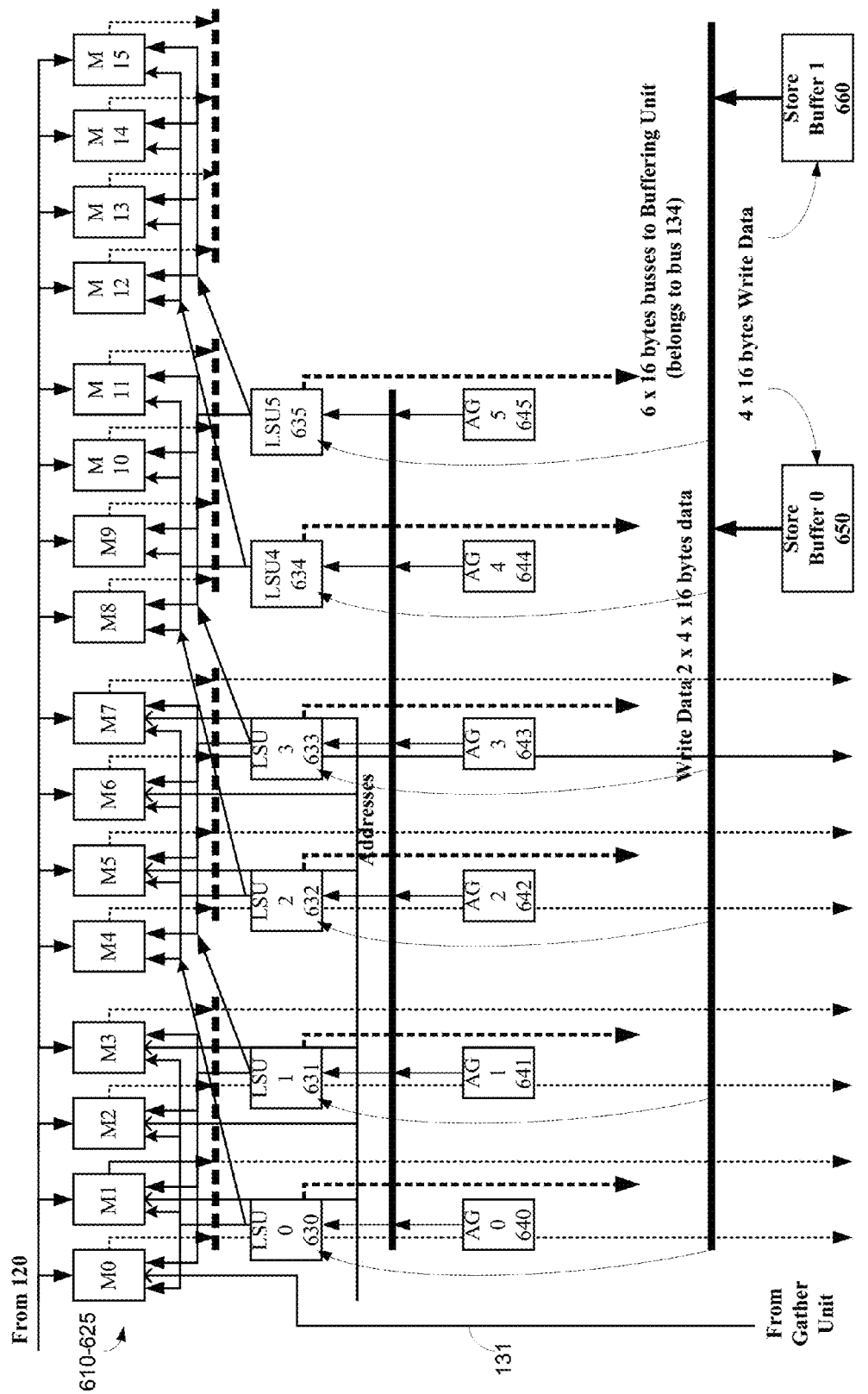
FIG. 6 illustrates a memory module according to an embodiment of the invention.
Figure 7:
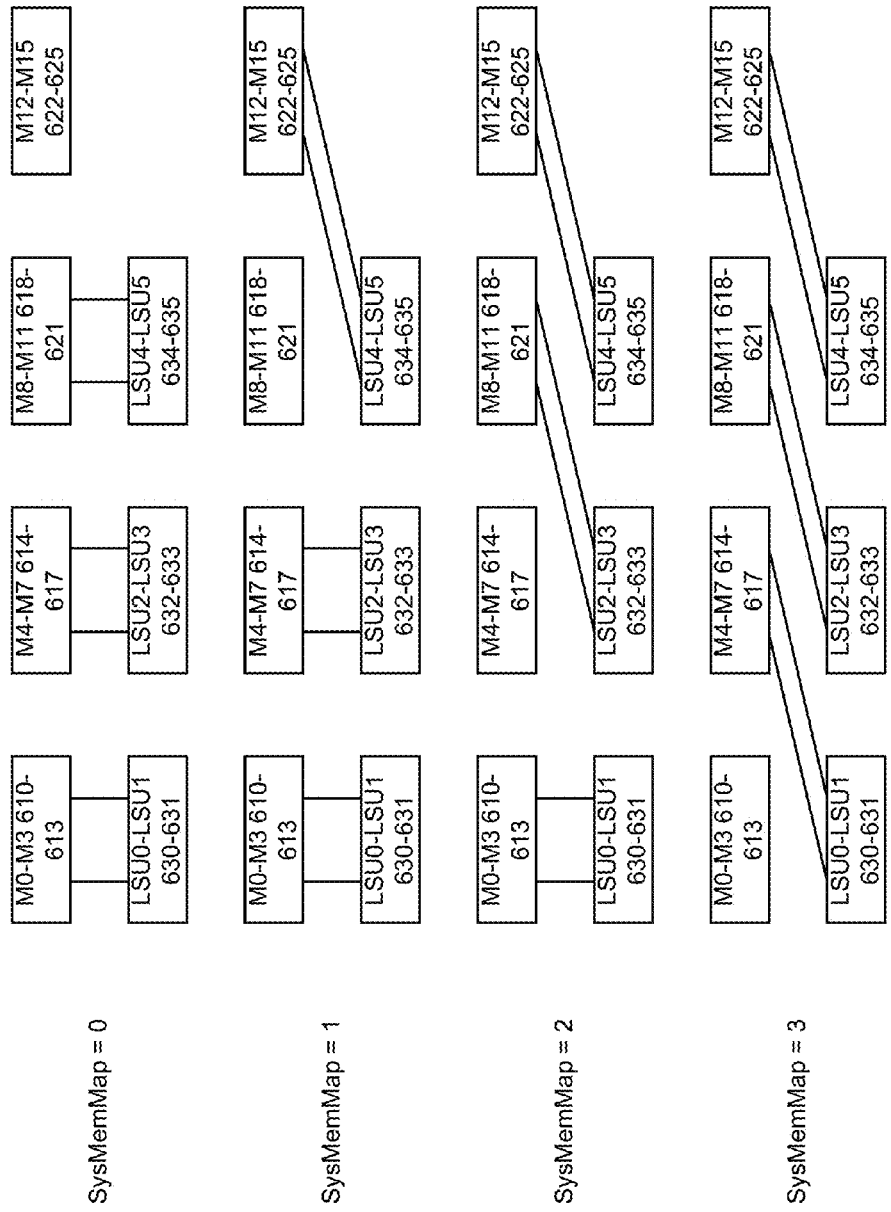
FIG. 7 illustrates a mapping between LSUs of the memory module and memory banks of the memory module according to an embodiment of the invention.

FIG. 6 illustrates memory module 200 according to an embodiment of the invention. FIG. 7 illustrates mapping between LSUs of the memory module and memory banks of the memory module according to an embodiment of the invention.

Memory module 200 includes sixteen independently accessible memory banks M0-M15 610-625, six load store units LSU0-LSU5 630-625, size address generators AG0-AG5 640-645 and two store buffers 650 and 660.

Memory banks M0-M15 610-625 are eight byte wide (have lines of 64 bits each) and include 1K lines to provide a total memory size of 96 KB. Each memory bank may include (or may be coupled to) a multi-port memory interface for arbitrating between requests that are sent to the memory bank.

In FIG. 6 there are four clients that are coupled to each memory bank (four arrows) and the multi-port memory interface has to arbitrate between access requests that appear on these four inputs.

The multi-port memory interface may apply any arbitration scheme. For example it may apply priority based arbitration.

Each LSU can select one out of 6 addresses from the address generators, and is connected to 4 memory banks, and may access 16 bytes (from 2 memory banks) per access, such that, the 6 LSUs can access 12 of the 16 memory banks at a time.

FIG. 7 illustrates the mapping between different values of a control signal SysMemMap and the mapping between LSUs 630-635 and memory banks M0-M15 610-625.

FIG. 6 illustrates that memory module 200 outputs data units to gather unit by eight eight-byte wide busses (pars of bus 132) and outputs data units to buffering unit via six sixteen bytes wide busses (part of bus 134).

Each address generator of AG0-AG5 640-645 may implements a four dimensional (4D) iterator by using the following variables and registers:

Baddr defines the Base address in the memory bank.

'W'Direction—variable wDepth defines the distance in bytes of one step in the W direction. Variable wCount defines W counter max value—when reaching this value, the zCounter is incremented, and wCounter is cleared.

'Z' Direction—zArea defines the distance in bytes of one step in Z direction, variable zCount defines Z counter max value. When reaching this value, the X counter is incremented, and Z counter is cleared.

'X' Direction—variable xStep defines the step (can be 1, 2, 4, 8 or 16 bytes). Variable xCount defines the X counter max value before next 'Y'

'Y' Direction—variable stride defines the distance in bytes between start of consecutive 'lines'. Variable yCount defines Y counter max value.

When all the counters reach their max value, a stop condition is generated.

The generated address is: Addr=BAddr+wCount*wDepth+xcounter*xstep+ycounter*Stride+zcounter*Area The variables are stored in registers that may be configured through the configuration bus 130.

The following is an example of the configuration map of the address generators:

| Displacement | Size | Register | Description |
|---|---|---|---|
| 0 × 400 | 4B | | Reserved |
| 0 × 404 | 4B | ag_AddReg | Base and Current Address |
| 0 × 408 | 4B | ag_wCount | W direction max counter |
| 0 × 40C | 4B | ag_wDepth | W direction step (depth) |
| 0 × 410 | 4B | ag_zCount | Z direction max counter |
| 0 × 414 | 4B | ag_xzCount | X and Z direction max counter |
| 0 × 418 | 4B | ag_zArea | Z direction step (area) |
| 0 × 41C | 4B | ag_xCount | X direction max counter |
| 0 × 420 | 4B | ag_xStep | X direction step (modulo 8) |
| 0 × 424 | 4B | ag_yCount | Y direction max counter |
| 0 × 428 | 4B | ag_Stride | Y direction step (stride) |
| 0 × 42C | 4B | ag_DlySz | [7:0] Delay: Number of dummy Accesses before real ones [9:8] Size: 0:2B, 1:4B, 2:8B, 3:16B |
| 0 × 430 | 16B | | Reserved |

The store may also write at sizes that differ from 2, 4, 8 and 16 Bytes.

Each LSU can perform Load/Store operations from/to 2 memory banks (16 bytes) out of 4 memory banks connected.

The memory banks accessed may depend on a selected mapping (see, for example FIG. 7) and the address.

The data to be stored is prepared in one of store buffers 650 and 660 described below.

Each LSU may select the address that is generated from one of the 6 address generators AG0-AG5.

Load Operations

The data read from a memory bank is stored in a buffer (not shown) of the load store unit and then transferred (via bus 134) to the buffering unit 400. This buffer helps avoiding stalls due to contentions on memory banks.

Store Operations

The data to be stored in a memory bank is prepared in one of the store buffers 650 and 660. There are 2 store buffers (store buffer_0 650 and store buffer_1 660). Each store buffer may request to write between one and four 16-bytes words to one of the LSUs.

Each LSU can hence get up to 8 simultaneous requests, and grants one after the other in a predefined order: 1) Store Buffer 0—Word 0, 2) Store Buffer 0—Word 1, . . . 4) Store Buffer 1—Word 0, . . . , 8) Store Buffer 1—Word 3.

The store buffer may ignore (not send to a memory bank) or process (send to a memory bank) data when the store buffer is configured to operate in a conditional store mode.

The store buffer may, when configured to operate in a scatter mode, treat a part of a data unit received by him as an address associated with the storage of the remaining of the data unit.

LSU Operation Priority. Store operations have priority over load operations such that a store will not generate a stall due to contention with loads. Since the load operations use a buffer, contentions will typically be swallowed without generating a stall condition.

Store Buffer

Store buffers 650 and 660 are controlled by store buffer microcontrollers 291 and 292.

During a configuration process each one of store buffers 650 and 660 receives (and stores) three configuration instruction (sb_instr[1]-sb_instr[3]). The configuration instructions (also referred to as store buffer configuration instructions) of the different store buffer may differ from each other or may be the same.

During the configuration process each store buffer microcontroller receives the addresses of the instructions to be executed by each store buffer microcontroller. First and last PC indicates the first and last instructions to be read from the storage buffer program memory 293. In the following configuration example the location of the program memory for each store buffer microcontroller is also defined:

Store Buffer Configuration

| Address | Size | Registers |
|---|---|---|
| 0 × 0004_4900 | 16B | Store Buffer 0 |
| 0 × 0004_4900 | 4B | sb_Instr[0]-Dummy-NOP |
| 0 × 0004_4904 | 4B | sb_Instr[1] |
| 0 × 0004_4908 | 4B | sb_Instr[2] |
| 0 × 0004_490C | 4B | sb_Instr[3] |
| 0 × 0004_4910 | 16B | Store Buffer 1 |
| 0 × 0004_4910 | 4B | sb_Instr[0]-Dummy-NOP |
| 0 × 0004_4914 | 4B | sb_Instr[1] |
| 0 × 0004_4918 | 4B | sb_Instr[2] |
| 0 × 0004_491C | 4B | sb_Instr[3] |
| 0 × 0004_4920 | | Reserved |

Store Buffer Micro-Controller Configuration Map:

| Address | Size | Register | Description |
|---|---|---|---|
| 0x0004_4940 | 32B | sb_uCPM[0][0:15] | Program Memory for uC0 |
| 0x0004_4960 | 32B | sb_uCPM[1][0:15] | Program Memory for uC1 |
| 0x0004_4980 | 4B | sb_FLIPC0 | First and Last PC for SB uC0 |
| 0x0004_4984 | 4B | sb_FLIPC1 | First and Last PC for SB uC1 |
| 0x0004_4988 | | | Reserved |

The store buffer microcontroller instruction may be an execute instruction or a do loop instruction. They have the following formats:

Execute Instructions:

[8:0] RLC: Repeat Instruction Counter: 1 ... 495: Immediate - 496 ... 511: Indirect Counter Register
[10:9] sel: Store Buffer Instruction Select. Triggers store when non-zero
[13:11] row: DPA row select
[14] Reserved
[15] Type  0

Do Loop:

[8:0] RLC: Repeat Loop Counter: 0 ... 495: Immediate - 496 ... 511: Indirect Counter Register
[13:9] Length: Loop Length: 1 ... 16

| [14] Mode: | 0:Count loops, 1:Count Cycles |
| [15] Type | 1 |

FIG. 8 illustrates a store buffer 660 according to an embodiment of the invention.

Store buffer 660 has four multiplexors 661-664, four buffers word0-word3 671-674 and four demultiplexers 681-684.

Buffer Word0 671 is coupled between multiplexer 661 and demultiplexer 681. Buffer Word1 672 is coupled between multiplexer 662 and demultiplexer 682. Buffer Word2 673 is coupled between multiplexer 663 and demultiplexer 683. Buffer Word3 674 is coupled between multiplexer 664 and demultiplexer 684.

Each one of multiplexers 661-664 has four inputs for receiving different lines of bus 133 and is controlled by control signal Row, Sel.

Each one of demultiplexers 681-684 has six outputs for providing data to either one of LSU0-LSU5 and is controlled by control signal En, LSU.

The store buffer configuration instruction controls the operation of the store buffer and even generates commands Row, Sel and En,LSU.

An example of a format of configuration instruction is provided below:
Store Buffer Instruction Coding

| [2:0] | lsu0 | Write Word 0 via LSU # lsu0 |
| [13] | En0 | Write Word 0 |
| [4] Conditional | | |
| [5] Scatter | | |
| [8:6] | lsu1 | Write Word 1 via LSU # lsu1 |
| [19] | En1 | Write Word 1 |
| [10] Conditional | | |
| [11] Scatter | | |
| [14:12] lsu2 | | Write Word 2 via LSU # lsu2 |
| [15] | En2 | Write Word 2 |
| [16] Conditional | | |
| [17] Scatter | | |
| [20:18] | lsu3 | Write Word 3 via LSU # lsu3 |
| [21] | En3 | Write Word 3 |
| [22] Conditional | | |
| [23] Scatter | | |
| [28:24] sel | | Data Select |

Figure 9:
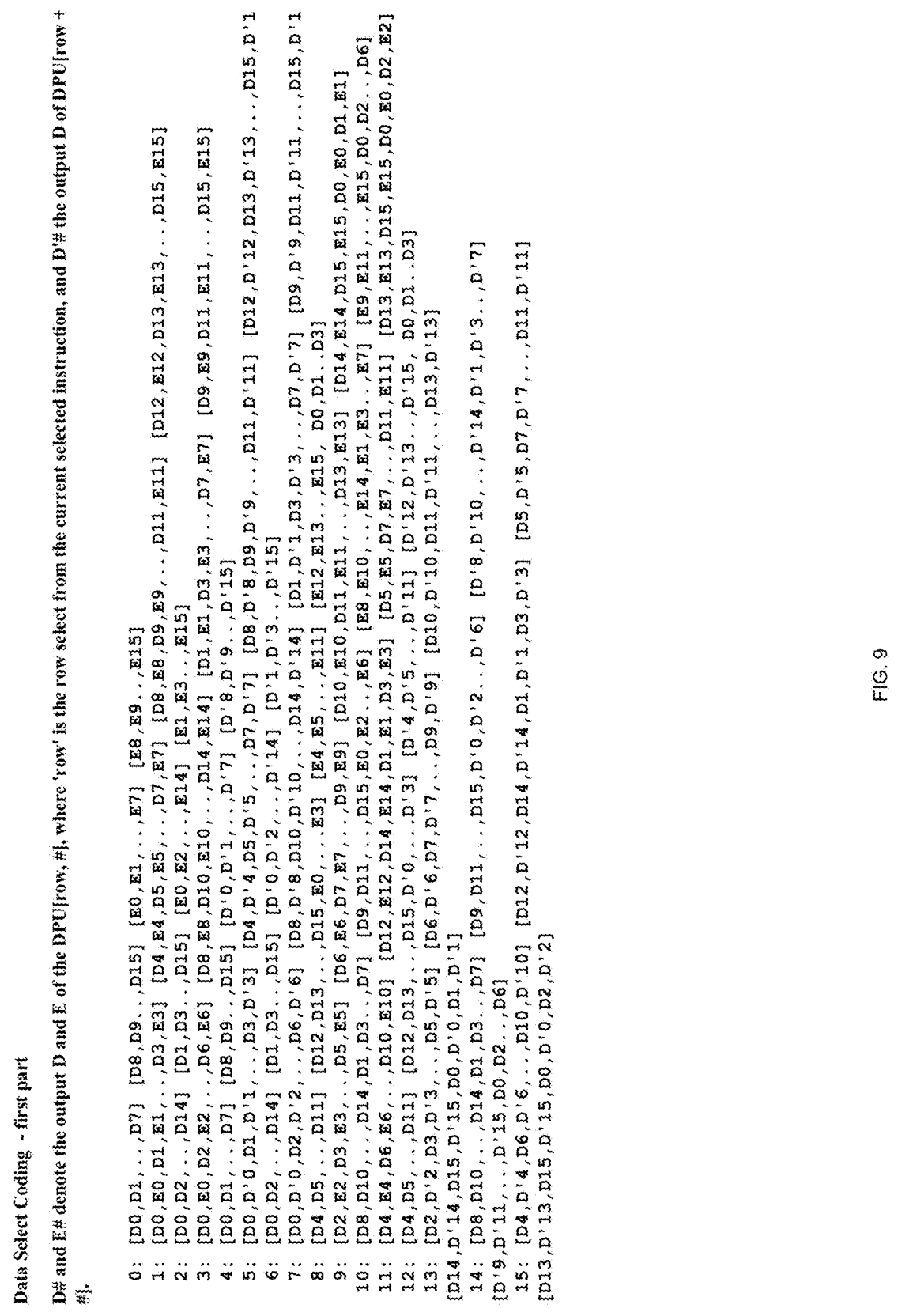
Figure 10:
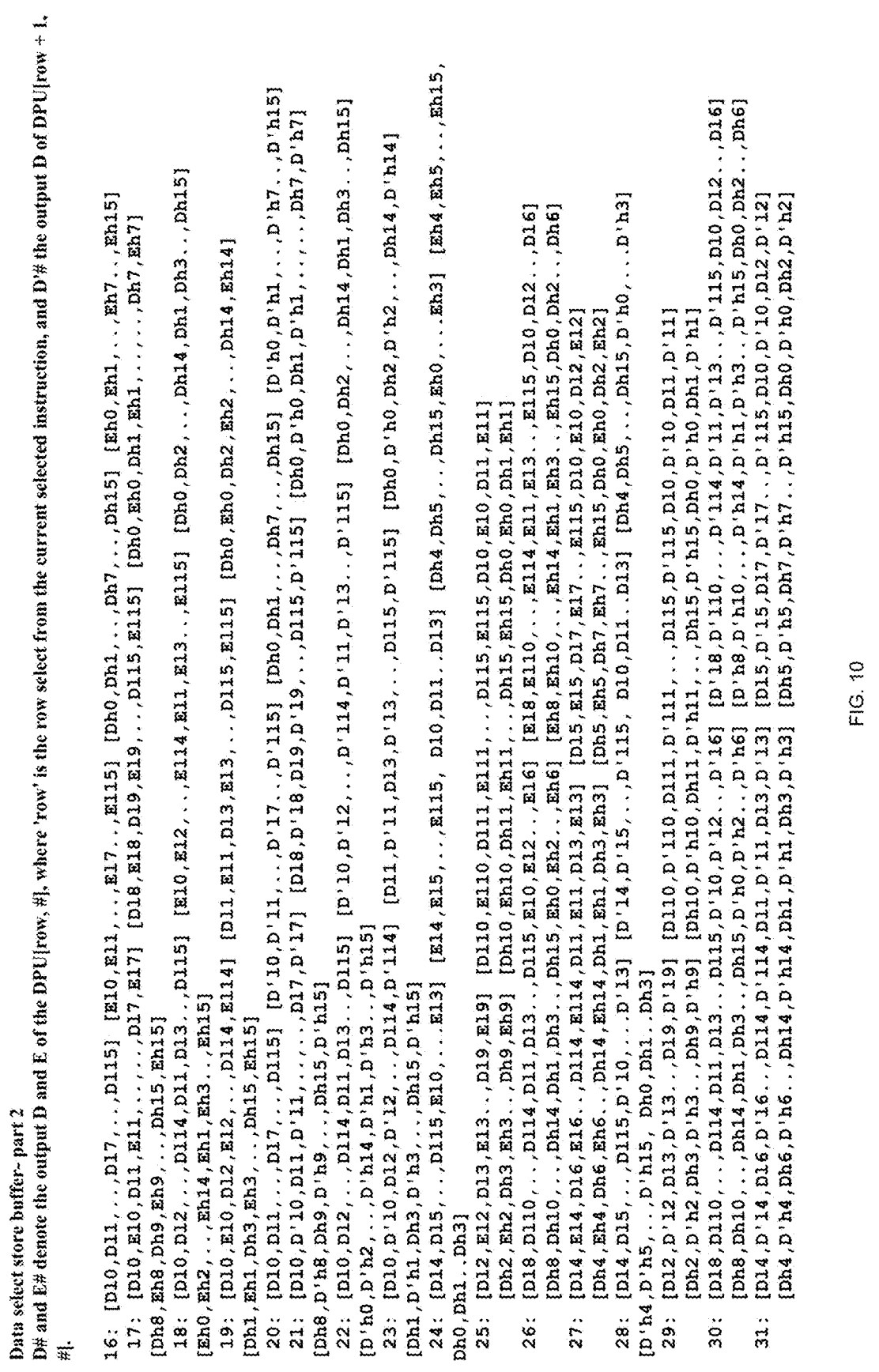

The five bits termed "Data Select" are actually instruction Row,Sel and are illustrated in FIGS. 9 and 10. Values between 0 and 28 are mapped to different ports of DPUs of DPA 500. In FIG. 9 D# and E# denote the output D and E of the DPU[row, #], where 'row' is the row select from the current selected instruction, and D'# the output D of DPU [row+1, #].

Buffering Unit

Figure 11:
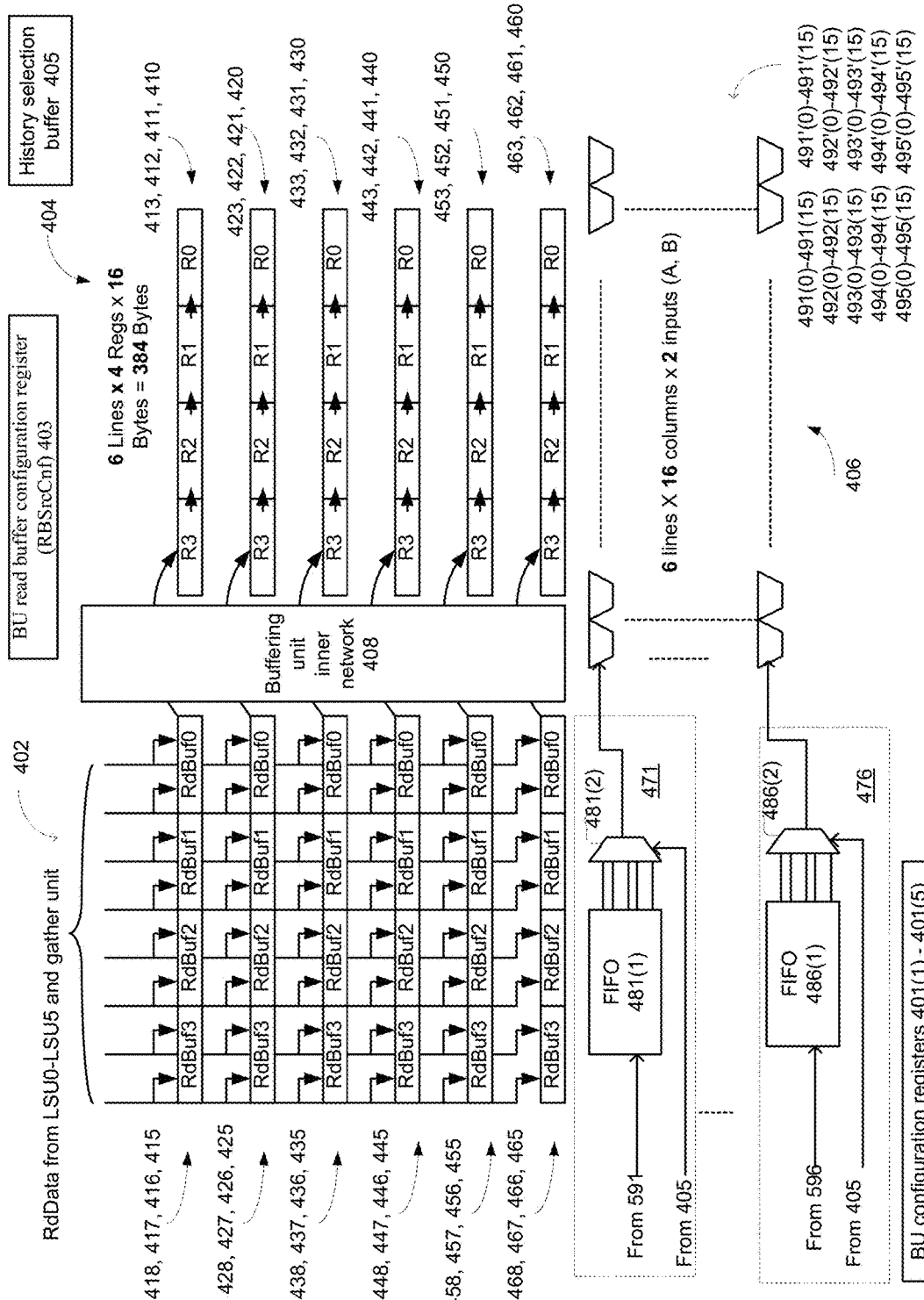
FIG. 11 illustrates a buffering unit according to an embodiment of the invention.

FIG. 11 illustrates a buffering unit 400 according to an embodiment of the invention.

Buffering unit 400 includes read buffers (RB) that is collectively denoted 402, register file (RF) 404, buffering unit inner network 408, multiplexer control circuits 471-476, output multiplexers 406, BU configuration registers 401(1)-401(5), each storing two configuration instructions, history configuration buffer 405 and BU read buffer configuration register 403.

The BU microcontroller may select, for each line, which configuration instruction to read (out of two configuration instructions stores per each BU configuration register out of 401(1)-401(5)).

There are six lines of multiplexers and they include multiplexers 491(0)-491(15) and 491'(0)-491'(15), multiplexers 492(0)-492(15) and 492'(0)-492'(15), multiplexers 493(0)-493(15) and 493'(0)-493'(15), multiplexers 494(0)-494(15) and 494'(0)-494'(15), and multiplexers 495(0)-495(15) and 495'(0)-495'(15).

For brevity of explanation FIG. 11 only illustrates multiplexer control circuits 471 and 476.

Buffering unit inner network 408 couples read buffers 402 to register file 404.

A first row of four read buffers 415, 416, 417 and 417 is coupled (via buffering unit inner network 408) to a first row of four registers R3, R2, R1 and R0 413, 412, 411 and 410.

A second row of four read buffers 425, 426, 427 and 427 is coupled (via buffering unit inner network 408) to a second row of four registers R3, R2, R1 and R0 423, 422, 421 and 420.

A third row of four read buffers 435, 436, 437 and 437 is coupled to(via buffering unit inner network 408) a third row of four registers R3, R2, R1 and R0 433, 432, 431 and 430.

A forth row of four read buffers 445, 446, 447 and 447 is coupled (via buffering unit inner network 408) to a forth row of four registers R3, R2, R1 and R0 443, 442, 441 and 440.

Different lines of the register file and corresponding lines of the multiplexers are controlled by different BU microcontrollers out of 491-495.

The different lines of multiplexers are also controlled by DPU microcontrollers. Especially each DPU microcontroller of 591-596 controls a corresponding line of DPUs and sends control instructions (MuxCtl) to corresponding multiplexer lines (via multiplexers control circuits 471-476). Each multiplexer control circuit stores the last (for example sixteen) MuxCtl instructions (instruction history) and history configuration buffer 405 stores selection information for determining which MuxCtl instruction to send to the line of multiplexers.

Multiplexer control circuit 471 controls the first line of multiplexers and includes FIFO 481(1) for storing MuxCtl instructions sent from DPU microcontroller 491 and includes control multiplexer 481(2) to select which stored MuxCtl instruction to fetch from FIFO 481(1) and send to the first line of multiplexers that includes multiplexers 491(0)-491(15) and 491'(0)-491'(15).

Mmultiplexer control circuit 476 controls the sixth line of multiplexers and includes FIFO 486(1) for storing MuxCtl instructions sent from DPU microcontroller 496 and includes control multiplexer 486(2) to select which stored MuxCtl instruction to fetch from FIFO 482(1) and send to the sixth line of multiplexers that includes multiplexers 495(0)-495(15) and 495'(0)-495'(15).

The register file may be controlled by the BU microcontrollers. The operations executed by the register file may include (a) shifts from most to least significant bytes, where the leap of the shift is a power of 2 bytes (or any other value), (b) load of one or two registers from the read buffers. Content from the file register can be manipulated. For example, the content may be interleaved and/or interlaced. Some examples are provided in the set of instructions provided below.

The buffering configuration map includes the addresses of the configuration buffers for storing configuration instructions for the buffering unit and storing indications of which commands to be fetched by the buffering unit microcontrollers (BUuC0-BuuC5). The latter are termed first and Last PC for BU pairs of instructions (each thirty two bits Mux-Config instruction includes two separate buffering unit configuration instruction):

Buffering Unit Configuration Map

| Address | Size | Registers |
|---|---|---|
| 0x0004_4200 | 256B | Buffering unit |
| 0x0004_4200 | 128B | bu_uCPM[0:63] Micro-Controller Program Memory |
| 0x0004_4280 | 64B | bu_uCCounters [0:15] BU Micro-Controller Indirect Counters |
| 0x0004_42c0 | 4B | bu_MuxConfig0[31:0] |
| 0x0004_42c4 | 4B | bu_MuxConfig1[31:0] |
| 0x0004_42c8 | 4B | bu_MuxConfig2[31:0] |
| 0x0004_42cc | 4B | bu_MuxConfig3[31:0] |
| 0x0004_42d0 | 4B | bu_MuxConfig4[31:0] |
| 0x0004_42d4 | 4B | bu_MuxConfig5[31:0] |
| 0x0004_42d8 | 4B | bu_history[23 :0] |
| 0x0004_42dc | 4B | bu_RBSrcCnf[23:0] |
| 0x0004_42E0 | 4B | bu_FLIPC0 First and Last PC for BUuC0 |
| 0x0004_42E4 | 4B | bu_FLIPC1 First and Last PC for BUuC1 |
| 0x0004_42E8 | 4B | bu_FLIPC2 First and Last PC for BUuC2 |
| 0x0004_42EC | 4B | bu_FLIPC3 First and Last PC for BUuC3 |
| 0x0004_42F0 | 4B | bu_FLIPC4 First and Last PC for BUuC4 |
| 0x0004_42F4 | 4B | bu_FLIPC5 First and Last PC for BUuC5 |

The instructions that are executed by the BU microcontrollers include bits [0:8] for loop control or instruction repetition and includes bits [9:13] that include values that control the execution of instructions. This is true for both register file commands and do loop commands Instruction Coding:

RFL stands for Register File Line and RBL for Read Buffer Line. RRR[r/r1:r0] stands for Register (RFL or RBL) number "r" (16 bytes)/from register r1 to t0. RRR[r][b/b1:b0] stands for Register (RFL or RBL) number "r" byte b/from byte b1 to b0.

RF Instructions: (bits 9-14 may be sent by the BU microcontroller to the BU each cycle)

[8:0] RIC: Repeat Instruction Counter: 1 . . . 495: Immediate—496 . . . 511: Indirect Counter Register

[11:9] Shift: 0: NOP, 1:1B, 2:2B, 3:4B, 4:8B, 5:1R, 6:2R, 7:1L, 8-15:Res

[14:12] Load:

0:NOP

1: Single A: RFL[3]<=RBL[0]

2: Single B: RFL[2]<=RBL[0]

3: Double: RFL[2]<=RBL[0], RFL[3]<=RBL[1]

4: Interlace Byte: RFL[2:3]<={RBL[1][15], RBL[0][15], RBL[0][0]}

5: Interlace Short: RFL[2:3]<={RBL[1][15:14], RBL[0][15:14], RBL[1][3:2], RBL[0][3:2], RBL[1][1:0], RBL[0][1:0]}

6: Interlace Byte & 0: RFL[2:3]<={0, RBL[0][15], . . . , 0, RBL[0][0]}

7: Interlace Short & 0: RFL[2:3]<={0, RBL[0][15:14], . . . , 0, RBL[0][1:0]}

[15] Type: 0

Do Loop:

[8:0] RLC: Repeat Loop Counter: 0 . . . 495: Immediate—496 . . . 511: Indirect Counter Register

[13:9] Length: Loop Length: 1 . . . 16

[14] Mode: 0:Count loops, 1:Count cycles

[15] Type 1

Read Buffer Loading.

The RBs load operations from LSUs are controlled by the configuration and self-triggered by their state and the state of the related LSU. BU read buffer configuration register (also referred to as RBSrcCnf) 403 specifies for each RB line from which LSU to load.

The configuration instruction stored in BU read buffer configuration register 403 has the following format:

[3:0] Read Buffer 0 LSU source:

[7:4] Read Buffer 1 LSU source

[11:8] Read Buffer 2 LSU source

[15:12] Read Buffer 3 LSU source

[19:16] Read Buffer 4 LSU source

[23:20] Read Buffer 5 LSU source

"Read buffer" refers to a line of read buffers. The four bits per read buffer line may have the following meaning: 0-7:No Load, 8:LSU0, 9:LSU1, 10:LSU2, 11:LSU3, 12:LSU4, 13:LSU5, 14:GU0, 15:GU1 (GU1 Swap 8 bytes load is of d8 . . . d15,d0 . . . d7 instead d0 . . . d15 or GU last 8 short outputs on short mode).

Multiplexer Configuration

The multiplexer configuration is illustrated below (this example refers to the first line and that is my the instructions MuxCtl is denoted MuxCtl0):

MuxCtl0[Row][4:0]: BRfpSelB: //0-7: BSelB0, 8-19: {RSelB0, BSelB0}, 31:fpB0,

MuxCtl0[Row][7:5]: BSelAb//Reg[4][BSelAb*2+31]

MuxCtl0[Row][8]: fpAO//Floating Point mode for MuxA (col<<2)

MuxCtl0[Row][11:9]: BSelBb//Reg[5][BSelAb*2+31]

MuxCtl0[Row][15:12]: Reserved

The MuxCtl operates the Muxes (selects the register of the register file and the port of the DPU) in the following way:

PxlA[Row, Col]=!fpA ? Reg[Row][Col*2]:Reg[Row][Col*4]

PxlFpB[Row, Col]=Reg[Row][Col*4+2]

PxlB[Row, Col]=BSelB==0x1f?

PxlFpB[Row, Col]:

BSelB<8?

Reg[Row][BSelB+Col*2]:

Reg[(BSelB-8)/2+Row)%6][(BSelB&1)+Col*2]

PxlAb[Row, 0]=Reg[4][BSelAb*2+32]

PxlBb[Row, 0]=Reg[5][BSelBb*2+32]

The selection of history (by FIFOs 471-476) may be done by reading the content of history configuration buffer 405 that stores four bits of selection information for each line of multiplexers.

Gather Unit

Figure 12:
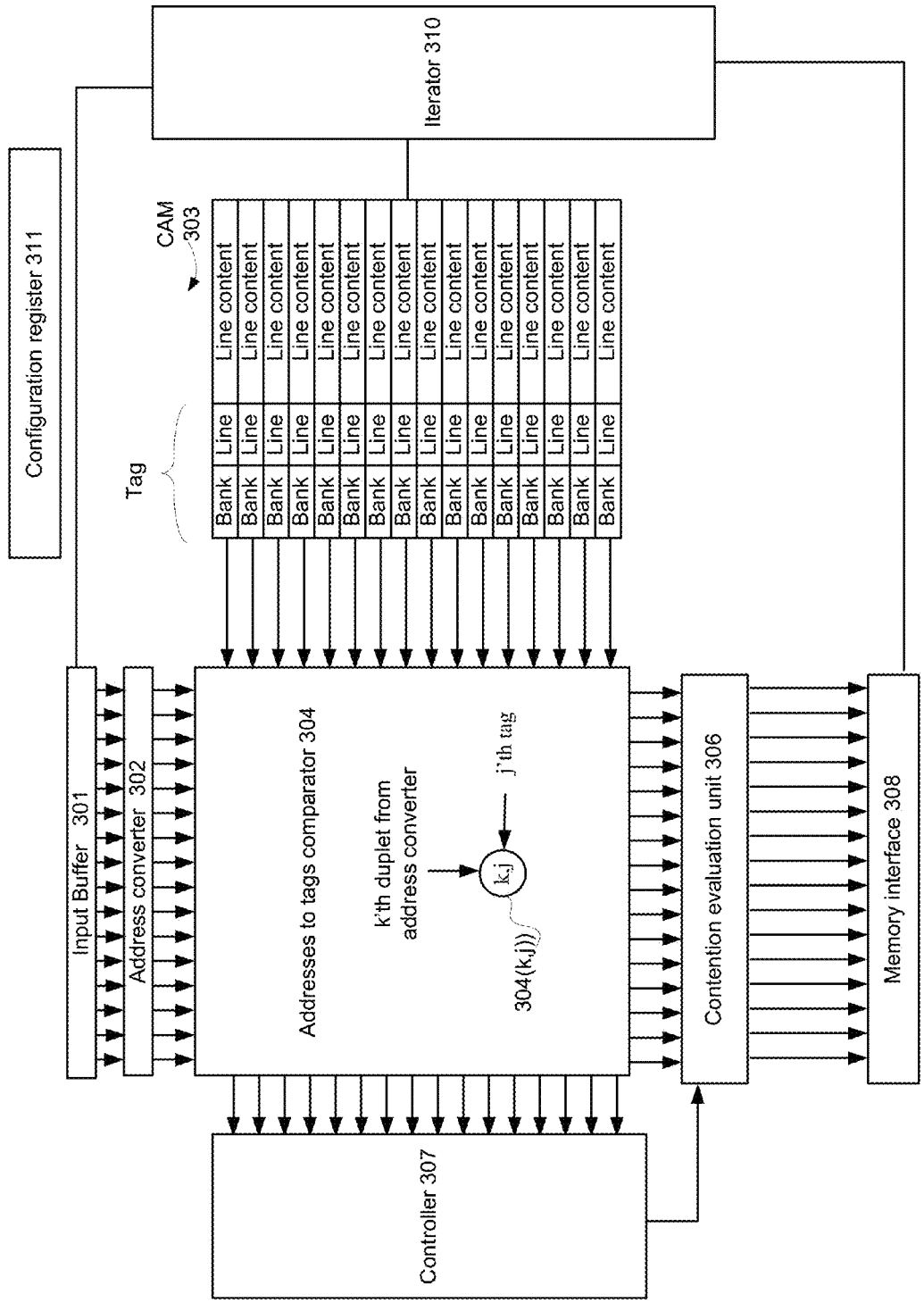
FIG. 12 illustrates a gather unit according to an embodiment of the invention.

FIG. 12 illustrates a gather unit 300 according to an embodiment of the invention.

Gather unit 300 includes input buffer 301, address converter 302, cache memory 303, address to tags comparator 304, contention evaluation unit 306, controller 307, memory interface 308, iterator 310 and configuration register 311.

Gather unit 300 is configured to gather up to 16 byte or short pixels from eight memory banks, MB0 . . . MB7 or MB8 . . . MB15 depending on bit gu_Ctrl[15] of configuration register 311, through a full associative cache memory (CAM) 303 that includes sixteen 8 bytes registers. The pixels addresses or coordinates are generated or received from the array according to the mode gu_Ctrl[3:0] of configuration register 311.

The gather unit 300 may accesses memory banks of memory module 200 using addresses (duplets) that indicate the memory bank number and line within the memory bank.

The gather unit may receive or generate, instead of addresses, X and Y coordinates that represent the location of the requested pixels in an image. The gather unit includes an address converter 302 for converting X,Y coordinates to addresses.

Iterator 310 may operate in one of two modes—(a) only internal iterator and (b) using an address generator of the memory module.

When operating in mode (a) the iterator 310 may generate sixteen addresses using the following control parameters (that are stored in the configuration register 311):

1) AddBase—the 16 base Addresses.
2) AddStep—The iterator address step.
3) xCount: The max steps counter before stride. The stride is performed from previous stride or from the based coordinates.
4) AddStride: The Stride (or y Step).

When operating in mode (b) the iterator feeds AddBase to the address generator and the address generator uses this address to perform iterations.

The iterator mode may be useful, for example, during disparity calculation where the gather unit may retrieve data units from source and target images—especially pixels that are proximate to each other.

Another mode of operations include receiving addresses of requested data (the addresses may be X,Y coordinates to be converted by address converter 302 or memory addresses such as duplets), checking if the requested data units are stored in the cache memory and if not fetching the data units from the memory module 200.

A further mode of operation includes receiving addresses of requested data units and translating the addresses to more requested addresses and then fetching the content of the more requested addresses from the cache memory 303 or from the memory unit. This mode of operation may be useful, for example, during warp calculation wherein the gather unit may receive an address of a pixel and obtain the pixel and few other neighboring data units.

Cache memory 303 stores tags that are duplets and these tags are used to determine whether the requested data unit is within the cache memory 303. The duplets are also used to detect contention—when at the same cycle multiple requested data units reside in different lines of the same memory bank.

Figure 13:
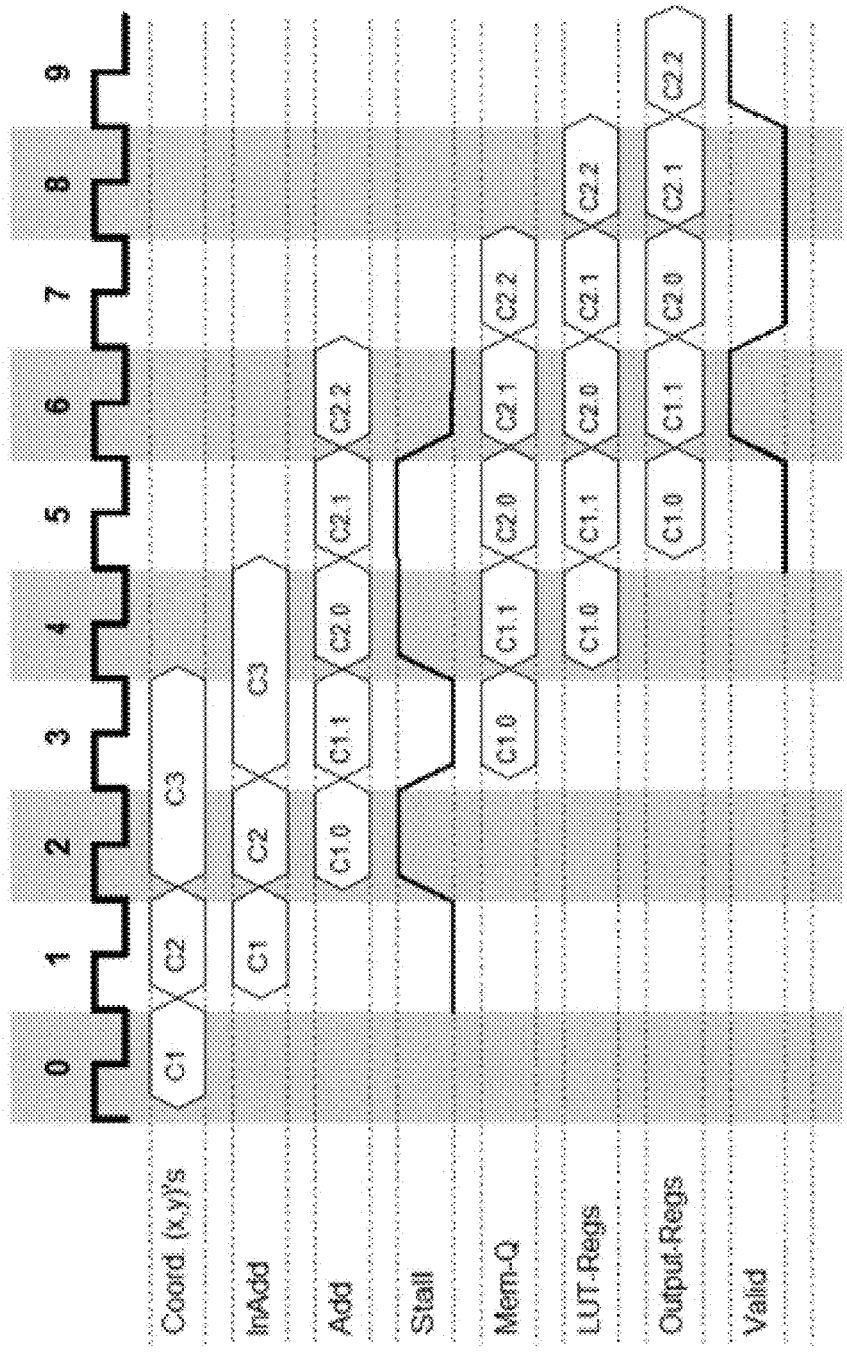
FIG. 13 is a timing diagram that illustrates a process that includes address conversion, cache hit/miss, contention and outputting of information.

FIG. 13 is a timing diagram that illustrates a process that includes address conversion, cache hit/miss, contention and outputting of information.

The coordinates (X,Y) are accepted or generated in cycle 0, converted into duplets at cycle 1. Banks accesses are computed in this same cycle for performing the access in cycle 2. If several coordinates address a same bank at different addresses (as it is the case in this example), there is a contention, the corresponding pixel fetch is delayed to the next cycle, and a stall is asserted in cycle 1. The coordinates causing contention are retreated in cycle 1 and memory banks accessed in cycle 2. The latency between the coordinates and the pixels is 5 cycles+the number of stall cycles. In an extreme case, accessing 16 pixels can cause 15 stall cycles. For warp operation, since the pixels accessed are close to each other, 16 pixels are fetched in 1.0-1.4 cycles average, depending on the type of the warp.

The Configuration Map

| Address | Size | Register | |
|---|---|---|---|
| 0x0004_4300 | 2B | gu_Ctrl | Control Register (configuration register 311) |
| | | | [3:0]: Mode |
| | | | 0: Use 16 coordinates from DPUs |
| | | | 1: Use 8 coordinates from DPUs and generate (x+1,y) coordinate |
| | | | 2: Use 8 coordinates from DPUs and generate (x,y+1) coordinate |
| | | | 3: Use 4 coordinates from DPUs and generate (x+1,y) (x,y+1) & (x+1,y+1) coordinates |
| | | | 4: Use 4 coordinates from DPUs and generate (x+1,y)...(x+2,y) coordinates |
| | | | 5..7: Reserved |
| | | | 8: Use Iterator |
| | | | 9: Use Iterator with Address Generator 5 (of LSU) |
| | | | [6:4]: NoValXY 0:16, 1:14, 2:12, 3:10, 4:8 |
| | | | [7] Reserved |
| | | | [11:8] Gather History Select |
| | | | [12] Short mode - delivers 16 bits data. The address (X coordinate) must be aligned to 2 bytes. 0:Byte - 1:Short (16 bits) |
| | | | [14:13]: Reserved |
| | | | [15]: Memory banks switch control: |
| | | | 0: Use memory banks 0-7 |
| | | | 1: Use memory banks 8-15 |
| 0x0004_4310 | 4B | gu_Stride | Address Stride = M << (E + 4) |
| | | | [3:0] Mantissa 'M' |
| | | | [7:4] Exponent 'E' |
| 0x0004_4314 | 2B | gu_AddStep | Address Step |
| 0x0004_4316 | 2B | gu_AddStride | Address Stride each Count |
| 0x0004_4318 | 4B | gu_xCount | Max step Counter on X |
| 0x0004_4320 | 32B | gu_AddBase | 16 Base Addresses 16 bits each for Iterator |

Referring back to FIG. 12: input buffer 301 is coupled to address converter 302. Addresses to tags comparator 304 receives inputs from cache memory 303 and from address converter 302 (if address conversion is required) or from input buffer 301. The addresses to tags comparator 304 sends output signals indicative of the comparisons (such as cache miss, cache hit—and if so where the hit occurred) to controller 307 and to contention evaluation unit 306 and memory interface 308. Iterator 310 is coupled to input buffer 301 and memory interface 308.

An input interface (such as input buffer 301) is arranged to receive multiple requests for retrieving multiple requested data units.

Cache memory 303 includes entries (such as sixteen entries or lines) that store multiple tags (each tag may be a duplet) and multiple cached data units.

Each tag is associated with a cached data unit and is indicative of a group of memory cells (such as a line) of a memory module (such as a memory bank) that differs from the cache memory and stores the cached data unit.

Addresses to tags comparator 304 includes an array of comparators that is arranged to concurrently compare between the multiple tags and multiple requested memory group addresses to provide comparison results.

Address to tags comparator includes K×J nodes—to cover each pair of tag and requested memory bank address. The (k,j)'th node 304($k,j$) compares the k'th requested address to the j'th tag.

If, for example, a certain requested memory bank/line address, did not match any of the tags then the addresses to tags comparator 304 will send a miss signal.

Controller 307 may be arranged to (a) classify, based on the comparison results, the multiple requested data units that are stored in the cache memory 303 and those that are uncached data units (not stored in the cache memory 303); and (b) send to the contention evaluation unit 306, when there is at least uncached data unit, information about it.

The contention evaluation unit 306 is arranged to check an occurrence of at least one contention.

The memory interface 308 is arranged to request any uncached data unit from the memory module in a contention free manner.

When the one or more uncached data units are retrieved by the gather unit they are stored in the cache memory. At a cycle that follows a given cycle in which a contention was detected addresses to tags comparator 304 may receive (from the input buffer or from the address translator the same requested data units from the given cycle. The previously uncached data units that are now stored in the cache memory 303 will change the results of the comparisons made by the addresses to tags comparator 304—and only uncached memory data units that were not requested in the previous iteration will be retrieved from the memory module.

Figure 14:
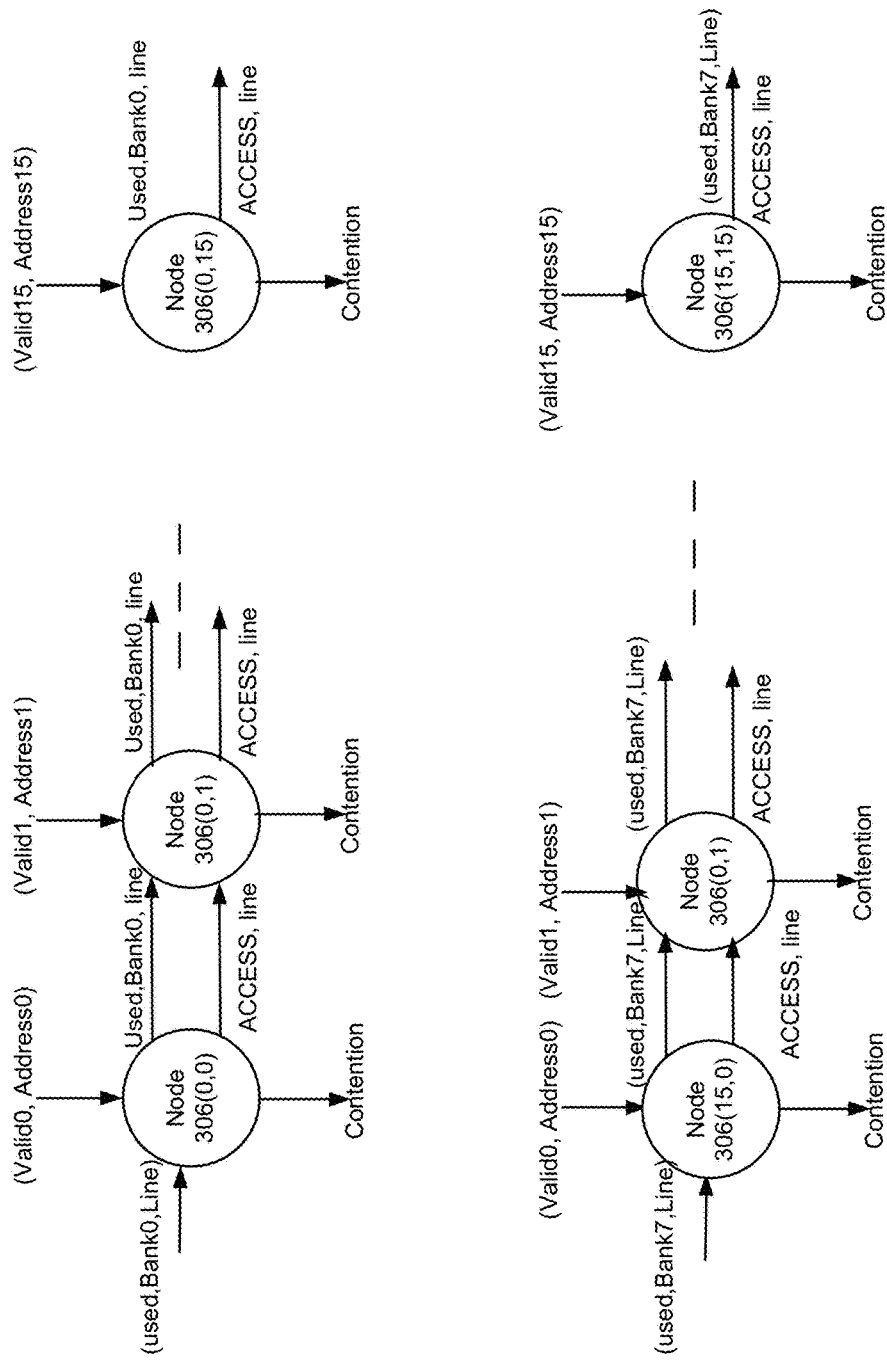
FIG. 14 illustrates a contention evaluation unit according to an embodiment of the invention.

The contention evaluation unit may include multiple groups of nodes. An example is provided in FIG. 14.

The number of groups of nodes is the maximal number of memory banks that may be accessed concurrently by the gather unit (for example—eight).

Each group of nodes is arranged to evaluate a contention related to a single memory bank. For example, in FIG. 14 there are eight groups of nodes—for comparing between sixteen requested addresses and lines of eight memory banks.

The nodes of the first group of nodes (305(0,0)-306(0,15) are serially connected to each other. The leftmost node 306(0,0) of the first group of nodes receives as input signals (used,bank0, line) and also signals (valid0, Address0).

Address0 is the first address of the sixteen requested addresses (of data units) and valid0 indicates if the first requested address is valid or not—if the first requested address refers to a cached data unit (invalid) or refers to an uncached data unit (valid).

Input signals (used,bank0,line) indicate whether the bank0 is used and the line that was requested by the first node of the group of nodes. Input signals (used, bank0, line) that are fed to leftmost node 306(0,0) indicate that bank0 is not used.

If, for example, the leftmost node 306(0,0) (or any other node) determines that a previously unused bank (not currently associated with any uncached data unit) should be used (for retrieval of a valid data unit address associated with the node) then the node changes signals (used,bank0, line) to indicate that the bank is used—and also updates "line" to the line which is requested by the node.

If, any node (out of nodes 306(0,1)-306(0,15)) of the first group of nodes receives a valid address that refers to Bank0, then that node compares between the Line of the requested address and the line indicated by (used,Bank0,line). If the line values does not match then the node, outputs a contention signal.

The same process is concurrently executed by any group of nodes.

If there are J tags then there are J groups of serially connected nodes and each group may include K nodes.

Accordingly—each node of the group is arranged to (a) receive an access request indication (such as signals (used, bank,line)) that is indicative of whether any previous node of the group is requesting to access the memory bank that is identified by duplet (Valid, Address) and (b) update the access request indication to indicate whether the group is requesting access to its corresponding memory bank or not.

Data Processing Array (DPA) 500.

DPA 500 includes ninety six DPUs that are arranged in six lines (rows) whereas sixteen DPUs are included in each line.

Each line of DPUs may be controlled by a separate DPA microcontroller.

Figure 15:
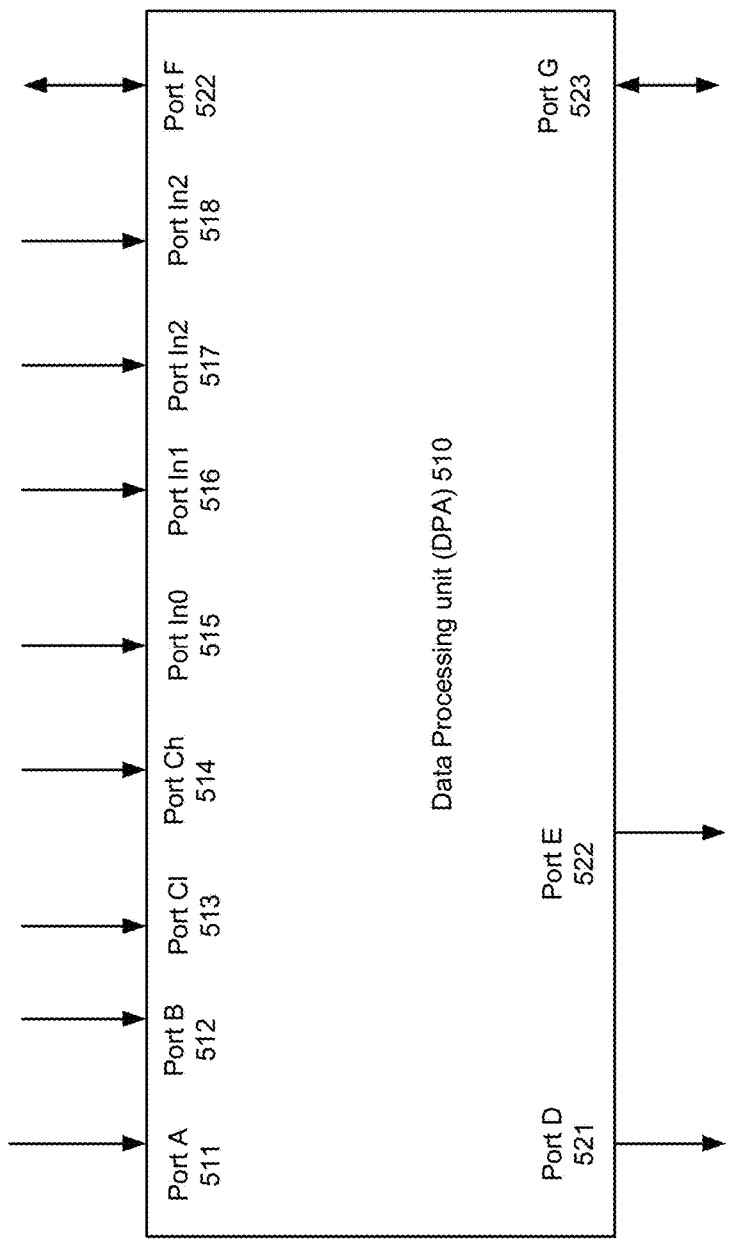
FIGS. 15 and 16 illustrate a data processing unit according to an embodiment of the invention.
Figure 16:
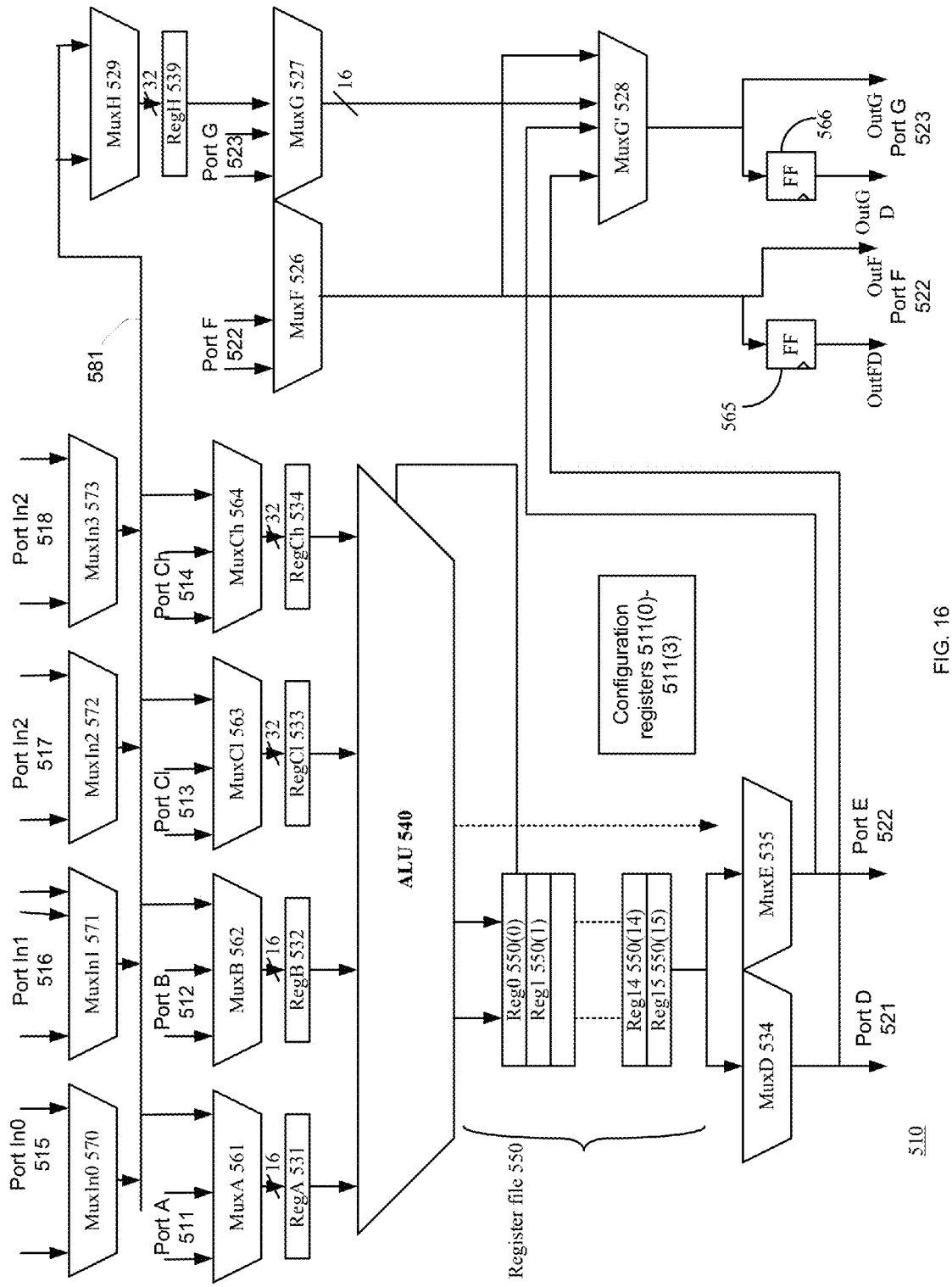

FIGS. 15 and 16 illustrate a DPU 510 according to an embodiment of the invention.

DPU 510 includes:
1) Arithmetic logic unit (ALU) 540
2) Register file 550 that includes sixteen registers 550(0)-550(15).
3) Two output multiplexers MuxD 534, MuxE 535.
4) Multiple input multiplexers MuxIn0 570, MuxIn1 571, MuxIn2 572, MuxIn3 573, MuxA 561, MuxB 562, MuxCl 563, MuxCh 564, MuxF 526 and MuxG 527.
5) Internal multiplexers MuxH 529 and MuxG' 528.
6) Flip-flops 565 and 566.
7) Resisters RegA 531, RegB 532, RegCl 533 and RegCh 534.

The multiplexers mentioned above are non-limiting example of data flow components.

Each input multiplexer is coupled to an input port of DPU 510 and may be coupled to other DPUs, to gather unit 300, to memory module 200, to buffering unit 400 or to an output port of the DPU.

Input multiplexers MuxA 561, MuxB 562, MuxCl 563, MuxCh 564 and MuxH 529 also include inputs that are coupled to bus 581. Bus 581 is also coupled to the outputs of MuxIn0 570, MuxIn1 571, MuxIn2 572, MuxIn3 573.

Resisters RegA 531, RegB 532, RegCl 533 and RegCh 534 are connected between input multiplexers MuxA 561, MuxB 562, MuxCl 563, MuxCh 564 (respectively—one register for each multiplexer) and ALU 540 and feed the ALU with data.

Using two groups of multiplexers where one group of multiplexers may receive outputs of the other group increases the number of sources for providing data that is fed to ALU 540.

The output of ALU 540 is coupled to an input of the register file 550. The first register file Reg0 550(0) is also connected as an input to ALU 540.

The output of register file 550 is coupled to output multiplexers MuxD 534 and MuxE 535. The outputs of output multiplexers MuxD 534, MuxE 535 are coupled to output ports D (521) and E (522) respectively and (via MuxG' 528) to output port G 523 and flip-flop 566.

Register RegH 539 is connected between MuxH 529 and MuxG 527. MuxF 526 is directly connected to port F 522 and to flip-flop 565 thereby providing a low latency relay channel MuxG 527 is coupled to MuxG' 528.

MuxIn0, MuxIn1, MuxIn2, MuxIn3 may implement a short routing to other DPUs: (a) MuxIn0, MuxIn1 get input from D outputs of 8 DPUs, (b) MuxIn2, MuxIn3 get input from E outputs of the same 8 DPUs.

Five other input multiplexers MuxA, MuxB, MuxCl, MuxCh and MuxG may implement the following routing:

MuxA may get its input from the buffering unit, and from MuxIn0 . . . MuxIn3.

Each one of MuxB, MuxCl and MuxCh may get its input from the buffering unit, MuxIn0 . . . MuxIn3 and from an internal register of the register file (for example R14 or R15 of the register file.

Most of the ALU operations generate one short (Out0) result. Some operations generate one word result or 2 shorts results ({Out1, Out0}. The Outputs are stored in constant place in the register file 550: R(0)<=Out0, and R(1)<=Out1 (for operations generating 2 shorts).

The DPU 510 and other DPUs in the same row are controlled by a shared row PDA microcontroller, which generates a stream of selection information for selecting between configuration instructions stored in the DPU (see configuration register 511).

The configuration register (also referred to as dpu_Ctrl) 511 may store the following content:

| Address | Size | Register | |
|---------|------|----------|---|
| 0x000 | 4B | dpu_Ctrl | |
| 0x004 | 24B | Reserved | |
| 0x01c | 4B | {dpu_Reg[15], dpu_Reg[14]} | |
| 0x020 | 4B | dpu_Inst[0]L | (Dummy NOP) |
| 0x024 | 4B | dpu_Inst[0]H | (Dummy NOP) |
| 0x028 | 4B | dpu_Inst[1]L | |
| 0x02c | 4B | dpu_Inst[1]H | |
| 0x030 | 4B | dpu_Inst[2]L | |
| 0x034 | 4B | dpu_Inst[2]H | |
| 0x038 | 4B | dpu_Inst[3]L | |
| 0x03c | 4B | dpu_Inst[3]H | |

The four configurations registers 511(1)-511(3) are referred to as dpu_Inst[0]-dpu_Inst[1].

As indicated above each DPU of DPA 500 is directly coupled to some DPUs of the PMA and is indirectly coupled (coupled via one or more intermediate DPUs) to some other data processors of the array of data processors. Each DPU has a relay channel (between ports F and G) for relaying data between relay ports (port F and port G) of the DPU. This simplifies the connections and reduces connectivity while providing enough connectivity and flexibility to perform image processing tasks in a highly efficient manner.

The relay channel (especially the path between port F and output G of port G) of each data processor of the multiple data processor exhibits substantially zero latency. This allows using a PDU as a zero latency relay channel thereby indirectly coupling between DPUS and also allowing broadcasting data to multiple DPUs by using the relay channels between different DPUs.

Referring back to FIG. 16—each DPU includes a core. The core includes ALU 540 and memory resources such as register file 550. The cores of the multiple DPUs are coupled to each other by a configurable network. The configurable network includes data flow components such as multiplexers MuxA-MuxCh, MuxD-MuxE, MuxIn0-MuxIn3, MuxF-MuxH and MuxG'. These data flow components may be included (as illustrated in FIG. 16) within the DPU but may be, at least in part, be positioned outside the DPUs.

The DPUs may include non-relay input port that are directly coupled to a first set of neighbors. For example—the non-relay input ports may include input ports A, B, Cl, Ch, In0, In1, In2 and In3. Their connectivity to the first set of neighbors is listed in the relay exampled below. The first set of neighbors may include, for example eight neighbors.

The first set of neighbors is formed by DPUs that are located within a distance (cyclic distance) less than four DPUs from the DPU. The distances as well as directions are cyclic. For example, MuxIn0 is coupled to D ports of DPUs that are: (a) in the same row but one column to the left (D(0,−1)), (b) in the same row but one column to the right (D(0,+1)), (c) in the same column but one row above (D(−1,0)), (d) one row above and one column to the left (D(−1,−1)), (e) one row above and one column to the right (D(−1,+1)), (f) two rows above and the same column(D(−2,0)), (g) two rows above and one column to the left (D(−2,−1)), (h) two rows above and but one column to the right (D(−2,+1)).

A first non-relay input port of the data processor may be directly coupled to relay ports of data processors of the first set of neighbors. See, for example port A, which is directly coupled to the F port of the same DPU and to the F port of the DPU of the same row but one column to the left (F/Fd(0,−1)).

A first relay port (such as ports G and F) maybe directly coupled to a second set of neighbors. For example, input mux F (coupled to port F) may be coupled to the G output and delayed G output (Gd) of G ports of the DPUs that are (a) one row below and at the same column (G/Gd(+1,0)), (b) two rows below and at the same column G/Gd(+2,0), (c) three rows below and at the same column G/Gd(+3,0)), (d) same row but one column to the left (G/Gd(0,+1)), (e) same row but two columns to the left G/Gd(0,+2), (f) same row but four columns to the left (G/Gd(0,+4)), (g) and same row but eight columns to the left (G/Gd(0,+8)).

In the following configuration example the location of the different configuration buffers for the PMA and the DPU microcontroller configuration registers 598 (including registers p_FLIP0-p_FLIPS5—one for each DPU microcontroller) is provided:

| Address | Size | Register | |
|---------|------|----------|---|
| 0x0004_4000 | 256B | p_uCPM[0:127] | DPA Micro-Controller Program Memory |
| 0x0004_4100 | 4B | PmaCSR | PMA control Register |
| 0x0004_4118 | 4B | p_FLIPC0 | First and Last PC for DPA uC0 |
| 0x0004_411C | 4B | p_FLIPC1 | First and Last PC for DPA uC1 |
| 0x0004_4120 | 4B | p_FLIPC2 | First and Last PC for DPA uC2 |
| 0x0004_4124 | 4B | p_FLIPC3 | First and Last PC for DPA uC3 |
| 0x0004_4128 | 4B | p_FLIPC4 | First and Last PC for DPA uC4 |
| 0x0004_412C | 4B | p_FLIPC5 | First and Last PC for DPA uC5 |

Configuration registers 511(0)-511(3) may store up to four configuration instructions. A configuration instruction may be 64 bits long and may be read by one or two read operations.

The configuration instructions controls the multiplexers select (A, B, C, D, E, F and G) and the register file 550 shifts:
1) Shift by step 1: For n in [0,15]: for (i=15; i>0; i—) Ri<=R(i−1).
2) Shift by step 2: For n in [0,2,4 . . . 14]: for (i=7; i>0; i—) {R(2i+1),R(2i)}<={R(2i−1), R(2i−2)}

The fields may be applied at different timings:
1) Input muxes A, B, C, F and output mux G control are not delayed.
2) ALU control is delay by one clock cycle.
3) Output muxes D and E controls are delay by two clock cycles.

The following table describes the different fields of the configuration instruction of the DPU:

| | |
|---|---|
| 4:0 | Input A Select |
| 9:5 | Input B Select |
| 14:10 | Input Cl Select |
| 19:15 | Input Ch Select |
| 23:20 | Output D Select |
| 27:24 | Output E Select |
| 31:28 | Input/Output F Select |
| 36:32 | Output G Select |
| 41:37 | RegOpCode: |
| | 40:37 Shift Destination (regards the register file): |
| | Location of the last altered register from shift operation |
| | 41 Shift Step: |
| | 0: Shift by 1 (for short results) |
| | 1: Shift by 2 (for Integer results) |
| 42 | Write ALU Output interlaced into R0 and R1 |
| 44:43 | wrConst: 0: NOP; 1: Reg15 <= ALU Low; 2: Reg15: ALU High; |
| 3: {Reg14, Reg15} <= ALU | |
| 56:45 | ALU Control: (AluCtl_t) |
| [5:0]: DPU ALU Opcode (DpuAluOpCode_t) | |
| [7:6]: Post Modifier: Rounding for FP operations, Post Shift for others | |
| | Rounding mode: 0:Round, 1:Int, 2:Floor, 3:Ceil |
| | Post shift: Shift left by 0, 1, 2 or 3 bits |
| [8]: | vectorial: 0:regular - 1:vectorial |
| [9]: | mode_a: 0:Unsigned - 1:Signed |
| [10]: | mode_b: 0:Unsigned - 1:Signed |
| [11]: | acc: Accumulator mode: Choose Cacc and skip register C |
| 57: | wrReg1: Write Reg1 from ALU Out High. |
| 63:58 | Reserved |

Each one of MuxIn0-MuxIn3 is connected to multiple buses-as listed below:

MuxIn0:
  MuxIn0[0]<=D(0,−1)
  MuxIn0[1]<=D(0,+1)
  MuxIn0[2]<=D(−1, 0)
  MuxIn0[3]<=D(−1,−1)
  MuxIn0[4]<=D(−1,+1)
  MuxIn0[5]<=D(−2, 0)
  MuxIn0[6]<=D(−2,−1)
  MuxIn0[7]<=D(−2,+1)
MuxIn1:
  MuxIn1[0]<=D(0,−1)
  MuxIn1[1]<=D(0,+1)
  MuxIn1[2]<=D(−1, 0)
  MuxIn1[3]<=D(−1,−1)
  MuxIn1[4]<=D(−1,+1)
  MuxIn1[5]<=D(−2, 0)
  MuxIn1[6]<=D(−2,−1)
  MuxIn1[7]<=D(−2,+1)
MuxIn2:
  MuxIn2[0]<=E(0,−1)
  MuxIn2[1]<=E(0,+1)
  MuxIn2[2]<=E(−1, 0)
  MuxIn2[3]<=E(−1,−1)
  MuxIn2[4]<=E(−1,+1)
  MuxIn2[5]<=E(−2, 0)
  MuxIn2[6]<=E(−2,−1)
  MuxIn2[7]<=E(−2,+1)
MuxIn3:
  MuxIn3[0]<=E(0,−1)
  MuxIn3[1]<=E(0,+1)
  MuxIn3[2]<=E(−1, 0)
  MuxIn3[3]<=E(−1,−1)
  MuxIn3[4]<=E(−1,+1)
  MuxIn3[5]<=E(−2, 0)
  MuxIn3[6]<=E(−2,−1)
  MuxIn3[7]<=E(−2,+1)

Input multiplexers MuxA, MuxB, MuxC, Mux F, outputs multiplexers MuxD, MuxE, output F, delayed output Fd, output G, and delayed output Gd provide the connectivity listed in this paragraph. The notation X(N,M) means output X of DPU(row+N % 6, col+M % 16). The DPUs of each row are connected to each other in a cyclic manner and the DPUs of each column are connected to each other in a cyclic manner It should be noted that there the various listed below multiplexers have multiple (such as sixteen) inputs and the following list provide the connections to each of these inputs. For example A[0]-A[15] are the sixteen input of MuxA. In the following text %6 means a modulo 6 operation and %16 means modulo 16 operation. R14 and 51R are the last two registers of the register file.

Input A mux:
  A[0]<=0
  A[1]<=nu_PxlA
  A[2]<=D(0, 0)
  A[3]<=E(0, 0)
  A[4]<=MuxIn0
  A[5]<=MuxIn1
  A[6]<=MuxIn2
  A[7]<=MuxIn3
  A[8]<=PxlAb
  A[9]<=PxlBb
  A[10]<=0
  A[11]<=F(0, 0)
  A[12]<=F/Fd(0,−1)
  A[13]<=R15
  A[14]<=R14
  A[15]<=PxlBi
Input B mux:
  B[0]<=0
  B[1]<=nu_PxlB B[2]<=D(0, 0)
B[3]<=E(0, 0)
B[4]<=MuxIn0
B[5]<=MuxIn1
B[6]<=MuxIn2
B[7]<=MuxIn3
B[8]<=PxlAb
B[9]<=PxlBb
B[10]<=0
B[11]<=F(0, 0)
B[12]<=F/Fd(0,-1)
B[13]<=R15
B[14]<=R14
B[15]<=PxlBi
Input Cl mux:
　Cl[0]<=0
　Cl[1]<=nu_PxlA
　Cl[2]<=D(0, 0)
　Cl[3]<=E(0, 0)
　Cl[4]<=MuxIn0
　Cl[5]<=MuxIn1
　Cl[6]<=MuxIn2
　Cl[7]<=MuxIn3
　Cl[8]<=PxlAb
　Cl[9]<=PxlBb
　Cl[10]<=0
　Cl[11]<=F(0, 0)
　Cl[12]<=F/Fd(0,-1)
　Cl[13]<=R15
　Cl[14]<=R14
　Cl[15]<=PxlBi
Input Ch mux:
　Ch[0]<=0
　Ch[1]<=nu_PxlB
　Ch[2]<=D(0, 0)
　Ch[3]<=E(0, 0)
　Ch[4]<=MuxIn0
　Ch[5]<=MuxIn1
　Ch[6]<=MuxIn2
　Ch[7]<=MuxIn3
　Ch[8]<=PxlAb
　Ch[9]<=PxlBb
　Ch[10]<=0
　Ch[11]<=F(0, 0)
　Ch[12]<=F/Fd(0,-1)
　Ch[13]<=R15
　Ch[14]<=R14
　Ch[15]<=PxlBi
Output D mux: {Regs[0 . . . 15]}
Output E mux: {Regs[0 . . . 15]}
Input F mux:
　F[0]: Use F mux defined in dpu_CSR
　F[1]<=G/Gd(+1,0)
　F[2]<=G/Gd(+2,0)
　F[3]<=G/Gd(+3,0)
　F[4]<=G/Gd(0,+1)
　F[5]<=G/Gd(0,+2)
　F[6]<=G/Gd(0,+4)
　F[7]<=G/Gd(0,+8)
Output F: F mux output
Output Fd: F latched @clk
Output G mux:
　G[0]<=Use G mux defined in dpu_CSR
　G[1]<=D
　G[2]<=E
　G[3]<=F
　G[4]<=D(+1, 0)
　G[5]<=E(+1, 0)
　G[6]<=NU_A
　G[7]<=NU_B
　G[8]<=MuxG, MuxG<=MuxInD0
　G[9]<=MuxG, MuxG<=MuxInD1
　G[10]<=MuxG, MuxG<=MuxInE0
　G[11]<=MuxG, MuxG<=MuxInE1
　G[12]<=PxlAb
　G[13]<=PxlBb
　G[14]<=PxlAbi
　G[15]<=PxlBbi
Output Gd: G latched @clk Inputs (A, B, Cl, Ch, G) register configuration specifications (configuration bits stored in the configuration register of the DPU and are used to control the various components of the DPU.

The following example list the values of various bits included in the configuration instruction of the DPU. The notation X(N,M) means output X of DPU(row+N % 6, col+M % 16).

Input A mux:
　A[0]<=0
　A[1]<=nu_PxlA
　A[2]<=D(0, 0)
　A[3]<=E(0, 0)
　A[4]<=MuxIn0
　A[5]<=MuxIn1
　A[6]<=MuxIn2
　A[7]<=MuxIn3
　A[8]<=nu_PxlAb
　A[9]<=nu_PxlBb
　A[10]<=nu_PxlAbi
　A[11]<=F(0, 0)
　A[12]<=F/Fd(0,-1)
　A[13]<=R15
　A[14]<=R14
　A[15]<=nu_PxlBbi
　A[16]<=D(0,-1)
　A[17]<=D(0,+1)
　A[18]<=D(-1, 0)
　A[19]<=D(-1,-1)
　A[20]<=D(-1,+1)
　A[21]<=D(-2, 0)
　A[22]<=D(-2,-1)
　A[23]<=D(-2,+1)
　A[24]<=E(0,-1)
　A[25]<=E(0,+1)
　A[26]<=E(-1, 0)
　A[27]<=E(-1,-1)
　A[28]<=E(-1,+1)
　A[29]<=E(-2, 0)
　A[30]<=E(-2,-1)
　A[31]<=E(-2,+1)
Input B mux:
　B[0]<=0
　B[1]<=nu_PxlB
　B[2]<=D(0, 0)
　B[3]<=E(0, 0)
　B[4]<=MuxIn0
　B[5]<=MuxIn1
　B[6]<=MuxIn2
　B[7]<=MuxIn3
　B[8]<=nu_PxlAb
　B[9]<=nu_PxlBb
　B[10]<=nu_PxlAbi
　B[11]<=F(0, 0)
　B[12]<=F/Fd(0,-1)

B[13]<=R15
B[14]<=R14
B[15]<=nu_PxlBbi
B[16]<=D(0,-1)
B[17]<=D(0,+1)
B[18]<=D(-1, 0)
B[19]<=D(-1,-1)
B[21]<=D(-2, 0)
B[22]<=D(-2,-1)
B[23]<=D(-2,+1)
B[24]<=E(0,-1)
B[25]<=E(0,+1)
B[26]<=E(-1, 0)
B[27]<=E(-1,-1)
B[28]<=E(-1,+1)
B[29]<=E(-2, 0)
B[30]<=E(-2,-1)
B[31]<=E(-2,+1)
Input Cl mux:
  Cl[0]<=0
  Cl[1]<=nu_PxlA
  Cl[2]<=D(0, 0)
  Cl[3]<=E(0, 0)
  Cl[4]<=MuxIn0
  Cl[5]<=MuxIn1
  Cl[6]<=MuxIn2
  Cl[7]<=MuxIn3
  Cl[8]<=nu_PxlAb
  Cl[9]<=nu_PxlBb
  Cl[10]<=nu_PxlAbi
  Cl[11]<=F(0, 0)
  Cl[12]<=F/Fd(0,-1)
  Cl[13]<=R15
  Cl[14]<=R14
  Cl[15]<=nu_PxlBbi
  Cl[16]<=D(0,-1)
  Cl[17]<=D(0,+1)
  Cl[18]<=D(-1, 0)
  Cl[19]<=D(-1,-1)
  Cl[21]<=D(-2, 0)
  Cl[22]<=D(-2,-1)
  Cl[23]<=D(-2,+1)
  Cl[24]<=E(0,-1)
  Cl[25]<=E(0,+1)
  Cl[26]<=E(-1, 0)
  Cl[27]<=E(-1,-1)
  Cl[28]<=E(-1,+1)
  Cl[29]<=E(-2, 0)
  Cl[30]<=E(-2,-1)
  Cl[31]<=E(-2,+1)
Input Ch mux:
  Ch[0]<=0
  Ch[1]<=nu_PxlB
  Ch[2]<=D(0, 0)
  Ch[3]<=E(0, 0)
  Ch[4]<=MuxIn0
  Ch[5]<=MuxIn1
  Ch[6]<=MuxIn2
  Ch[7]<=MuxIn3
  Ch[8]<=nu_PxlAb
  Ch[9]<=nu_PxlBb
  Ch[10]<=nu_PxlAbi
  Ch[11]<=F(0, 0)
  Ch[12]<=F/Fd(0,-1)
  Ch[13]<=R15
  Ch[14]<=R14
  Ch[15]<=nu_PxlBbi
  Ch[16]<=D(0,-1)
  Ch[17]<=D(0,+1)
  Ch[18]<=D(-1, 0)
  Ch[19]<=D(-1,-1)
  Ch[21]<=D(-2, 0)
  Ch[22]<=D(-2,-1)
  Ch[23]<=D(-2,+1)
  Ch[24]<=E(0,-1)
  Ch[25]<=E(0,+1)
  Ch[26]<=E(-1, 0)
  Ch[27]<=E(-1,-1)
  Ch[28]<=E(-1,+1)
  Ch[29]<=E(-2, 0)
  Ch[30]<=E(-2,-1)
  Ch[31]<=E(-2,+1)
Output G mux:
  G[0]<=Use G mux defined in dpu_CSR
  G[1]<=D
  G[2]<=E
  G[3]<=F
  G[4]<=D(+1, 0)
  G[5]<=E(+1, 0)
  G[6]<=NU_A
  G[7]<=NU_B
  G[8]<=MuxG, MuxG<=MuxInD0
  G[9]<=MuxG, MuxG<=MuxInD1
  G[10]<=MuxG, MuxG<=MuxInE0
  G[11]<=MuxG, MuxG<=MuxInE1
  G[12]<=PxlAb
  G[13]<=PxlBb
  G[14]<=PxlAbi
  G[15]<=PxlBb
  G[16]<=D(0,-1)
  G[17]<=D(0,+1)
  G[18]<=D(-1, 0)
  G[19]<=D(-1,-1)
  G[21]<=D(-2, 0)
  G[22]<=D(-2,-1)
  G[23]<=D(-2,+1)
  G[24]<=E(0,-1)
  G[25]<=E(0,+1)
  G[26]<=E(-1, 0)
  G[27]<=E(-1,-1)
  G[28]<=E(-1,+1)
  G[29]<=E(-2, 0)
  G[30]<=E(-2,-1)
  G[31]<=E(-2,+1)

Inputs (A, B, Cl, Ch, G) have muxes to (MuxIn0, . . . , MuxIn3) and two additional inputs. In order to save configuration bits, a dynamic resource allocation of (MuxIn0, . . . , MuxIn3) to (A, B, Cl, Ch, G)'s D(N,M) and E(N,M) configuration bits can be used. The allocation can be done as follows: if 1 or 2 of Input (A, B, Cl, Ch, G) configurations is of D(N,M) form, the first input allocates MuxIn0 and the second (if exist) allocates MuxIn1. For convenience, the inputs are denoted by inputD1 and inputD2 and the configuration is denoted by D1(N,M) and D2(N,M) respectively. The MuxIn0 and MuxIn1 muxes's control can be according to D1(N,M) and D2(N,M) respectively. Also, inputD1 and inputD2 muxes's control MuxIn0, MuxIn1. The same dynamic allocation can be applied if 1 or 2 of Input (A, B, Cl, Ch, G) configurations is of E(N,M) form, with MuxIn2 and MuxIn3.

For example:
Assuming the following configuration:
A=nu_PxlA
B=D(0,-1)

Cl=E(0,−1)
Ch=D(−1,0)
G=MUXIn0
Then the muteness's controls will be as followed:
MuxIn0=D(0,−1)
MuxIn1=D(−1,0)
MuxIn2=E(0,−1)
muxA=nu_PxlB
muxB=MuxIn0
muxCl=MuxIn2
muxCh=MuxIn1
muxG=MuxIn0
ALU Opcodes
Integer Operations
0. nop
1. addc: {Out1, Out0 }<=A+B+C
addc(v): Out0<=Al+Bl+Cl; Out1=Ah+Bh+Ch
2. adds: Out0<=(A+B)>>C; Out1<=(A+B)[C−1:0]
3. addl: {Out1, Out0}<={B, A}+C
addl(v): Out0<=A+Cl; Out1<=B+Ch
4. addrv: {Out1, Out0}<=Al+Bl+Ah+Bh+C
5. add4: {Out1, Out0 }<=A+B+Cl+Ch
6. subb: {Out1, Out0}<=A−B+C
subb(v): Out0<=Al−Bl+Cl; Out1=Ah−Bh+Ch
7. subc: {Out1, Out0}<=A+B−C
subc(v): Out 0<=Al+Bl−Cl; Out1=Ah+Bh−Ch
8. subl: {Out1, Out0}<={B, A}−C
subl(v): Out0<=A−Cl; Out1<=B−Ch
9. subrv: {Out1, Out0}<=Al+Bl+Ah+Bh−C
10. mac: {Out1, Out0}<=A*B+C
mac(v): Out0<=Al*Bl+Cl; Out1=Ah*Bh+Ch
11. macs: {Out1, Out0}<=A*B−C
macs(v): Out0<=Al*Bl−Cl; Out1=Ah*Bh−Ch
12. macrv: {Out1, Out0}<=(Al*Bl)+(Ah*Bh)+C
13. shift: {Out1, Out0}<=(A—B)<<C
shift(v): Out0<=(Al—Bl)>>Cl; Out1=(Ah—Bh)>>Ch
14. shiftrl: {Out0,Out1}<={B, A}>>C
shiftrl(v): Out0<=A>>Cl; Out1<=B>>Ch
15. shiftll: {Out0,Out1}<={B, A}<<C
shiftll(v): Out0<=A<<Cl; Out1<=B<<Ch
16. absd: {Out1, Out0}<=|A−B|+C
absd(v): Out0<=|Al−Bl|+Cl; Out1=|Ah−Bh|+Ch
17. absdrv: {Out1, Out0}<=|Al−Bl|+|Ah−Bh|+C
18. absddrv: {Out1, Out0}<=|Al−Bl|−|Ah−Bh|+C
19. min: {Out1, Out0}<=min ({B(val), A(Idx)}, C ({Val, Idx}))→output: Idx min
20. equalone: {Out1, Out0}<=min ({B(val), A(Idx)}, C ({Val, Idx}))→output: first operand
21. equaltwo: {Out1, Out0}<=min ({B(val), A(Idx)}, C ({Val, Idx}))→output: second operand
22. lessc: {Out1, Out0}<=(A<B)+C
lessc(v): Out0<=(Al<Bl)+Cl; Out1=(Ah<Bh)+Ch
23. lesseqc: {Out1, OUt0}<=(A<=B)+C
lesseq(v): Out0<=(Al<=Bl)+Cl; Out1=(Ah<=Bh)+Ch
24. equalc: {Out1, Out0}<=(A==B)+C
equalc(v): Out0<=(Al==Bl)+Cl; Out1=(Ah==Bh)+Ch
25. nequalc: {Out1, OUt0}<=(A!=B)+C
nequalc(v): Out0<=(Al!=Bl)+Cl; Out1=(Ah!=Bh)+Ch
26. lesscrv: {Out1, Out0}<=(Al<Bl)+(Ah<Bh)+C
27. lesseqcrv: {Out1, OUt0}<=(Al<=Bl)+(Ah<=Bh)+C
28. equalcrv: {Out1, Out0}<=(Al==Bl)+(Ah==Bh)+C
29. nequalcrv: {Out1, OUt0}<=(Al!=Bl)+(Ah!=Bh)+C
Floating Point Operations
The C exponent bias argument in conversions can be treated as a 7 bit signed integer (The other 25 bits of C can be ignored and the sign bit extended)
30. short2fp: {Out1, Out0}<=A*2**C
31. word2fp: {Out1, Out0}<={B, A}*2**C
32 lessf {Out1, Out0}<={B, A}<C
33 lesseqf {Out1, Out0}<={B, A}<=C
34. fp2word: {Out1, Out0}<={B, A}*2**C
35. mulf: {Out1, Out0}<={B, A}*C
36. addf: {Out1, Out0}<={B, A}+C
37. subf: {Out1, Out0}<={B, A}−C
38. int_div: {Out1, Out0}<=1/A
Addition Operations
39. or {Out0,Out1}<={B, A}|Cn
40. xor {Out0,Out1}<={B, A}^C
41. and {Out0,Out1}<={B, A} & C
42. equal32 {Out1, Out0}<={B,A}==C
43. nequal32 {Out1, Out0}<={B,A}!=C
44. less32 {Out1, Out0}<={B,A}<C
45. lesseq32 {Out1, Out0}<={B,A}<=C
46. abs32 {Out1, Out0}<=|{B,A}−C|
47. max32 {Out1, Out0}<=max ({B,A}, C)→output: 32max
48. minf {Out1, Out0}<=min ({B,A}, C)→output: fp min
49. maxf {Out1, Out0}<=max ({B,A}, C)→output: fp max
50. mac4 {Out1, Out0}<=(Al*Bl)+(Ah*Bh)+(C0*C2)+(C1*C3)+acc
mac4(v) Out0<=(Al*Bl)+(Ah*Bh)+acc0; Out1=(C0*C2)+(C1*C3)+acc1
51. shift_sat {Out1, Out0}<=Sat ({B,A}, C):rnd=byteMode:0 shortMode=1|notRELU:2
52. add_sat {Out1, Out0}<=Sat ({A+B}, C)
add_sat(v) {Out1, Out0}<=Sat ({Al+Bl}, C)
DPU Micro-Controller Instruction Coding
Execute Instructions:
[8:0] rc: Repeat Counter:
[0 . . . 495]: Immediate value
[496 . . . 511]: Counter[rc−496]
[10:9] sel: DPU Instruction Select
[11] gather: Activate the Gather Unit (only micro-controller 0)
[14:12] reserved
[15] Type 0
Do Loop:
[8:0] RLC: Repeat Loop Counter:
[0 . . . 495]: Immediate value
[496 . . . 511]: Counter[rc−496]
[13:9] Length: Loop Length: [1 . . . 32].
[14] Mode: 0:Count loops, 1:Count cycles
[15] Type 1

The DPUs may be configured one at a time (each DPU has a unique unicast address) or may be configured in a broadcast mode—there are addresses that may reflect the row and/or column of the DPUs that share the row and/or column and this allows to broadcast the configuration information.

Data Processing Array: Linear Mapping (programming single DPUs configuration registers)

| Address | Size | Registers |
| --- | --- | --- |
| 0x0004_6000 | 6KB | Ad[31:13] = 0x00001<br>Add[5:0]: DPU internal mapping<br>Add[9:6] = Col<br>Add[12:10] = Row |
| 0x0004_6000 | 1KB | DPU Row 0 |
| 0x0004_6000 | 64B | DPU(0,0) |
| 0x0004_6040 | 64B | DPU(0,1) |
| ... | | |
| 0x0004_63C0 | 64B | DPU(0,15) |
| 0x0004_6400 | 1KB | DPU Row 1 |
| 0x0004_6800 | 1KB | DPU Row 2 |

-continued

| Address | Size | Registers |
|---|---|---|
| 0x0004_6C00 | 1KB | DPU Row 3 |
| 0x0004_7000 | 1KB | DPU Row 4 |
| 0x0004_7400 | 1KB | DPU Row 5 |
| ... | | |
| 0x0004_77C0 | 64B | DPU(5,15) |

Data Processing Array: Broadcast Mapping (programming configuration registers of multiple DPUs concurrently)

| Address | Size | Registers |
|---|---|---|
| 0b0001_rrrr_rrcc_cccc cccc_cccc_cc00_0000 | 64KB | Add[31:28] = 0x1 => DPA broacast mapping  Add[27:22]: Row Enable (1 bit per row)  Add[21:6]: Column Enable (1 bit per column)  Add[5:0]: DPU Configuration Address |

It should be noted that any image processing algorithm may be executed by the image processor in an iterative manner Results regarding some pixels are processed by the DPA 500. Some of the results may be stored in the DPA for a certain period of time and then sent to the memory module. The certain period of time is usually set based on the size of the memory resources of the PMA and the amount of source or target pixels that are processed by the DPA during a certain task. Once these results are needed again they may be fetched from the memory module. For example, when the DPA 500 performs calculations regarding certain source pixels of a source image, these results may be stored for a certain period (for example when performing calculations relating to adjacent source pixels) and then sent to the memory. When the results are further required they may be fetched from the memory module.

Warp Calculation

Warp calculation may be applied for various reasons. For example, to compensate for image acquisition imparities.

The warp calculation may be executed by the DPA 500.

According to an embodiment of the invention, the warp calculation is applied for each target pixel (a pixel of a target image) out of a group of target pixels. The group of target pixels may include the entire target image or a part of the target image. Usually, the target image is virtually segmented to multiple windows and each window is a group of target pixels.

The warp calculation may receive or may calculate a corresponding group of source pixels. Source pixels of the corresponding group of source pixels are processed during the warp calculation. The selection of the corresponding group of source pixels is usually fed to the PMA and may depend, for example, on the desired warp function.

The warped value of a target pixel is calculated by applying weights (Wx, Wy) on neighboring source pixels associated with the target pixel. The weights and coordinates (x,y) of at least one of the neighboring source pixels are defined in warp parameters (X', Y').

Figure 17:
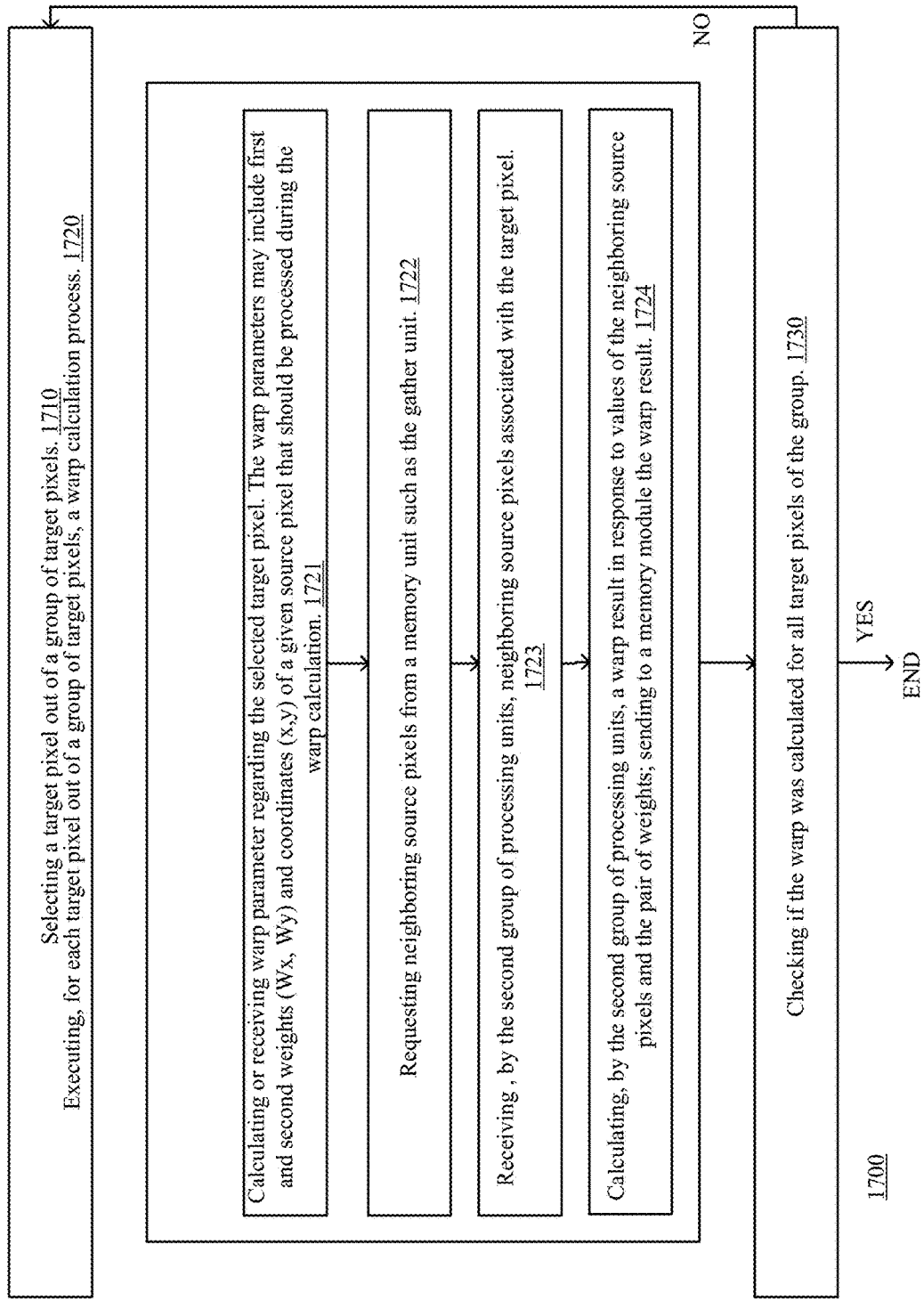
FIG. 17 illustrates a warp calculation method according to an embodiment of the invention.

FIG. 17 illustrates method 1700 according to an embodiment of the invention.

Method 1700 may start by step 1710 of selecting a target pixel out of a group of target pixels. The selected target pixel will be referred to as "the target pixel".

Step 1710 may be followed by step 1720 of executing, for each target pixel out of a group of target pixels, a warp calculation process that includes:

1) Calculating (1721) or receiving warp parameter regarding the selected target pixel. The warp parameters may include first and second weights (Wx, Wy) and coordinates (x,y) of a given source pixel that should be processed during the warp calculation. The first and second weights are received by first group of processing units (DPUs) of the array of processing units (DPA).
2) Requesting (1722) neighboring source pixels (that include the given source pixel) from a memory unit such as the gather unit. The gather unit may, in various operational modes, receive 4 coordinates and convert them to sixteen source pixels—four groups of neighboring source pixels.
3) Receiving (1723), by the second group of processing units, neighboring source pixels associated with the target pixel.
4) Calculating (1724), by the second group of processing units, a warp result in response to values of the neighboring source pixels and the pair of weights; providing to a memory module the warp result.

Figure 18:
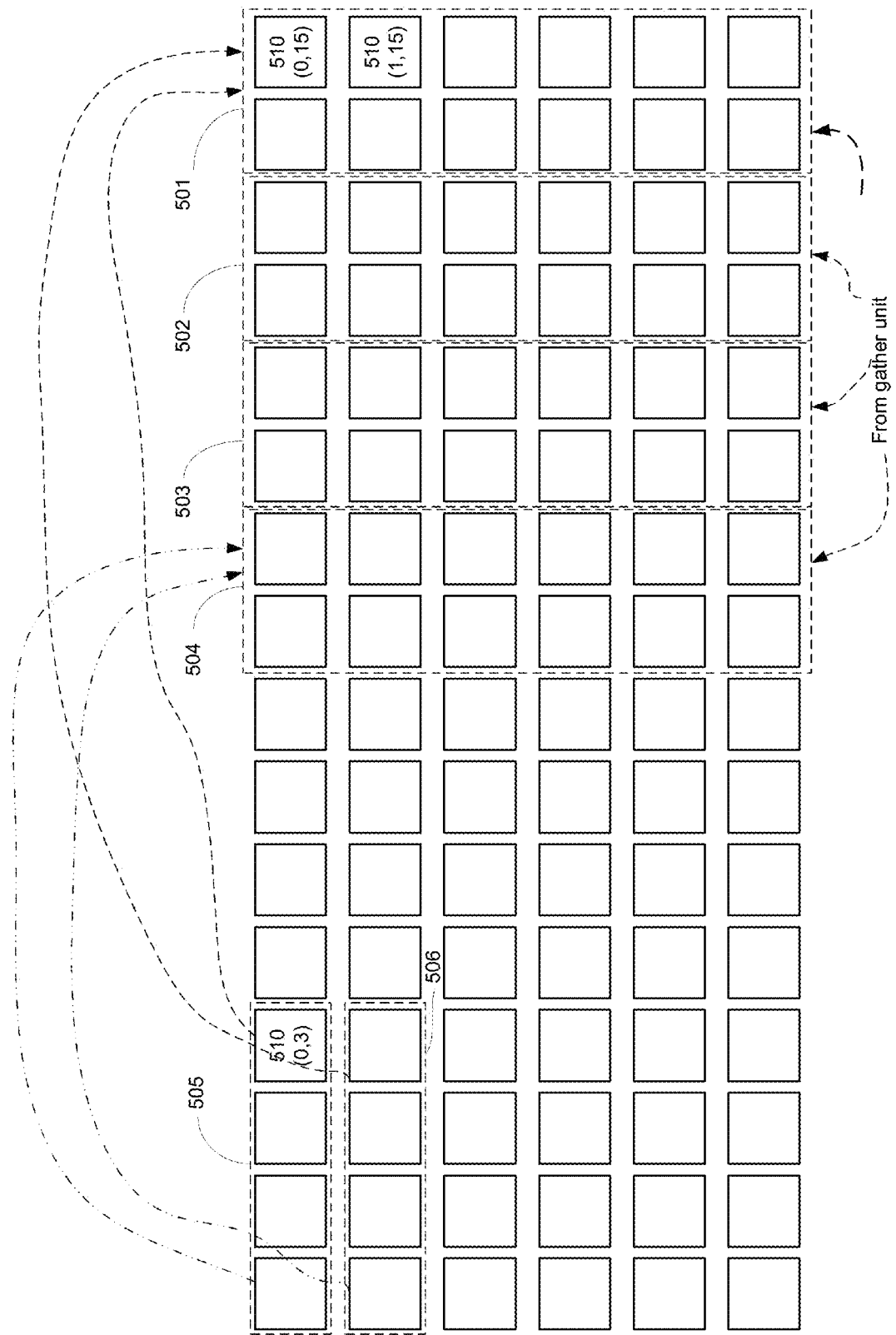
FIGS. 18 and 19 illustrate an array of data processors that perform warp calculations according to an embodiment of the invention.

Steps 1721, 1722, 1723 and 1724 may be executed in a pipelined manner Referring to FIG. 18—the first group of processing units is denoted 505 and may include the four leftmost DPUs of the first upper rows of DPA 500. The second group of processing units is denoted 501 and may include the two rightmost columns of DPA 500.

Step 1720 is followed by step 1730 of checking if the warp was calculated for all target pixels of the group. If no—ending the warp calculation.

Step 1726 may include relaying values of some of the neighboring source pixels between processing units of the second group.

Figure 19:
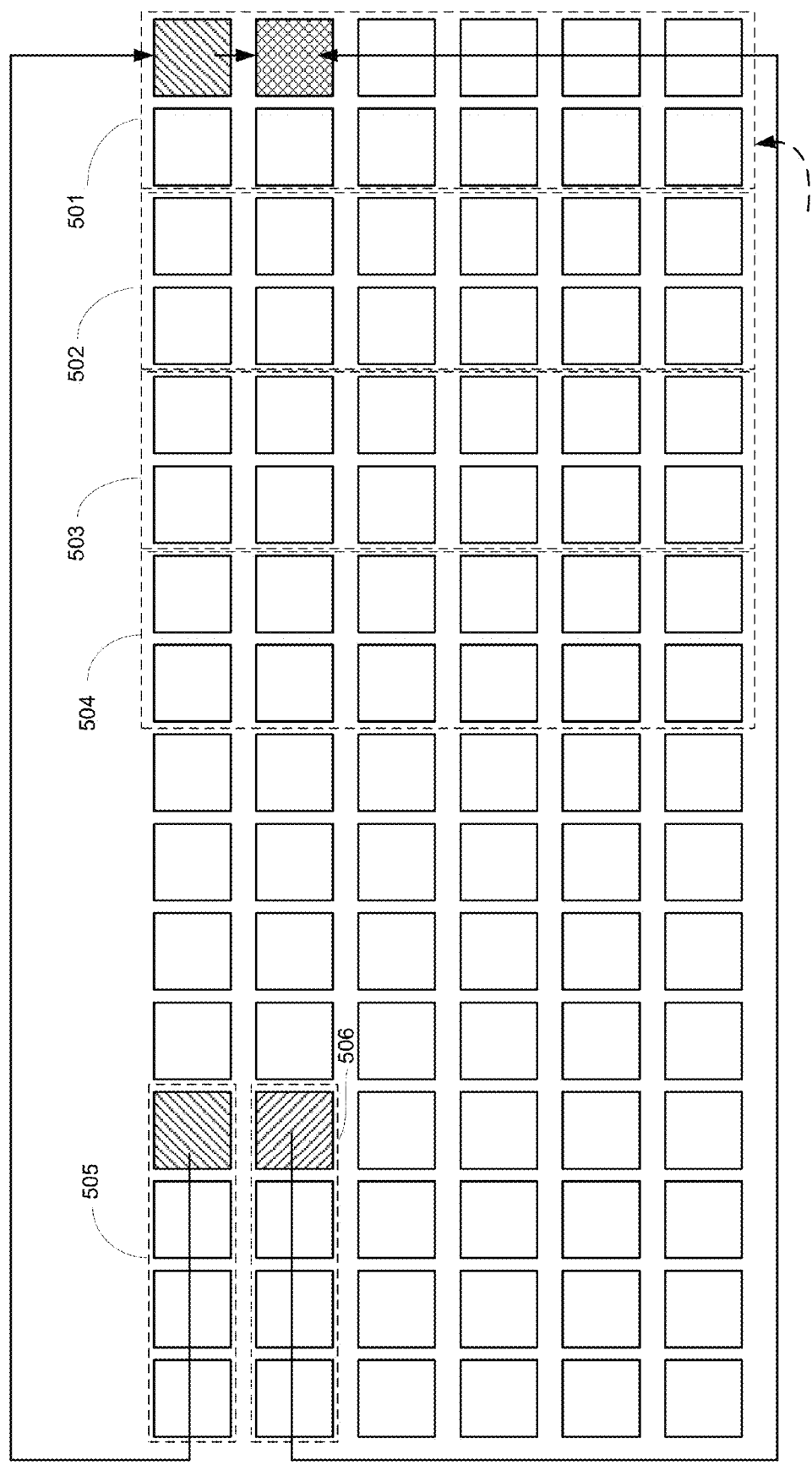

FIGS. 18 and 19 illustrates that the output signal (X' for group 504) of DPU(0,4) is sent to DPU(0,15) and is then relayed to DPU(1,15). It should be noted that in FIGS. 18 and 19 the PMA calculate warp functions for four pixels in parallel:
1) DPU(0,3), DPU(1,3) and the DPUs of group 501 are involved in calculating the warp of a first pixel.
2) DPU(0,2), DPU(1,2) and the DPUs of group 502 are involved in calculating the warp of a second pixel.
3) DPU(0,1), DPU(1,1) and the DPUs of group 503 are involved in calculating the warp of a third pixel.
4) DPU(0,0), DPU(1,0) and the DPUs of group 504 are involved in calculating the warp of a third pixel.

Step 1726 may include relaying intermediate results calculated by the second group and values of some of the neighboring source pixels between processing units of the second group.

Figure 20:
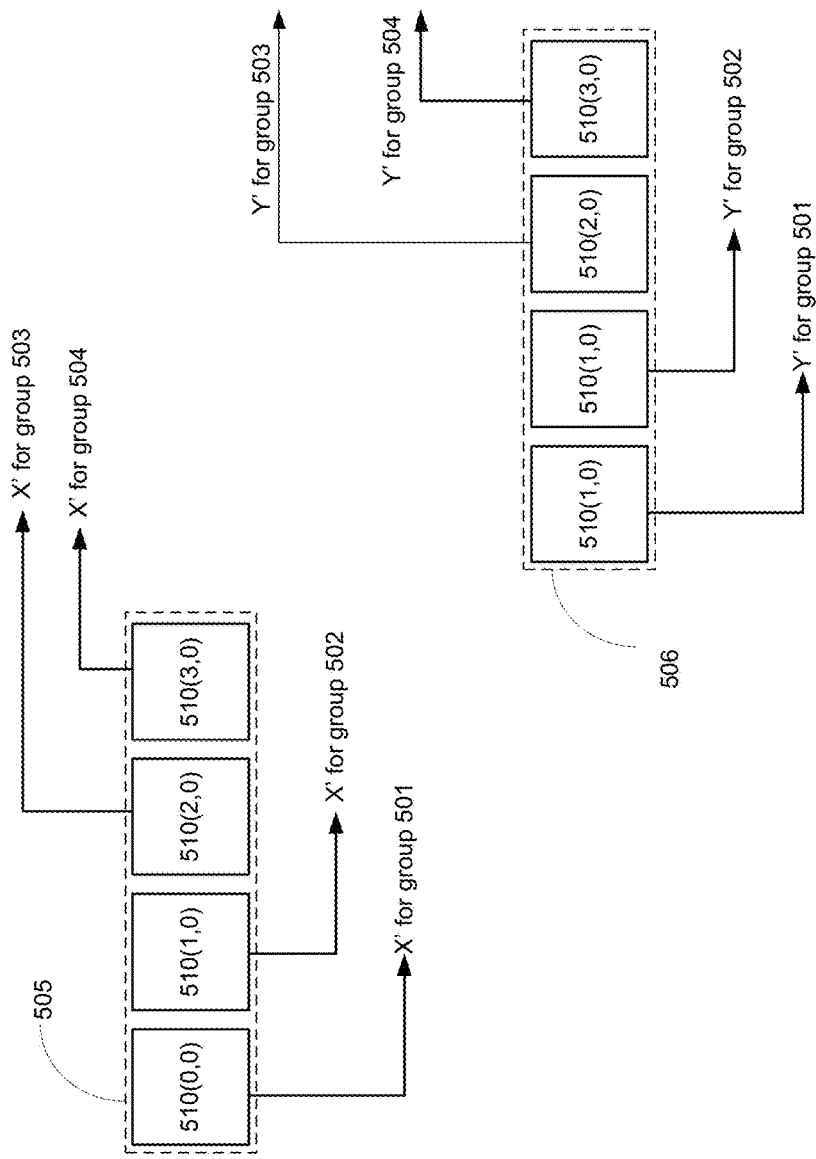
FIG. 20 illustrates warp parameters that are outputted from various data processor according to an embodiment of the invention.

FIG. 20 illustrates the warp parameters (X' for groups 501-504 and Y' for groups 501-504) sent from DPUs (510 (0,0)-510(0,3) and 510(1,0)-510(1,3)) of groups 505 and 506 to groups 501, 502, 503 and 504.

Figure 21:
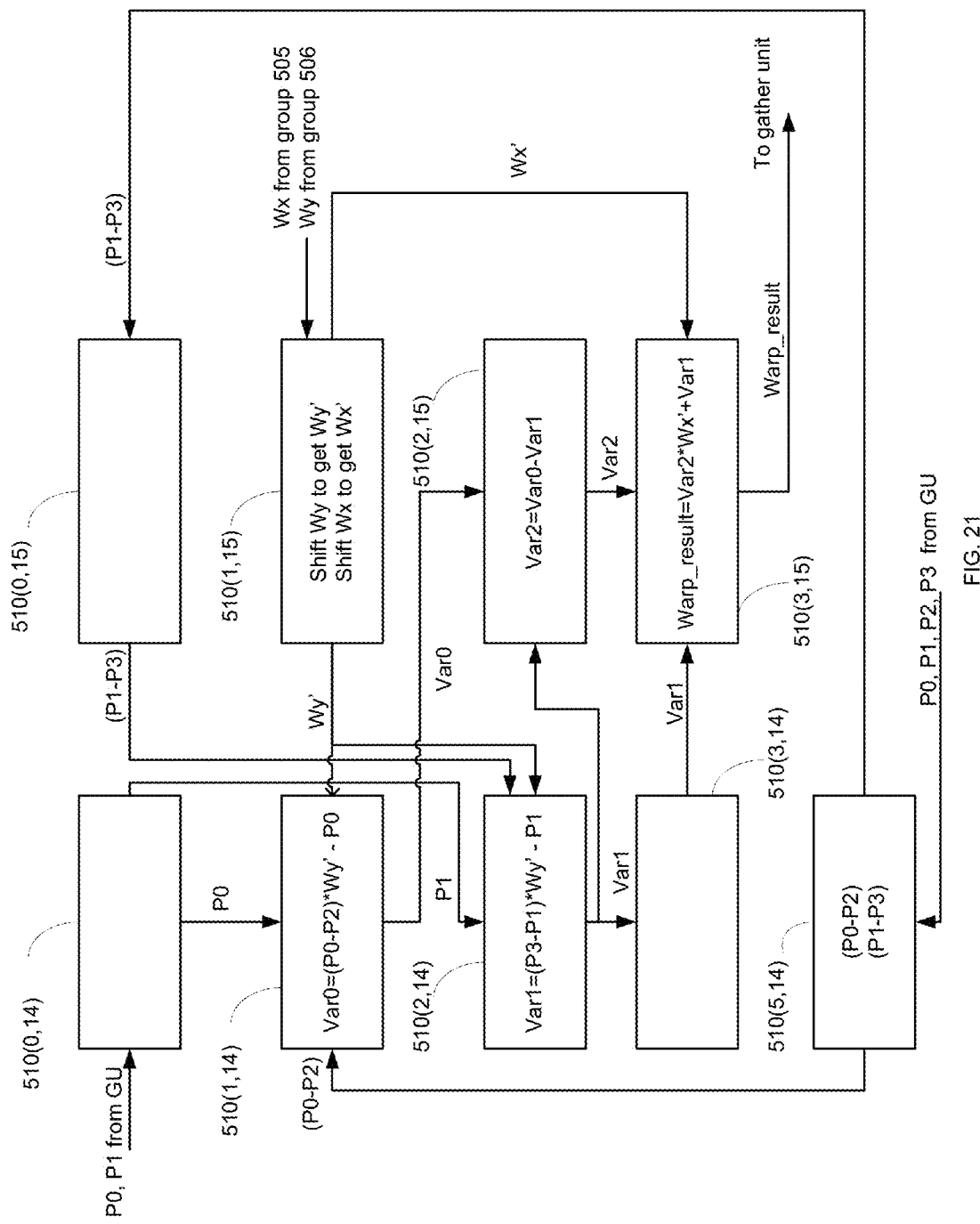
FIG. 21 illustrates a group of data processors that perform warp calculations according to an embodiment of the invention.
Figure 22:
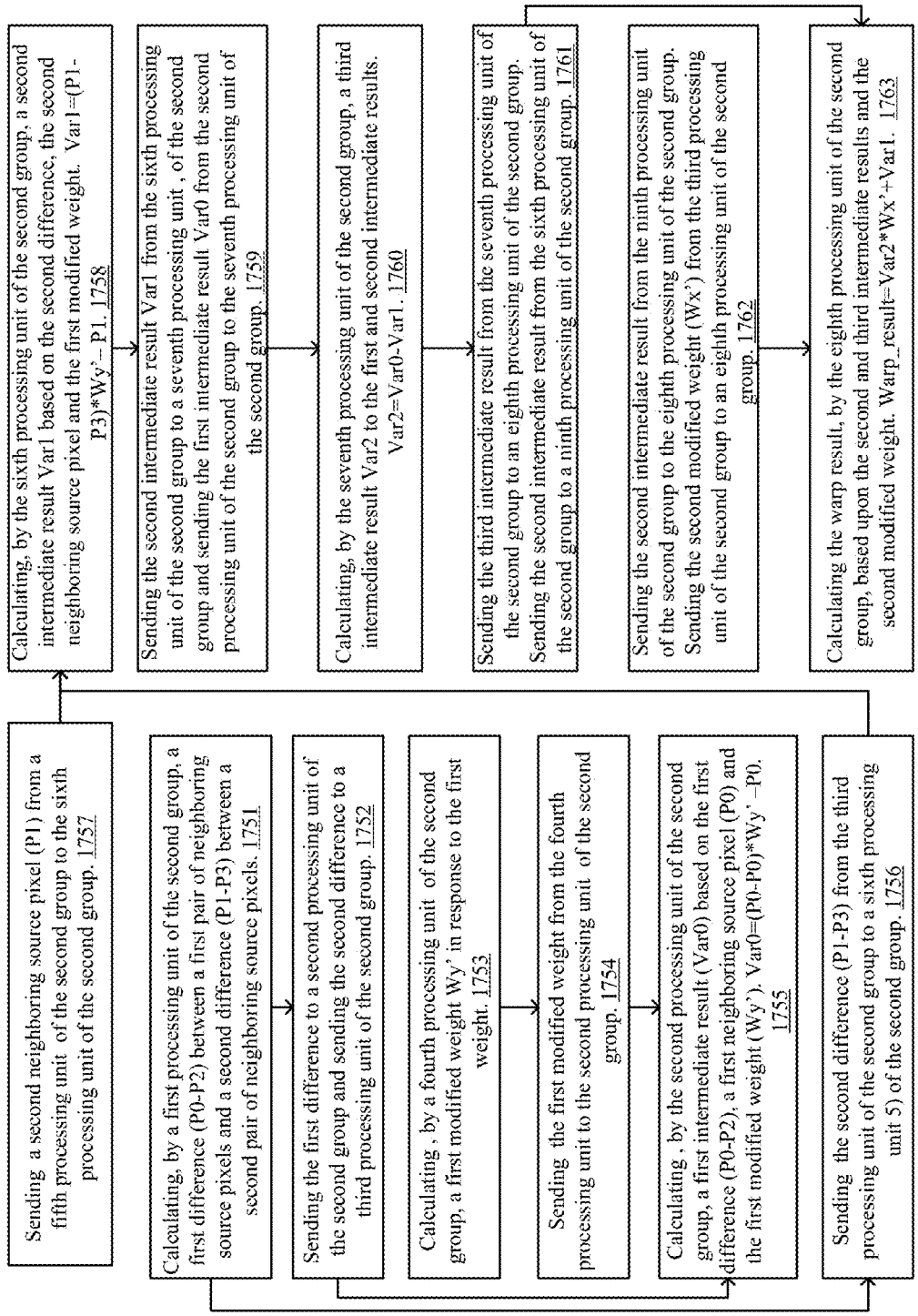
FIG. 22 illustrates a warp calculation method according to an embodiment of the invention.

FIGS. 21 and 22 illustrates a warp calculation executed by DPUs 510(0,15)-510(3,15) and DPUs 510(0,14)-510(5,14) of group 501 according to an embodiment of the invention.

The warp calculation of FIG. 21 includes the following steps (some of which are executed in parallel to each other). Steps 1751-1762 are also illustrated in FIG. 22.

Calculating (1751), by a first processing unit (DPU 510 (5,14)) of the second group, a first difference (P0–P2) between a first pair of neighboring source pixels and a second difference (P1–P3) between a second pair of neighboring source pixels.

Providing (1752) the first difference to a second processing unit (DPU 510(1,14)) of the second group and providing the second difference to a third processing unit of the second group.

Calculating (1753), by a fourth processing unit (DPU 510(1,15)) of the second group, a first modified weight Wy' in response to the first weight.

Providing (1754) the first modified weight from the fourth processing unit to the second processing unit (DPU 510(1, 14)) of the second group.

Calculating (1755), by the second processing unit of the second group, a first intermediate result (Var0) based on the first difference (P0–P2), a first neighboring source pixel (P0) and the first modified weight (Wy'). Var0=(P0–P0)*Wy'–P0.

Providing (1756) the second difference (P1–P3) from the third processing unit of the second group to a sixth processing unit ((DPU 510(0,15) of the second group.

Providing (1757) a second neighboring source pixel (P1) from a fifth processing unit (DPU 510(0,14)) of the second group to the sixth processing unit (DPU 510(2,14)) of the second group.

Calculating (1758), by the sixth processing unit of the second group, a second intermediate result Var1 based on the second difference, the second neighboring source pixel and the first modified weight. Var1=(P1–P3)*Wy'–P1.

Providing (1759) the second intermediate result Var1 from the sixth processing unit of the second group to a seventh processing unit (DPU 510(2,15)) of the second group and providing the first intermediate result Var0 from the second processing unit of the second group to the seventh processing unit of the second group.

Calculating (1760), by the seventh processing unit of the second group, a third intermediate result Var2 to the first and second intermediate results. Var2=Var0–Var1.

Providing (1761) the third intermediate result from the seventh processing unit of the second group to an eighth processing unit (DPU 510(3,15)) of the second group. Providing the second intermediate result from the sixth processing unit of the second group to a ninth processing unit (DPU 510(3,14)) of the second group.

Providing (1762) the second intermediate result from the ninth processing unit of the second group to the eighth processing unit of the second group. Providing the second modified weight (Wx') from the third processing unit of the second group to an eighth processing unit of the second group.

Calculating (1763) the warp result, by the eighth processing unit of the second group, based upon the second and third intermediate results and the second modified weight. Warp_result=Var2*Wx'+Var1.

As illustrated in FIG. 20, DPU 510(5,14) may receive pixels P0, P1, P2 and P3 from the gather unit. When the DPA 500 processes four pixel at a time, groups 501, 502, 503 and 504 receive sixteen pixels (in parallel) from the gather unit.

It should be noted that the DPA 500 also receives (for example—from the gather unit) the warp parameters X', Y' related to each pixel.

According to an embodiment of the invention the warp parameters for each pixel may be calculated by DPUs of the DPA—for example when the warp parameters may be represented by a mathematical formula such as a polynomial.

Figure 23:
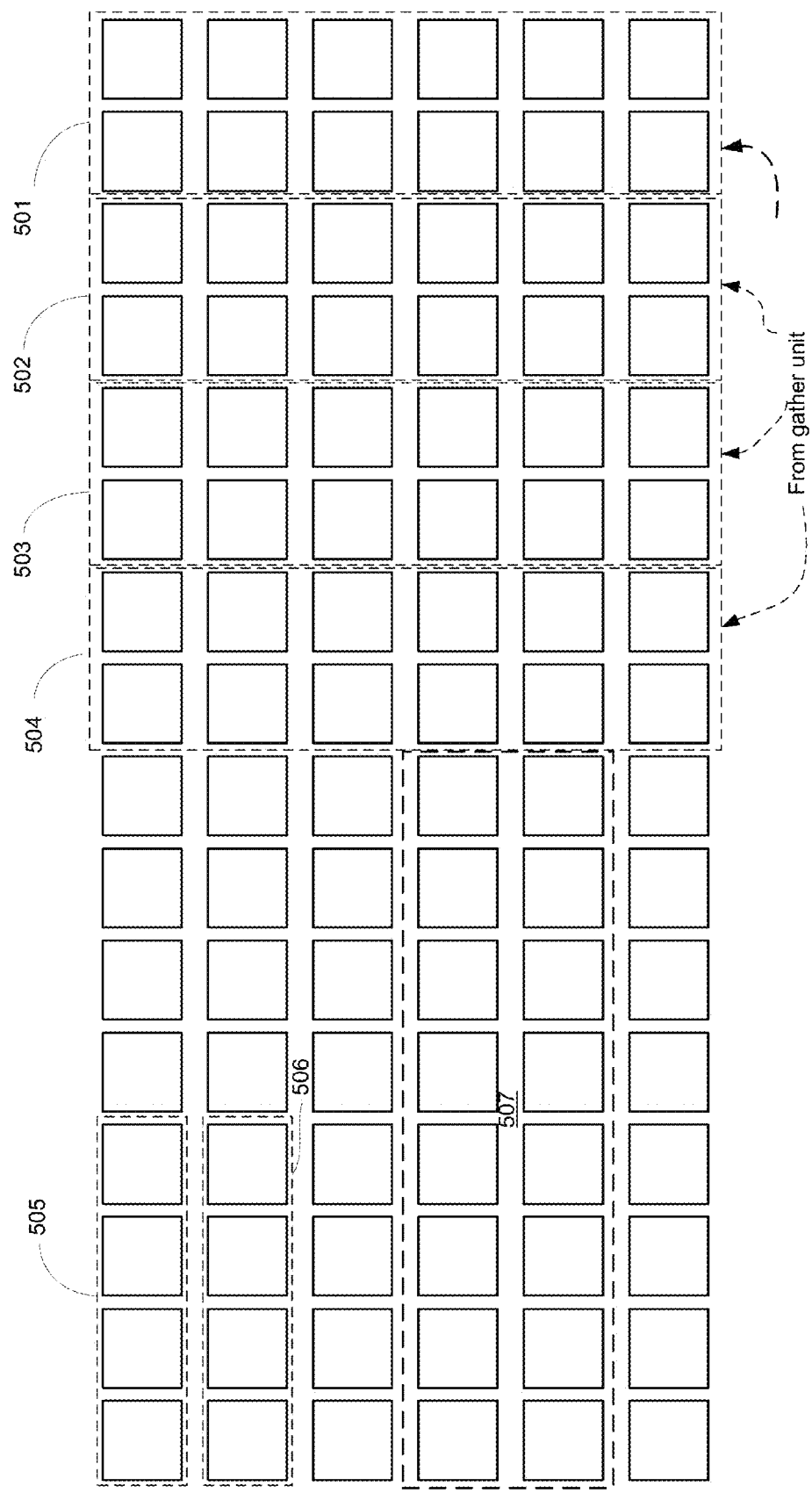
FIG. 23 illustrates a group of processing units according to an embodiment of the invention.

FIG. 23 illustrated a group of DPUs 507 that calculate X' and Y' and these calculated X' and Y' may be fed to groups 505 and 506.

It should be noted FIGS. 18-22 illustrate only non-limiting grouping schemes. The warp calculations can be executed by groups of DPUs of other shapes and size.

Disparity

Disparity calculation aims to find for a source pixel the best matching target pixel. The search may be executed for all source pixels in a source image and for all target pixels of a target image—but this is not necessarily so and the disparity may be applied only on some source pixels of the source image and/or on some target pixels of the target image.

The disparity calculation does not compare just the differences between a single source pixel to a single target pixel but compares a subgroup of source pixels to a subgroup of target pixels. The comparison may include calculating a function such as a sum of absolute differences (SAD) between source pixels and corresponding target pixels.

The source pixels may be positioned at the center of the source pixels subgroup and the target pixel may be positioned at the center of subgroup of target pixels. Other positions of the source and/or target pixels may be used.

The subgroup of source pixels and the subgroup of target pixels may be rectangular shaped (or may have any other shapes) and may include N rows and N columns, whereas N may be an odd positive integer that may exceed three.

Most of the disparity calculations may benefit from previously computer disparity calculation. Such examples are provided in FIGS. 24 and 25.

Figure 24:
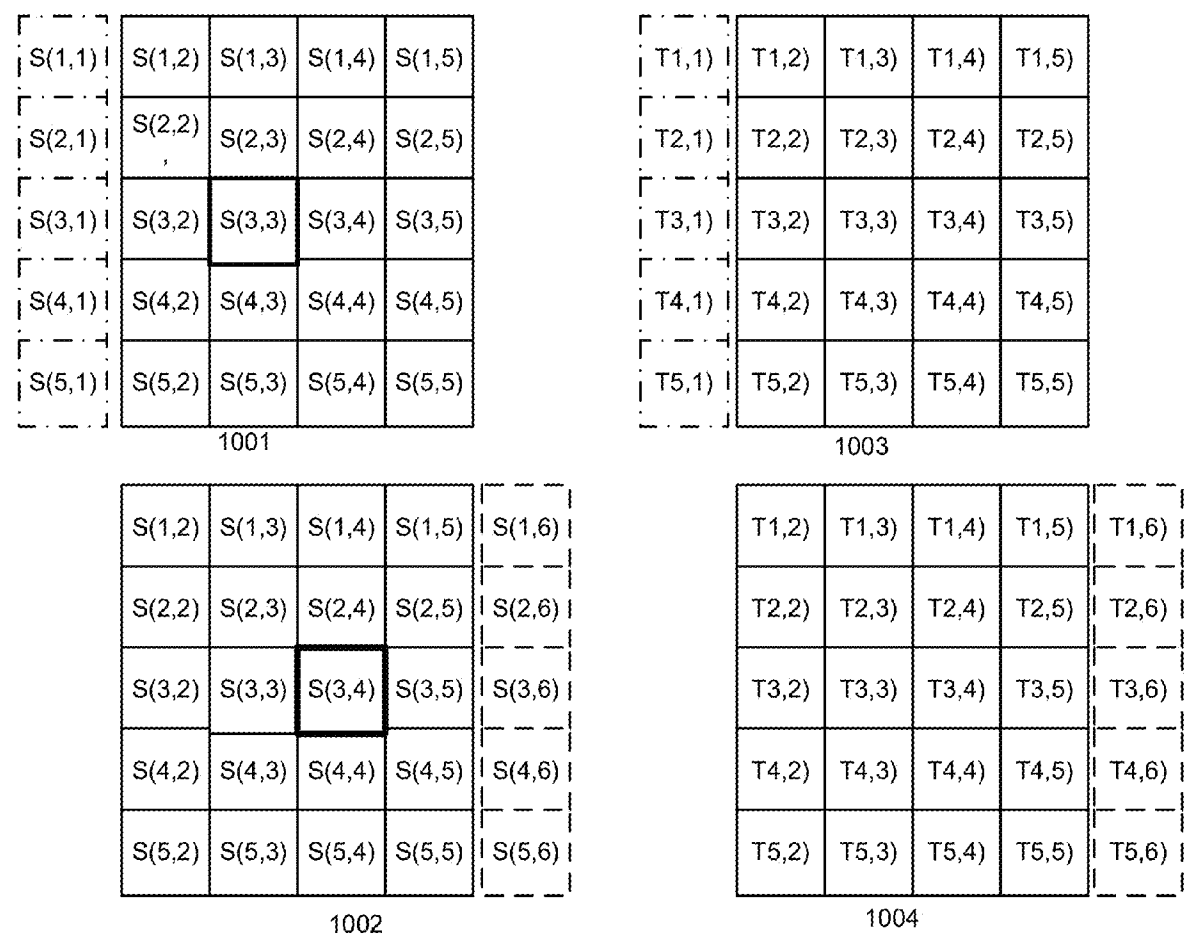

FIG. 24 illustrates a first subgroup 1001 of 5×5 source pixels S(1,1)-S(5,5), a first subgroup 1002 of 5×5 target pixels T(1,1)-T(5,5), a second subgroup 1003 of 5×5 source pixels S(1,2)-S(5,6) and a second subgroup 1004 of 5×5 target pixels T(1,2)-T(5,6).

Source pixels S(3,3) and S(3,4) are in the center of first subgroup 1001 and second subgroup 1003 of source pixels. Target pixels T(3,3) and T(3,4) are in the center of first subgroup 1002 and second subgroup 1004 of target pixels.

The SAD related to S(3,3) and T(3,3) equals: SAD(S(3,3),T(3,3))=SUM(|S(i,j)–T(i,j)|)—for indexes i and j between 1 and 5.

The SAD related to S(3,4) and T(3,4) equals: SAD(S(3,4),T(3,4))=SUM(|S(i,j)–T(i,j)|)—for index i between 2 and 6 and for index j between 1 and 5.

It is assumed that the SADs are calculated from left to right. Under this assumption—the calculation of SAD(S(3,4), T(3,4)) may benefit from the calculation of SAD(S(3,3), T(3,3)).

Especially: SAD(S(3,4), T(3,4))=SAD(S(3,3), T(3,3))–SAD(rightmost columns of first subgroups of source and target pixels)+SAD(leftmost columns of second subgroups of source and target pixels).

As source and target images are two dimensional and assuming that the source pixels are scanned from left to right (per slice) and from up to down—then the calculation of a SAD is even more efficient.

Figure 25:
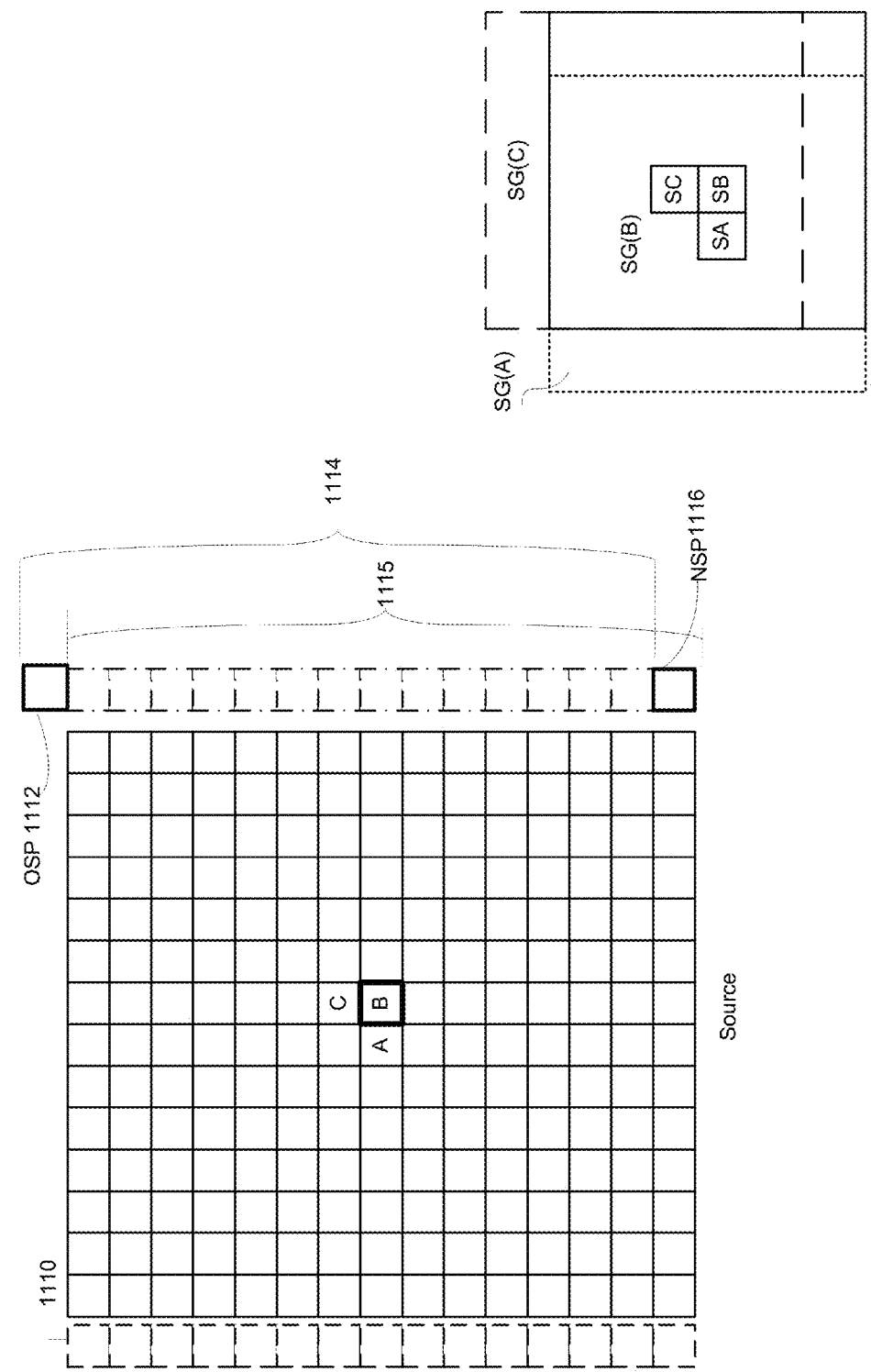
FIG. 25 illustrates a subgroup SG(B) of source pixels having a center pixel SB.
Figure 26:
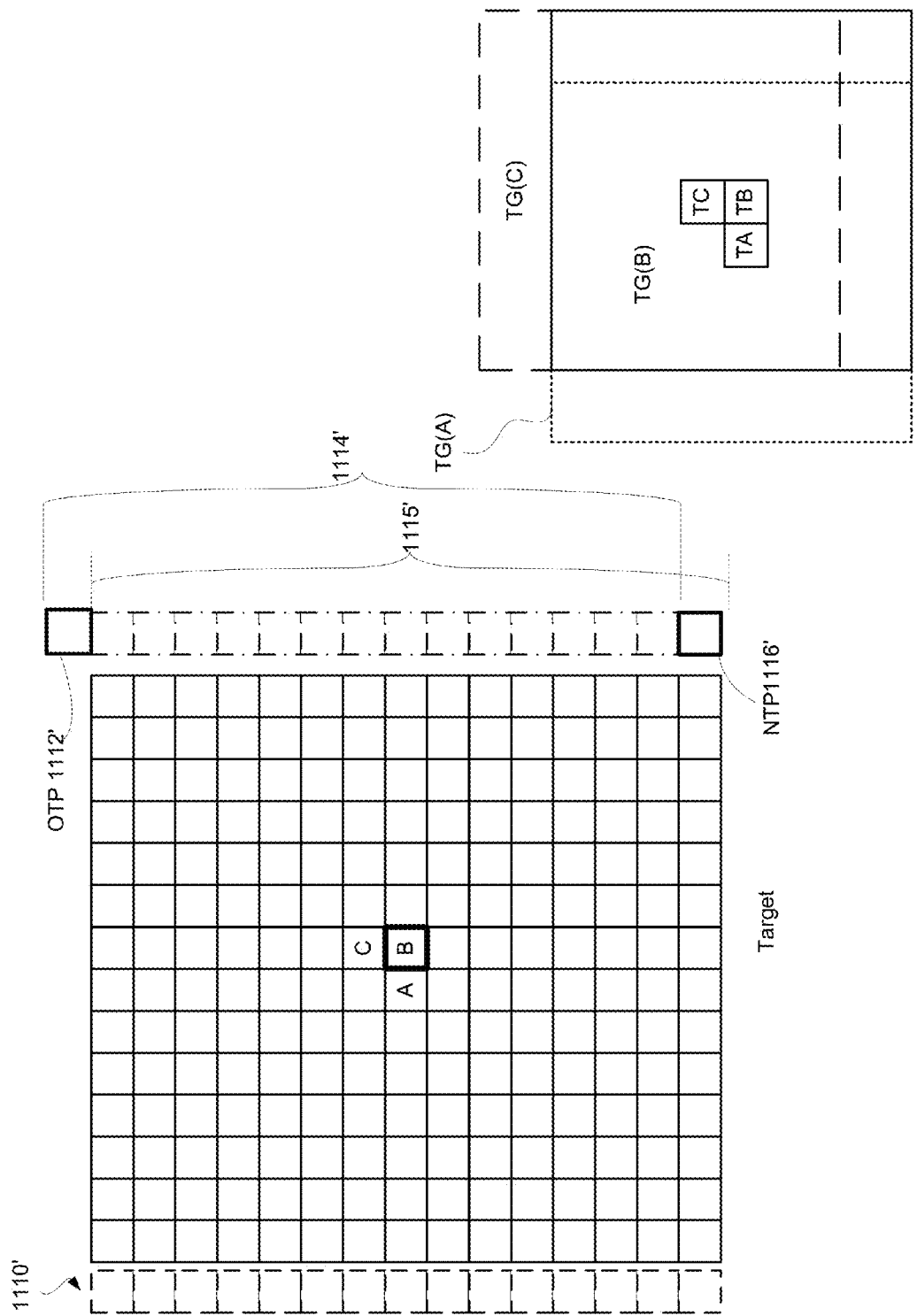
FIG. 26 illustrates a corresponding subgroup TG(B) of target pixels (not shown) having a center pixel TB.

FIG. 25 illustrates a subgroup SG(B) of source pixels having a center pixel SB. FIG. 26 illustrates a corresponding subgroup TG(B) of target pixels (not shown) having a center pixel TB.

SUD was calculated for the source pixels of rows that are above the row of SB and for pixels that are positioned to the left of SB and at the same row.

Pixel SA is the center of subgroup SG(A) and is the left neighbor of pixel SB. Target pixel TA is the left neighbor of pixel SB and is the center of subgroup TG(A).

Pixel SC is the center of subgroup SG(C) and is the upper neighbor of pixel SB. Target pixel TC is the upper neighbor of pixel SB and is the center of subgroup TG(C).

The leftmost column of SG(A) is denoted 1110. The rightmost column of SG(C) is denoted 1114. The current rightmost column of SG(B) is denoted 1115. The rightmost lowest pixel of SG(B) {also referred to as new source pixel NSP} is denoted 1116. The old pixel (belongs to SG(C)) {also referred to as old source pixel NSP} that is on top of the current right most column of SG(B) is denoted 1112.

The leftmost column of TG(A) is denoted 1110'. The rightmost column of TG(C) is denoted 1114'. The current rightmost column of TG(B) is denoted 1115'. The rightmost lowest pixel of TG(B) {also referred to as new target pixel NTP} is denoted 1116'. The old pixel (belongs to TG(C)) {also referred to as old target pixel NTP} that is on top of the current right most column of TG(B) is denoted 1112'.

Calculating the SAD for (SB,TB) may equal:
SAD(SA,TA).
−SAD(leftmost column of SG(A), leftmost column of SG(B)).
+SAD(rightmost column of SG(C), right most column of TG(C)).
+Absolute difference of the lowest right most source and target pixels of SG(B) and TG(B).
−Absolute difference of the upmost source and target pixels of the rightmost columns of SG(C) and TG(C).

Figure 27:
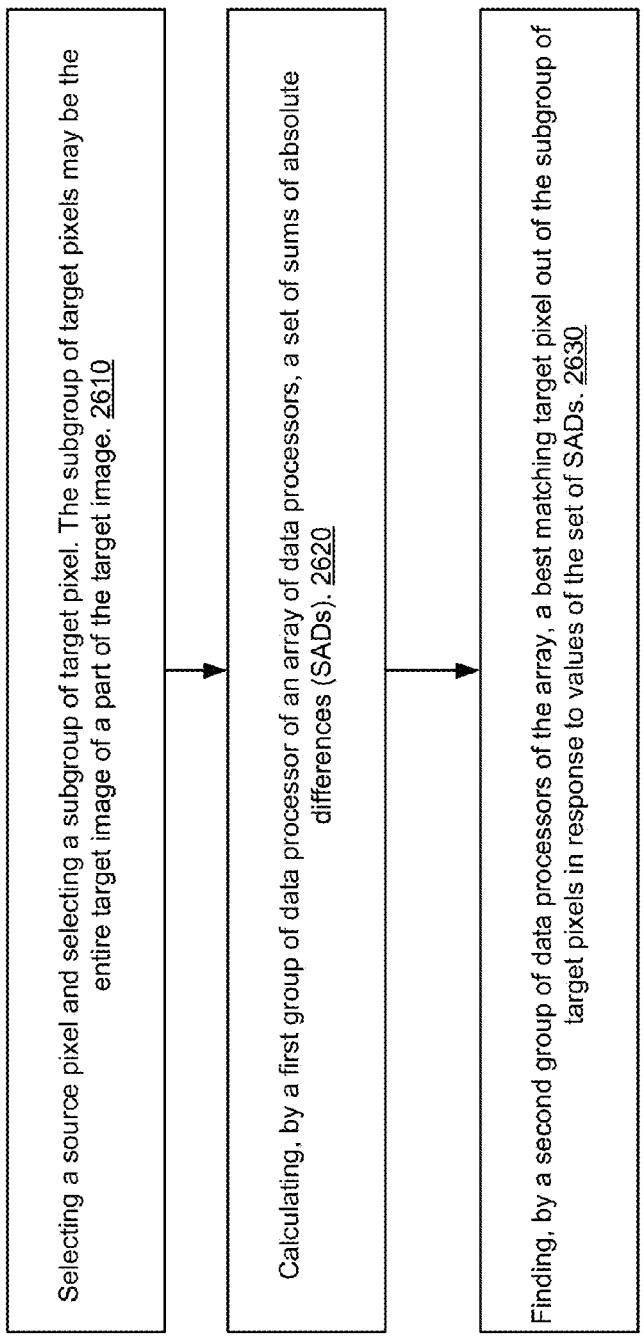
FIG. 27 illustrates method according to an embodiment of the invention.

FIG. 27 illustrates method 2600 according to an embodiment of the invention.

Method 2600 may start by step 2610 of selecting a source pixel and selecting a subgroup of target pixel. The subgroup of target pixels may be the entire target image of a part of the target image.

Step 2610 may be followed by step 2620 of calculating, by a first group of data processor of an array of data processors, a set of sums of absolute differences (SADs).

The set of SADs is associated with the source pixel and a subgroup of target pixels that includes the target pixel selected in step 2610. Different SADs of the set is calculated in relation to the (same) source pixel and to different target pixels of the subgroup of target pixels.

Calculating the set of SADs for the same source pixel reduces the amount of data that is fetched to the DPA.

The subgroup of target pixels may include target pixels that are sequentially stored in a memory module. The calculating of the set of SADs is preceded by fetching the subgroup of target pixels from the memory module. The fetching of the subgroup of target pixels from the memory module is executed by a gather unit that comprises a content addressable memory cache.

Each SAD is calculated based on previously calculated SADs and on currently calculated absolute difference between other source pixels and other target pixels that belongs to the subgroup of target pixels. FIG. 25 provide an example of such a computation.

Step 2620 may be followed by step 2630 of finding, by a second group of data processors of the array, a best matching target pixel out of the subgroup of target pixels in response to values of the set of SADs.

Step 2620 and 2630 may include storing in the array of data processors the calculated results—SADs of an entire rectangular array of pixels, SADs of columns, and the like. It should be noted that the depth of the register file of each DPU may be long enough to store the SAD of the rightmost column of the previous rectangular array. For example—if there are 15 columns in SG(A) then the register file 550 of the DPU should be at least fifteen.

After storing previous SADs then for the given SAD, the first previously calculated SAD, the second previously calculated SAD, the target pixel that is positioned on top of the second target pixel column and the source pixel that is positioned on top of the second source pixel column Referring to step 2620—the first previously calculated SAD may reflect absolute differences between (i) a rectangular source pixel array that differs from the given rectangular source pixel array by a first source pixel column and by a second source pixel column, and (ii) a rectangular target pixel array that differs from the given rectangular target pixel array by a first target pixel column and by a second target pixel column For example—SAD(SA,TA).

The second previously calculated SAD may reflects absolute differences between the first source column and the first source column For example—SAD(leftmost column of SG(A), leftmost column of SG(B)).

Step 2620 may include:
1) Calculating an intermediate result by subtracting, from the first previously calculated SAD (for example SAD(SA,TA)), (a) the second previously calculated SAD (for example—SAD(leftmost column of SG(A), leftmost column of SG(B)), and (b) an absolute difference between (i) a target pixel that is positioned on top of the second target pixel column and (ii) a source pixel that is positioned on top of the second source pixel column (for example—absolute difference between OSP 1112 and OTP 1112').
2) Adding to the intermediate result an absolute difference between the lowest target pixel of the second target pixel column and the lowest source pixel of the second source pixel column (for example—absolute difference between NSP 1116 and NTP 1116').

It should be noted that finding the best matching target pixel may involve an iterative process and that multiple repetitions of steps 2610, 2620 and 2630 may be performed—for different subgroups of pixels and that by comparing the results of these multiple iteration—the best matching target pixel of the group of target pixels may be found.

It is also noted that the array of processing units may perform multiple disparity calculations (for different source pixels and/or for different target pixels) in parallel.

Figure 28:
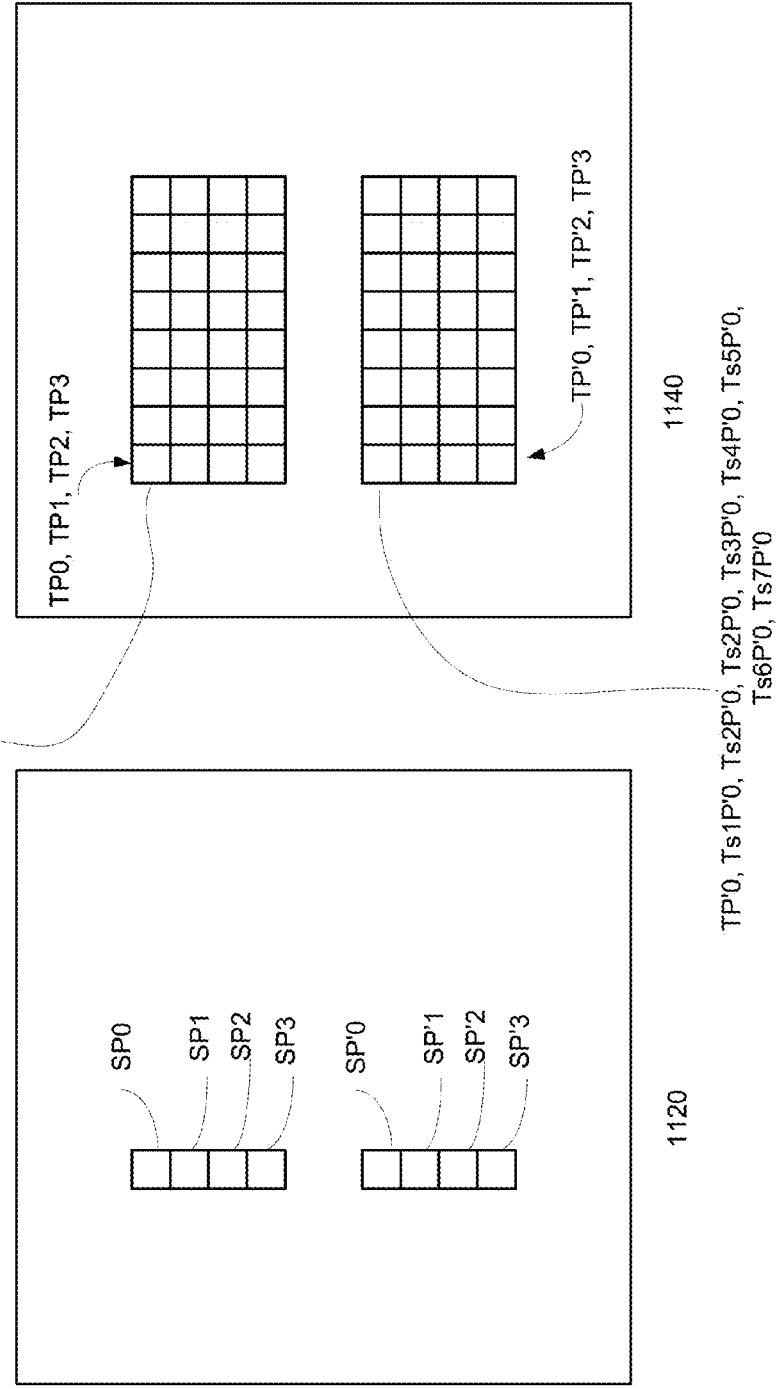
FIG. 28 illustrates eight source pixels and thirty two target pixels that are processed by the DPA according to an embodiment of the invention.
Figure 29:
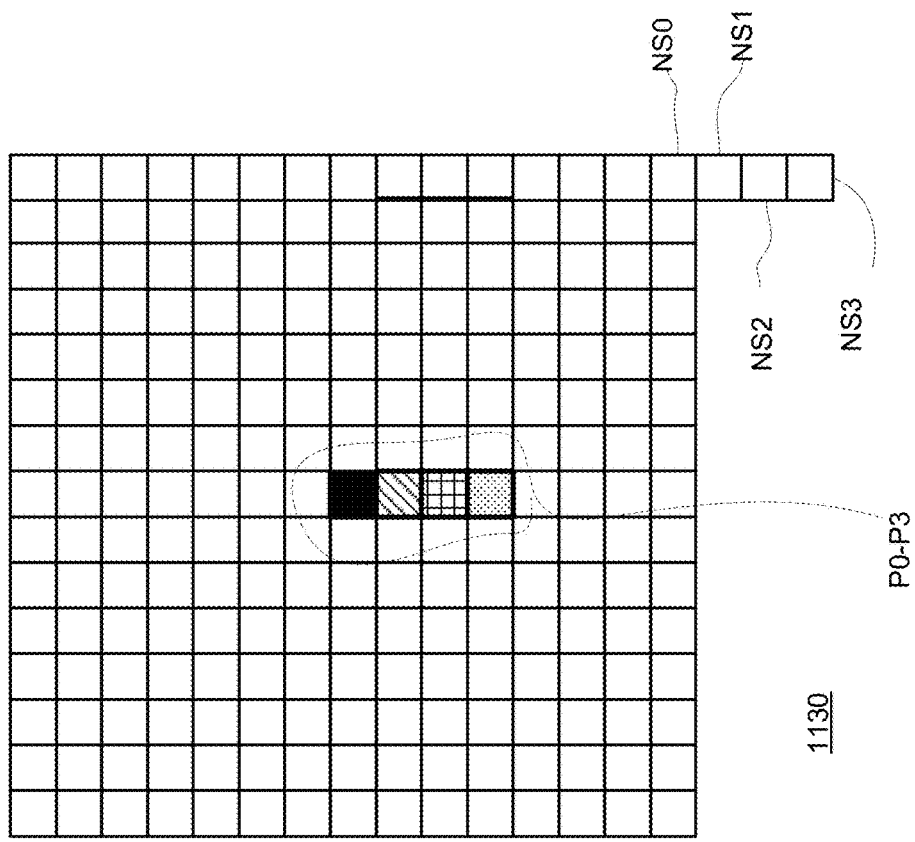
FIG. 29 illustrates an array of source pixels according to an embodiment of the invention.
Figure 30:
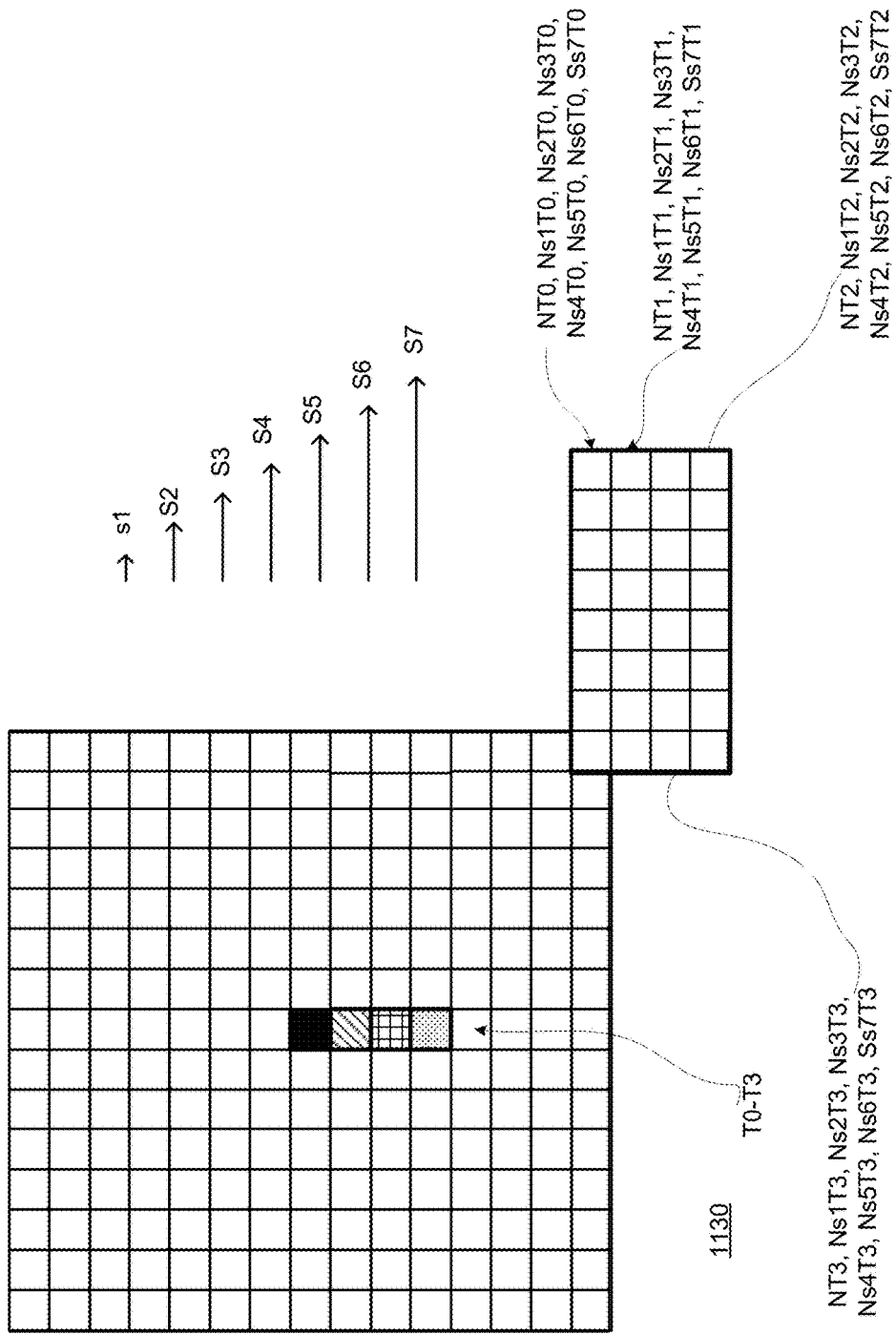
FIG. 30 illustrates an array of target pixels according to an embodiment of the invention.

FIG. 28 illustrates eight source pixels and thirty two target pixels that are processed by the DPA according to an embodiment of the invention. FIG. 29 illustrates an array of source pixels according to an embodiment of the invention. FIG. 30 illustrates an array of target pixels according to an embodiment of the invention.

SADs related to source pixels (SP0, SP1, SP2 and SP3) and (SP'0, SP'1, SP'2 and SP'3), to 4×8 target pixels (including a leftmost column of TP0, TP1, TP2 and TP3) and another 4×8 target pixels (including a leftmost column of TP'0, TP'1, TP'2 and TP'3) are calculated.

Source pixels SP0, SP1, SP2 and SP3 belong to the same column and their SADs are calculated in a pipelined manner
1) Calculating SAD for SP0 and a certain target pixel.
2) Using the previous calculation when calculating SAD of S1 and the certain target pixel.
3) Using the previous calculation when calculating SAD of SP2 and the certain target pixel.

4) Using the previous calculation when calculating SAD of SP3 and the certain target pixel.

In parallel to the calculation of the SADs of source pixels SP0, SP1, SP2 and SP3—the PMA also calculates the SADs of SP'0, SP'1, SP'2 and SP'3. SP'0, SP'1, SP'2 and SP'3 belong to the same column and their SADs are calculated in a pipelined manner:
1) Calculating SAD for SP'0 and a certain target pixel.
2) Using the previous calculation when calculating SAD of SP'1 and the certain target pixel.
3) Using the previous calculation when calculating SAD of SP'2 and the certain target pixel.
4) Using the previous calculation when calculating SAD of SP'3 and the certain target pixel.

The DPA 500 may calculate the SADs of each source pixel and multiple other target pixels in parallel.

For example, assuming that the first row of the 4×8 target pixels includes TP0 and seven shifted target pixels (TP0, Ts1P0, Ts2P0, Ts2P0, Ts3P0, Ts4P0, Ts5P0, Ts6P0, Ts7P0) then the calculation of SADs for SP0 may include calculating SADs for SP0 and each one of TP0, Ts1P0, Ts2P0, Ts2P0, Ts3P0, Ts4P0, Ts5P0, Ts6P0, Ts7P0.

When calculating any of the SADs there is a need to calculate an absolute difference of the new pixels. FIG. 29 illustrates four new source pixels NS0, NS1, NS2 and NS3 (for calculating the SADs related to SP0, SP1, SP2 and SP3 and only one target pixel column).

FIG. 30 illustrates thirty two new target pixels:
1) New target pixels for calculating SADs for SP0 and eight different target pixels—NT0, Ns1T0, Ns2T0, Ns3T0, Ns4T0, Ns5T0, Ns6T0, Ss7T0.
2) New target pixels for calculating SADs for SP1 and eight different target pixels—NT1, Ns1T1, Ns2T1, Ns3T1, Ns4T1, Ns5T1, Ns6T1, Ss7T1.
3) New target pixels for calculating SADs for SP2 and eight different target pixels—NT2, Ns1T2, Ns2T2, Ns3T2, Ns4T2, Ns5T2, Ns6T2, Ss7T2.
4) New target pixels for calculating SADs for SP3 and eight different target pixels—NT3, Ns1T3, Ns2T3, Ns3T3, Ns4T3, Ns5T3, Ns6T3, Ss7T3.

Figure 31:
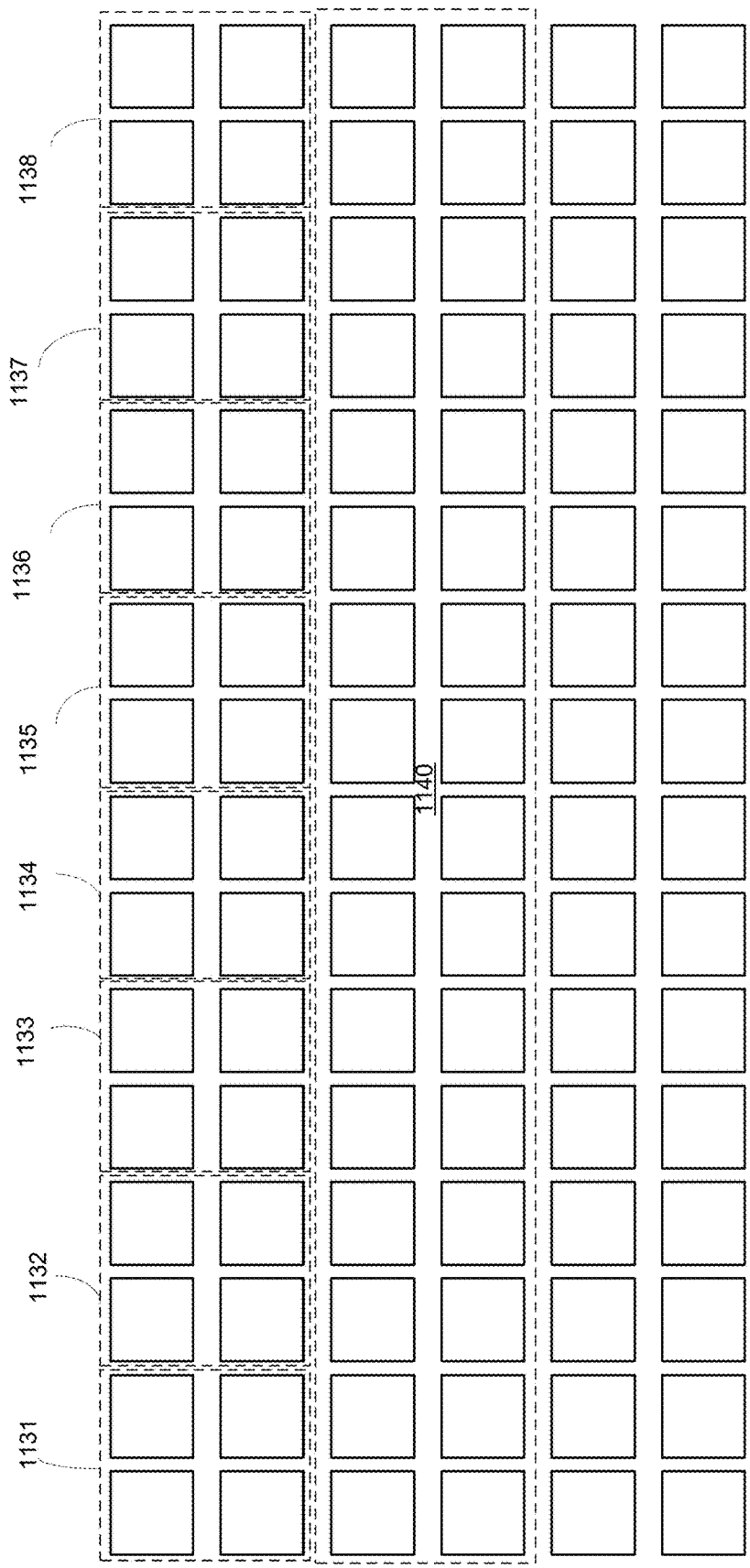
FIG. 31 illustrates multiple groups of data processors DPUs according to an embodiment of the invention.
Figure 32:
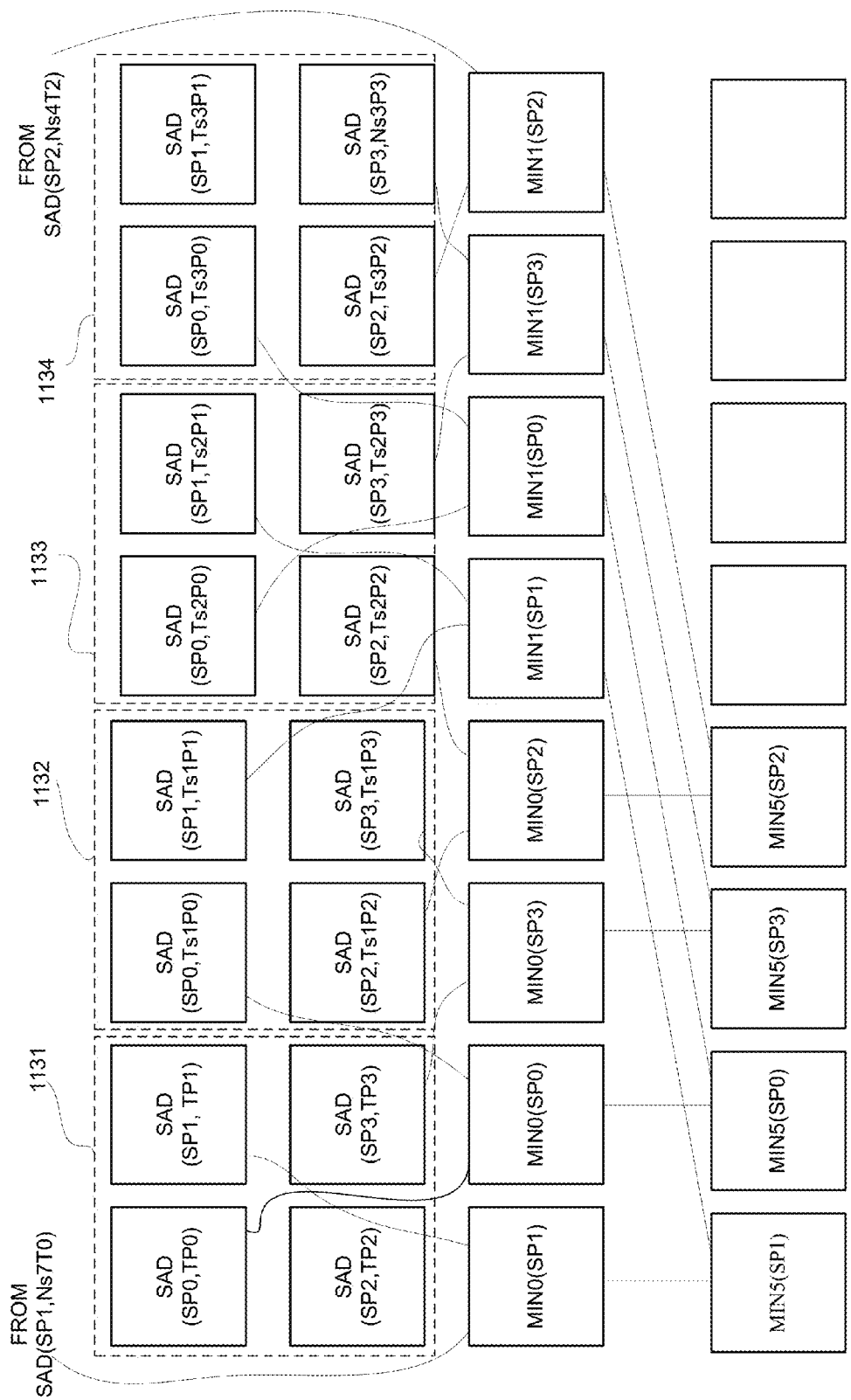
FIG. 32 illustrates eight groups of data processors DPUs—each group includes four DPUs according to an embodiment of the invention.

FIG. 31 illustrates eight groups 1131, 1132, 1133, 1134, 1135, 1136, 1137 and 1138 of DPUs—each group includes four DPUs.

Each group of 1131, 1132, 1133 and 1134 calculates the SAD for pixels SP0, SP1, SP2 and SP3—but for different target pixels (TP0, TP2, TP3 and TP4).

Each group of 1135, 1136, 1137 and 1138 calculates the SAD for pixels SP'0, SP'1, SP'2 and SP'3—but for different target pixels (TP0, TP2, TP3 and TP4).

Group of pixels 1140 performs minimum operations on the SADs calculated by groups 1131-1138.

Accordingly—method 2600 may include calculating, by a first group of data processor of an array of data processors, multiple sets of SADs that are associated with a plurality of source pixels and multiple subgroups of target pixels; wherein each SAD of the multiple set of SADs is calculated based on previously calculated SADs and to a currently calculated absolute difference; and finding, by a second group of data processors of the array and for source pixel, a best matching target pixel in repose to values of SADs that are associated with the source pixel.

The multiple set of SADs may include sub-sets of SADs, each sub-set of SADs is associated with the plurality of source pixels and a plurality of subgroups of target pixels of the multiple subgroups of target pixels. For example, groups 1131-1138 calculate different sub-sets of SADs.

The plurality of source pixels may belong to a column of the rectangular array of pixels and are adjacent to each other.

Calculating the multiple sets of SADs may include calculating, in parallel, SADs of different sub-sets of SADs.

Calculating may include calculating, in sequential manner, SADs that belong to the same sub-set of SADs.

The following text illustrates some PMA status and configuration buffers according to an embodiment of the invention.

These status and configuration buffers 109 include PMA control status register, PMA halt enable control register and PMA halt on event status register.

The control registers may allow, for example the scalar unit to determine a predefined period of operation for the image processor. Additionally or alternatively, the scalar unit may halt the image processor (without changing the state of the PMA) and program the program processor, send control signals to the program processor and resume the operation of the image processor from the same point (except to changes introduced by the scalar unit).

PMA Control Status Register (p_PmaCsr)

| | | |
|---|---|---|
| [2:0] | lsuAddSel[0] | Address Select for LSU0 |
| [5:3] | lsuAddSel[1] | Address Select for LSU1 |
| [8:6] | lsuAddSel[2] | Address Select for LSU2 |
| [11:9] | lsuAddSel[3] | Address Select for LSU3 |
| [14:12] | lsuAddSel[4] | Address Select for LSU4 |
| [17:15] | lsuAddSel[5] | Address Select for LSU5 |
| [23:18] | Reserved | |
| [26:24] | agStopSel | AGU generated Stop condition select |
| [27] | XorParity Inverting Parity while writng when enabled | |
| [29:28] | sysMemMap | System Memory mapping |
| [30] | progEn | Program Enable |
| [31] | suspCntEn | Suspend Counter Enable |

PMA Halt Enable Control Register (HaltOnEvent)

| | | |
|---|---|---|
| [15:0] | mbParityEn | Memory Bank [15:0] Parity Error Halt Enable |
| [16] | spmparityEn | SU Program Memory Parity Error Halt Enable |
| [17] | sdmparityEn | SU Data Memory Parity Error Halt Enable |
| [18] | dmaIntEn | DMA Interrupt Halt Enable |
| [19] | suRdErrEn | Scalar Unit Read Error Halt Enable |
| [20] | suDivZeroEn | Scalar Unit Divide by Zero Halt Enable |
| [21] | suIntEn | Scalar Unit Interrupt Halt Enable |
| [22] | suHaltEn | Scalar Unit Halt Enable |
| [31:23] | Reserved | |

PMA Halt On Event Status Register (HoeStatus)

| | | |
|---|---|---|
| [15:0] | mbParityErr | Memory Bank [15:0] Parity Error |
| [16] | spmparityErr | SU Program Memory Parity Error |
| [17] | sdmparityErr | SU Data Memory Parity Error |
| [18] | dmaInt | DMA Interrupt |
| [19] | suRdErr | Scalar Unit Read Error |
| [20] | suDivZero | Scalar Unit Divide by Zero |

| | | |
|---|---|---|
| [21] | suInt | Scalar Unit Interrupt |
| [22] | suHalt | Scalar Unit Halt |
| [31:23] | Reserved | |

Suspend-Resume-Event Counter & Increment.

This features enable suspending operations, changing some configurations without emptying the computation pipelines, and resuming the operations. It is implemented through the following registers: (a) The Suspend Counter Enable control bit (suspCntEn in p_PmaCsr), (b) The Suspend Counter (p_SuspCnt), and (c) The Reset Control on Suspend (p_RstCtl).

When enabled (suspCntEn=1), the Suspend Counter counts down. When reaching zero, the PMA suspends operations (kept in stall state) until suspCntEn is reset, or p_SuspCnt is written with a new value (!=0). During the stall, the Scalar Unit can re-configure the PMA (instructions, constants ... ). When resetting suspCntEn or writing p_StallCnt, the PMA resumes its operation with the new configuration.

p_RstCtl defines which features are reset upon resuming

The features that can be reset are:
1) The DPU micro controllers.
2) DPA program memory.
3) BU program memory.
4) SB program memory.
5) The Address Generators.
6) The BU read buffers.
7) GU Iterator (1 bit)

Reset Control on Suspend

| Field | Name | Description |
|---|---|---|
| [5:0] | addGenRst | Reset Address Generator on Suspend |
| [5:0] | nuRdBufRst | Empty Read Buffer Line on Suspend |
| [5:0] | nuUcRst | Reset BU micro-controller on Suspend |
| [5:0] | dpuUcRst | Reset DPU micro-controller on Suspend |
| [1:0] | sbUcRst | Reset Store Buffer micro-controller on Suspend |

Event Counter p_EventCnt

A simple counter, counting with DPU clock (do not count during p_stall). The counter is preset through configuration. Whenever the counter is null, it raises an event signal to the Scalar Unit. This counter is readable though the configuration bus.

Suspend & Event Increment Register p_SuspEventInc

Low half (15 . . . 0) is used to increment the Suspend Counter, during and concurrently with its normal decrement. The High Half (31 . . . 16) increments the Event Counter, also concurrently.

Figure 33:
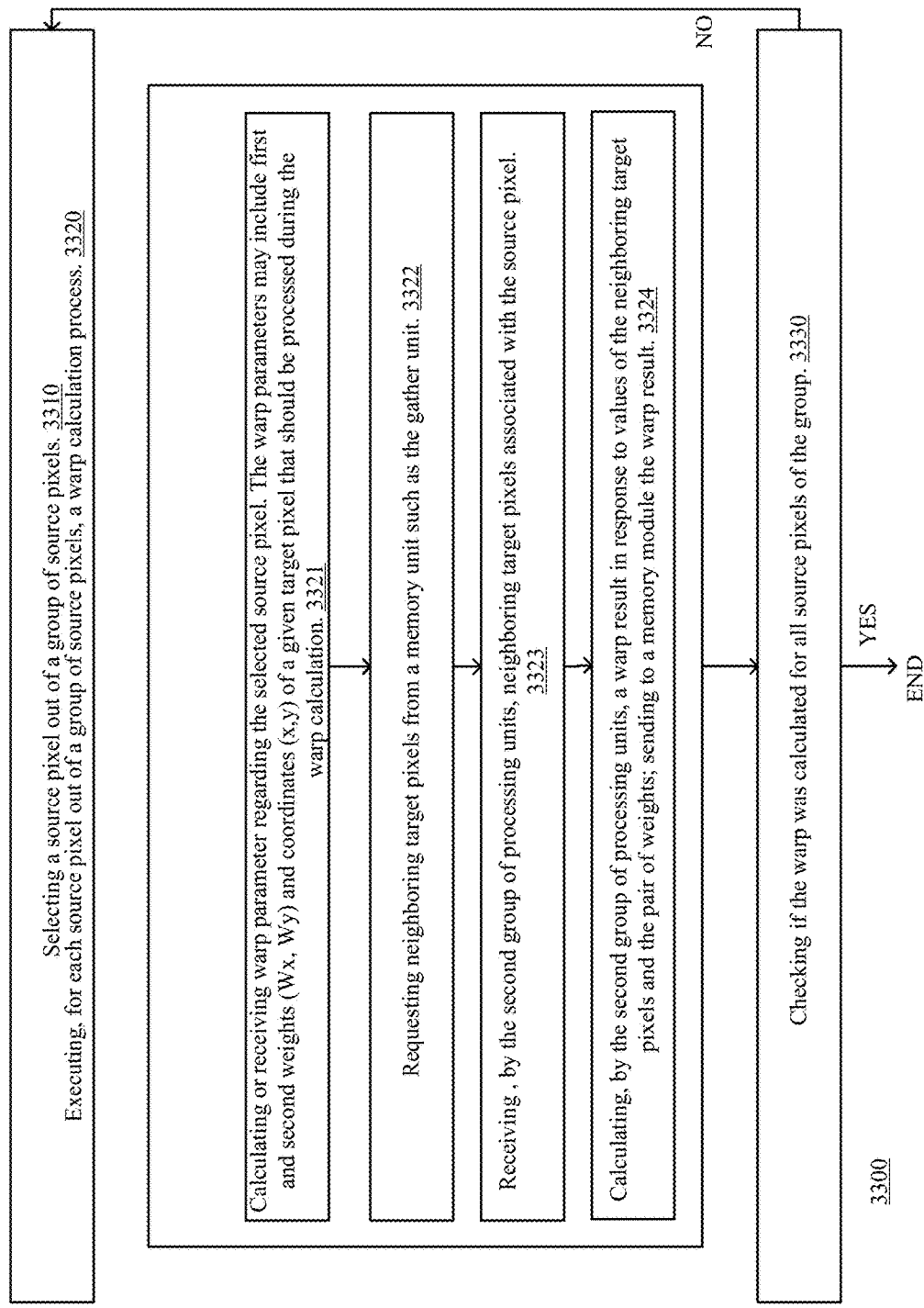
FIG. 33 illustrates a warp calculation method according to an embodiment of the invention.

FIG. 33 illustrates method 3300 according to an embodiment of the invention.

Method 3300 may start by step 3310 of selecting a source pixel out of a group of source pixels. The selected source pixel will be referred to as "the source pixel".

Step 3310 may be followed by step 3320 of executing, for each source pixel out of a group of source pixels, a warp calculation process that includes:
1) Calculating (3321) or receiving warp parameter regarding the selected source pixel. The warp parameters may include first and second weights (Wx, Wy) and coordinates (x,y) of a given target pixel that should be processed during the warp calculation. The first and second weights are received by first group of processing units (DPUs) of the array of processing units (DPA).
2) Requesting (3322) neighboring target pixels (that include the given target pixel) from a memory unit such as the gather unit. The gather unit may, in various operational modes, receive 4 coordinates and convert them to sixteen target pixels—four groups of neighboring target pixels.
3) Receiving (3323), by the second group of processing units, neighboring target pixels associated with the source pixel.
4) Calculating (3324), by the second group of processing units, a warp result in response to values of the neighboring target pixels and the pair of weights; providing to a memory module the warp result.

Steps 3321, 3322, 3323 and 3324 may be executed in a pipelined manner.

Step 3320 is followed by step 3330 of checking if the warp was calculated for all source pixels of the group. If no—ending the warp calculation.

Step 3326 may include relaying values of some of the neighboring target pixels between processing units of the second group.

Any reference to any of the terms "comprise", "comprises", "comprising" "including", "may include" and "includes" may be applied to any of the terms "consists", "consisting", "and consisting essentially of". For example—any of method describing steps may include more steps than those illustrated in the figure, only the steps illustrated in the figure or substantially only the steps illustrate in the figure. The same applies to components of a device, processor or system and to instructions stored in any non-transitory computer readable storage medium.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at" least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method of compensating for image acquisition imparities for at least one out of driver assistance and autonomous driving, the method comprises:
executing, for each target pixel out of a group of target pixels that were captured by a camera that is mounted on a vehicle, a warp calculation process that comprises compensating for image acquisition imparities by:
receiving, by a first group of processing units of an array of processing units, a pair of weights that comprises a first weight and a second weight associated with the each target pixel;
receiving, by a second group of processing units of the array, values of neighboring source pixels associated with the each target pixel;
calculating, by the second group, a warp result based on values of the neighboring source pixels and the pair of weights;
wherein the calculating of the warp result comprises: calculating, by a first processing unit of the second group, a first difference between a first pair of neighboring source pixels and a second difference between a second pair of neighboring source pixels; providing the first difference to a second processing unit of the second group; and providing the second difference to a third processing unit of the second group;
wherein each processing unit of the first and second groups is (a) directly coupled to a first set of processing units of the array; (b) indirectly coupled, via one or more intermediate processing units, to some other processing units of the array; and (c) has a relay channel for relaying data between relay ports of the processing unit; and
providing the warp result to a memory module.

2. The method according to claim 1, wherein the calculating of the warp result comprises relaying values of some of the neighboring source pixels between processing units of the second group.

3. The method according to claim 1, wherein the calculating of the warp result comprises relaying intermediate results calculated by the second group and values of some of the neighboring source pixels between processing units of the second group.

4. The method according to claim 1, wherein the relay channel is a zero-latency relay channel.

5. The method according to claim 1, wherein the calculating of the warp result further comprises: calculating, by a fourth processing unit of the second group, a first modified weight in response to the first weight and calculating a second modified weight in response to the second weight; providing the first modified weight from the fourth processing unit to the second processing unit of the second group; calculating, by the second processing unit of the second group, a first intermediate result based on the first difference, a first neighboring source pixel and the first modified weight.

6. The method according to claim 5, wherein the calculating of the warp result further comprises: providing the second difference from the third processing unit of the second group to a sixth processing unit of the second group; providing a second neighboring source pixel from a fifth processing unit of the second group to the sixth processing unit of the second group; and calculating, by the sixth processing unit of the second group, a second intermediate result based on the second difference, the second neighboring source pixel and the first modified weight.

7. The method according to claim 6, wherein the calculating of the warp result further comprises: providing the second intermediate result from the sixth processing unit of the second group to a seventh processing unit of the second group; providing the first intermediate result from the second processing unit of the second group to the seventh processing unit of the second group; and calculating, by the seventh processing unit of the second group, a third intermediate result based on to the first and second intermediate results.

8. The method according to claim 7, wherein the calculating of the warp result further comprises: providing the third intermediate result from the seventh processing unit of the second group to an eighth processing unit of the second group; providing the second intermediate result from the sixth processing unit of the second group to a ninth processing unit of the second group; providing the second intermediate result from the ninth processing unit of the second group to the eighth processing unit of the second group; providing the second modified weight from the fourth processing unit of the second group to an eighth processing unit of the second group; and calculating the warp result, by the eighth processing unit of the second group, based upon the second and third intermediate results and the second modified weight.

9. The method according to claim 1 comprising executing, by the array, multiple warp computing processes associated with a subgroup of target pixels in parallel.

10. The method according to claim 9 comprising fetching, from a gather unit, neighboring source pixels associated with each target pixel of the subgroup of pixels in parallel; wherein the gather unit comprises a set associate cache and is arranged to access a memory module that comprises multiple independently accessible memory banks.

11. The method according to claim 10, comprising receiving for each target pixel of the subgroup of pixels, first and second warp parameters; wherein the first and second warp parameters comprise the first and second weights and location information indicative of a location of the neighboring source pixels associated with the target pixel.

12. The method according to claim 11, comprising providing to the gather unit, the location information for each target pixel of the subgroup of pixels.

13. The method according to claim 12, comprising converting, by the gather unit, the location information to addresses of the neighboring source pixels.

14. The method according to claim 10, comprising calculating, by a third group of processing units of the array, and for each target pixel of the subgroup of pixels, first and second warp parameters; wherein the first and second warp parameters comprise the first and second weights and location information indicative of a location of the neighboring source pixels associated with the target pixel.

15. The method according to claim 14, sending, from the third group to the first group the first and second weights.

16. The method according to claim 15, comprising providing to the gather unit, the location information for each target pixel of the subgroup of pixels.

17. The method according to claim 16, comprising converting, by the gather unit, the location information to addresses of the neighboring source pixels.

18. The method according to claim 1 wherein for each processing unit of the first and second groups, the first set comprises processing units that are located within less than four processing units from the processing unit.

19. The method according to claim 1, wherein each processing unit of the first and second groups comprises a first non-relay input port that is directly coupled to the processing units of the first set.

20. The method according to claim 19, wherein for each processing unit of the first and second groups, the first non-relay input port of the processing unit is directly coupled to relay ports of processing units of the first set.

21. The method according to claim 20, wherein each processing unit of the first and second groups comprises a second non-relay input port that is directly coupled to non-relay ports of processing units of the first set.

22. The method according to claim 19, wherein for each processing unit of the first and second groups, the first non-relay input port of the processing unit is directly coupled to non-relay ports of processing units of the first set.

23. The method according to claim 1, wherein the relay ports of each processing unit of the first and second groups are directly coupled to a second set of processing units, wherein the second set differs from the first set.

24. The method according to claim 23, wherein for each processing unit of the first and second groups, the second set comprises a processing unit that is more distant from the processing unit than any of the processing units of the first set.

25. The method according to claim 1 comprising configuring processing units of the first group of processing units and of the second group of processing units to participate in the warp calculation process by at least one out of (a) sending configuration information over unicast addresses of single processing units, (b) sending configuration information over broadcast addresses of rows of processing units of the array, and (c) sending configuration information over broadcast addresses of columns of processing units of the array.

26. An image processor that is configured to calculate warp results for at least one out of driver assistance and autonomous driving, the image processor is configured to execute, for each target pixel out of a group of target pixels that were captured by a camera that is mounted on a vehicle, a warp calculation process that comprises compensating for image acquisition imparities by: receiving, by a first group of processing units of an array of processing units of the image processor, a pair of weights that comprises a first weight and a second weight associated with the each target pixel; receiving, by a second group of processing units of the array, values of neighboring source pixels associated with the each target pixel; calculating, by the second group, a warp result based on values of the neighboring source pixels and the pair of weights; wherein the calculating of the warp result comprises: calculating, by a first processing unit of the second group, a first difference between a first pair of neighboring source pixels and a second difference between a second pair of neighboring source pixels; providing the first difference to a second processing unit of the second group; and providing the second difference to a third processing unit of the second group; wherein each processing unit of the first and second groups is (a) directly coupled to a first set of processing units of the array; (b) indirectly coupled, via one or more intermediate processing units, to some other processing units of the array; and (c) has a relay channel for relaying data between relay ports of the processing unit; and providing the warp result to a memory module.

27. The image processor according to claim 26, wherein each processing unit of the first and second groups comprises a first non-relay input port that is directly coupled to the processing units of the first set.

28. The image processor according to claim 27, wherein for each processing unit of the first and second groups, the first non-relay input port of the processing unit is directly coupled to relay ports of processing units of the first set.

29. The image processor according to claim 28, wherein each processing unit of the first and second groups comprises a second non-relay input port that is directly coupled to non-relay ports of processing units of the first set.

30. The image processor according to claim 27, wherein for each processing unit of the first and second groups, the first non-relay input port of the processing unit is directly coupled to non-relay ports of processing units of the first set.

31. The image processor according to claim 26, wherein the relay ports of each processing unit of the first and second groups are directly coupled to a second set of processing units, wherein the second set differs from the first set.

32. The image processor according to claim 31, wherein for each processing unit of the first and second groups, the second set comprises a processing unit that is more distant from the processing unit than any of the processing units of the first set.

33. The image processor according to claim 26 comprising configuring processing units of the first group of processing units and of the second group of processing units to participate in the warp calculation process by at least one out of (a) sending configuration information over unicast addresses of single processing units, (b) sending configuration information over broadcast addresses of rows of processing units of the array, and (c) sending configuration information over broadcast addresses of columns of processing units of the array.

34. A non-transitory computer readable medium that stores instructions for calculating warp results for at least one out of driver assistance and autonomous driving that once executed by an array of processing units result in the execution of the steps of: executing, for each target pixel out of a group of target pixels that were captured by a camera that is mounted on a vehicle, a warp calculation process that comprises compensating for image acquisition imparities by: receiving, by a first group of processing units of the array of processing units, a pair of weights that comprises a first weight and a second weight associated with the each target pixel; receiving, by a second group of processing units of the array, values of neighboring source pixels associated with the each target pixel; calculating, by the second group, a warp result based on values of the neighboring source pixels and the pair of weights; wherein the calculating of the warp result comprises: calculating, by a first processing unit of the second group, a first difference between a first pair of neighboring source pixels and a second difference between a second pair of neighboring source pixels; providing the first difference to a second processing unit of the second group; and providing the second difference to a third processing unit of the second group; wherein each processing unit of the first and second groups is (a) directly coupled to a first set of processing units of the array; (b) indirectly coupled, via one or more intermediate processing units, to some other processing units of the array; and (c) has a relay channel for relaying data between relay ports of the processing unit; and providing the warp result to a memory module.

35. The non-transitory computer readable medium according to claim 34 that stores instructions for configuring processing units of the first group of processing units and of the second group of processing units to participate in the warp calculation process by at least one out of (a) sending configuration information over unicast addresses of single processing units, (b) sending configuration information over broadcast addresses of rows of processing units of the array, and (c) sending configuration information over broadcast addresses of columns of processing units of the array.

* * * * *